United States Patent
Sekar et al.

(10) Patent No.: US 12,165,433 B2
(45) Date of Patent: *Dec. 10, 2024

(54) SYSTEMS FOR AND METHODS OF CREATING A LIBRARY OF FACIAL EXPRESSIONS

(71) Applicant: Prof Jim Inc., Sunnyvale, CA (US)

(72) Inventors: Deepak Chandra Sekar, Sunnyvale, CA (US); Pranav Mehta, Hyderabad (IN)

(73) Assignee: PROF JIM INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,539

(22) Filed: Sep. 7, 2023

(65) Prior Publication Data

US 2024/0078841 A1    Mar. 7, 2024

Related U.S. Application Data

(63) Continuation of application No. 17/984,935, filed on Nov. 10, 2022, now Pat. No. 11,790,697, which is a (Continued)

(51) Int. Cl.
*G06V 40/16* (2022.01)
*G06V 10/77* (2022.01)

(52) U.S. Cl.
CPC ........ *G06V 40/176* (2022.01); *G06V 10/7715* (2022.01); *G06V 40/165* (2022.01); *G06V 40/166* (2022.01)

(58) Field of Classification Search
CPC ............. G06V 40/176; G06V 10/7715; G06V 40/165; G06V 40/166; G06V 10/772; G06V 10/82; G06V 20/41; G06V 40/174
See application file for complete search history.

(56) References Cited

U.S. PATENT DOCUMENTS 6,749,434 B2  6/2004 Stuppy
8,826,117 B1  9/2014 Junee et al.
(Continued)

FOREIGN PATENT DOCUMENTS

CN   110956142 A   4/2020
CN   112530218 A   3/2021
(Continued)

OTHER PUBLICATIONS

Notice of Allowance dated Oct. 25, 2023, directed to U.S. Appl. No. 18/243,527; 8 pages.
(Continued)

*Primary Examiner* — Phuoc Tran
(74) *Attorney, Agent, or Firm* — Michele V. Frank; Venable LLP

(57) ABSTRACT

Methods, systems, and computer readable storage media for using image processing to develop a library of facial expressions. The system can receive digital video of at least one speaker, then execute image processing on the video to identify landmarks within facial features of the speaker. The system can also identify vectors based on the landmarks, then assign each vector to an expression, resulting in a plurality of speaker expressions. The system then scores the expressions based on similarity to one another, and creates subsets based on the similarity scores.

15 Claims, 96 Drawing Sheets

Related U.S. Application Data continuation of application No. 17/832,493, filed on Jun. 3, 2022, now Pat. No. 11,532,179.

(56) References Cited

U.S. PATENT DOCUMENTS

| | | | |
|---|---|---|---|
| 9,552,739 | B2 | 1/2017 | Glazier |
| 9,626,875 | B2 | 4/2017 | Gal et al. |
| 9,830,728 | B2 | 11/2017 | Fang et al. |
| 10,074,381 | B1 | 9/2018 | Cowburn et al. |
| 10,169,905 | B2 | 1/2019 | Bhat et al. |
| 10,249,207 | B2 | 4/2019 | Solomon et al. |
| 10,339,822 | B2 | 7/2019 | Brinton et al. |
| 10,586,369 | B1 | 3/2020 | Roche et al. |
| 10,810,409 | B2 | 10/2020 | Bacivarov et al. |
| 10,825,227 | B2 | 11/2020 | Amer et al. |
| 11,010,656 | B2 | 5/2021 | Mars et al. |
| 11,042,800 | B2 | 6/2021 | Mars et al. |
| 11,151,890 | B2 | 10/2021 | Yang et al. |
| 11,263,397 | B1 | 3/2022 | Yu et al. |
| 11,393,133 | B2 | 7/2022 | el Kaliouby et al. |
| 11,593,984 | B2 | 2/2023 | Hussen Abdelaziz et al. |
| 11,922,726 | B2 * | 3/2024 | Sekar .............. G06V 10/7715 |
| 2002/0051077 | A1 | 5/2002 | Liou et al. |
| 2004/0068410 | A1 | 4/2004 | Mohamed et al. |
| 2006/0217979 | A1 | 9/2006 | Pahud et al. |
| 2008/0070205 | A1 | 3/2008 | Amick et al. |
| 2009/0183077 | A1 | 7/2009 | Hakim et al. |
| 2010/0082345 | A1 | 4/2010 | Wang et al. |
| 2012/0130717 | A1 | 5/2012 | Xu et al. |
| 2013/0035926 | A1 | 2/2013 | Ushakov et al. |
| 2013/0173673 | A1 | 7/2013 | Miller |
| 2013/0191115 | A1 | 7/2013 | Suzuki et al. |
| 2014/0095143 | A1 | 4/2014 | Jan et al. |
| 2014/0122595 | A1 | 5/2014 | Murdoch et al. |
| 2014/0188479 | A1 | 7/2014 | Bellamy et al. |
| 2014/0207438 | A1 | 7/2014 | Liebermann |
| 2014/0380171 | A1 | 12/2014 | Maloney et al. |
| 2015/0127352 | A1 | 5/2015 | Norsworthy et al. |
| 2015/0242978 | A1 | 8/2015 | Zaslavsky et al. |
| 2016/0098936 | A1 | 4/2016 | Solomon |
| 2017/0139930 | A1 | 5/2017 | Maloney |
| 2017/0270822 | A1 | 9/2017 | Cohen |
| 2018/0077095 | A1 | 3/2018 | Deyle et al. |
| 2019/0156694 | A1 | 5/2019 | Manfre et al. |
| 2019/0244623 | A1 | 8/2019 | Hall et al. |
| 2019/0340802 | A1 | 11/2019 | Tarawneh et al. |
| 2019/0354566 | A1 | 11/2019 | Pilkington et al. |
| 2020/0111474 | A1 | 4/2020 | Kumar et al. |
| 2020/0195595 | A1 | 6/2020 | Bruns et al. |
| 2020/0279017 | A1 | 9/2020 | Norton et al. |
| 2020/0357302 | A1 | 11/2020 | Yang |
| 2020/0379575 | A1 | 12/2020 | Banerjee et al. |
| 2021/0192824 | A1 | 6/2021 | Chen et al. |
| 2021/0248804 | A1 | 8/2021 | Hussen Abdelaziz et al. |
| 2022/0229832 | A1 | 7/2022 | Li et al. |
| 2022/0270314 | A1 | 8/2022 | Navarro et al. |
| 2022/0343576 | A1 | 10/2022 | Marey et al. |

FOREIGN PATENT DOCUMENTS

| | | |
|---|---|---|
| KR | 20090132914 A | 12/2009 |
| KR | 20210059390 A | 5/2021 |
| WO | 03/058518 A2 | 7/2003 |
| WO | 2017/136874 A1 | 7/2017 |

OTHER PUBLICATIONS

Alizadeh Shabkhoslati, J., (Apr. 2021). "Design and Implementation of a Conversational Agent to Stimulate Teacher-Students Interactions in Synchronous On-line Lecture Environments," Politecnico di Torino; located at <https://webthesis.biblio.polito.it/18174/1/tesi.pdf>; 85 pages.

Malcangi, M. "Text-Driven Avatars based on Artificial Neural Networks and Fuzzy Logic." International Journal of Computers 4.2 (2010): pp. 61-69. located at <https://citeseerx.ist.psu.edu/viewdoc/download?doi=10.1.1.458.8222&rep=rep1&type=pdf>.

Jia, J. et al., (2020). "A Multimodal Human-Computer Interaction System and its Application in Smart Learning Environments." International Conference on Blended Learning. Springer Nature Switzerland. located at <https://www.ncbi.nlm.nih.gov/pmc/articles/PMC7366450/pdf/978-3-030-51968-1_Chapter_1.pdf>; pp. 3-14.

Jha, M. et al., (Jun. 2020). "Work-in-progres—Virtual Agents in Teaching: A Study of Human Aspects," 6th International Conference of the Immersive Learning Research Network (iLRN). IEEE; pp. 259-262. located at <https://research-management.mq.edu.au/ws/portalfiles/portal/132243983/132118197.pdf>.

Delia, H. (Nov. 2021). "iClone Connector Adds Breakthrough Character Animation Workflowto NVIDIA Omniverse" nvidia.com, Developer Blog; 2 pages. located at <https://developer.nvidia.com/blog/iclone-connector-adds-breakthrough-character-animation-workflow-to-nvidia-omniverse>.

Takahashi, D., (Dec. 2014). "Roblox Acquires Loom.ai for Realistic Avatars and Delays IPO to 2021," located at https://venturebeat.com/2020/12/14/roblox-acquires-loom-ai-for-realistic-avatars-and-delays-ipo-to-2021/; 4 pages.

"Zoomi Delivers Immediate Improvements in Your Training Investment" located at <https://web.archive.org/web/20191024212520/https://zoomi.ai/solutions/> (Oct. 24, 2019).

Pavllo, D. et al. (Mar. 2019). "3D Human Pose Estimation in Video with Temporal Convolutions and Semi-Supervised Training,"; 13 pages.

Bertero, D. et al., (Nov. 2016). "Real-Time Speech Emotion and Sentiment Recognition for Interactive Dialogue Systems," Proceedings of the 2016 Conference on Empirical Methods in Natural Language Processing; pp. 1042-1047.

Non-Final Office Action dated Aug. 18, 2022, directed to U.S. Appl. No. 17/832,502; 14 pages.

Non-Final Office Action dated Aug. 23, 2022, directed to U.S. Appl. No. 17/832,508; 12 pages.

U.S. Appl. No. 17/832,502, filed Jun. 3, 2022.

U.S. Appl. No. 17/832,508, filed Jun. 3, 2022.

Office Action dated Dec. 2, 2022, directed to U.S. Appl. No. 17/832,502; 15 pages.

Office Action dated Dec. 21, 2022, directed to U.S. Appl. No. 17/832,508; 14 pages.

Non-Final Rejection dated Mar. 20, 2023, directed to U.S. Appl. No. 18/076,161; 18 pages.

Non-Final Rejection dated Mar. 30, 2023, directed to U.S. Appl. No. 17/832,502; 24 pages.

Yano, K. (Dec. 2020), "Using virtual reality to create avatar videos for teaching online," published by Times Higher Education, located at "https://www.timeshighereducation.com/campus/using-virtual-reality-create-avatar-videos-teaching-online"; 6 pages.

International Search Report and Written Opinion mailed Apr. 25, 2023, directed to International Patent Application No. PCT/US2022/052011; 8 pages.

Marcheggiani, D. et al, (Jun. 2020) "Exploiting Semantics in Neural Machine Translation with Graph Convolutional Networks," ILCC, School of Informatics, University of Edinburgh; pp. 1-8. retrieved from <https://doi.org/10.48550/arXiv.1804.08313 > on Apr. 11, 2023.

* cited by examiner

| Sentiment | Teaching Action (TA) | | | | | | | |
|---|---|---|---|---|---|---|---|---|
| | Converse | Teach Explain | Idle | Listen | Teach Insightful | Teach Unsure | Greet | Goodbye |
| Excited (very positive) | State 1 | State 2 | State 3 | State 4 | State 5 | State 6 | State 7 | State 8 |
| Happy (positive) | State 9 | State 10 | State 11 | State 12 | State 13 | State 14 | State 15 | State 16 |
| Neutral | State 17 | State 18 | State 19 | State 20 | State 21 | State 22 | State 23 | State 24 |
| Unhappy (negative) | State 25 | State 26 | State 27 | State 28 | State 29 | State 30 | State 31 | State 32 |
| Disgusted (very negative) | State 33 | State 34 | State 35 | State 36 | State 37 | State 38 | State 39 | State 40 |

Fig. 3A

```
{
    "name": "barack obama",
    "myers-briggs": "ENTP",
    "teaching-style": "project-based-learning",
    "native-place": "hawaii",
    "speaking-speed": "70%",
    "exuberance": "medium",
    ...
}
```

Step 1: Fine train general model with speaker voice

Step 2: Use the model

Algebra
Do you know who's considered the father of algebra?
Do you know 2
Do you know 3
from a question-answer system database Geometry
Do you know 1
Do you know 2
Do you know 3
from a question-answer system database

Fig. 23

Sidekick profile:
Humor: 40%
Ask clarifying questions: 20%
Ask students questions: 20%
Do you know?: 20%

Fig. 24

$$TF = \frac{1 + \log(term\ count)}{\log(total\ tokens)}$$

Fig. 27

$$IDF = \log\left(1 + \frac{total\ documents}{documents\ with\ the\ term}\right)$$

Fig. 28

$$SF = \frac{1 + \log(semantic\ features\ containing\ the\ term)}{\log(total\ semantic\ features\ in\ the\ document)}$$

Fig. 29

$$Term\ Relevancy = TF * IDF * SF$$

Fig. 30

| Source text | Simplified Text | Grade level |
|---|---|---|
| Exasperating farrago of distortions, misrepresentations & outright lies being broadcast by an unprincipled showman masquerading as a journalist | Irritating mix of misinformation, lies by a showman pretending to be a journalist | 9 |
| Exasperating farrago of distortions, misrepresentations &outright lies being broadcast by an unprincipled showman masquerading as a journalist | Infuriating and confusing mixture of misinformation, half truths and lies by an unethical showman pretending to be a journalist | 12 |
| Exasperating farrago of distortions, misrepresentations & outright lies being broadcast by an unprincipled showman masquerading as a journalist | Infuriating and confusing mixture of misinformation, half-truths and lies by an unethical showman masquerading as a journalist | College |

Fig. 34

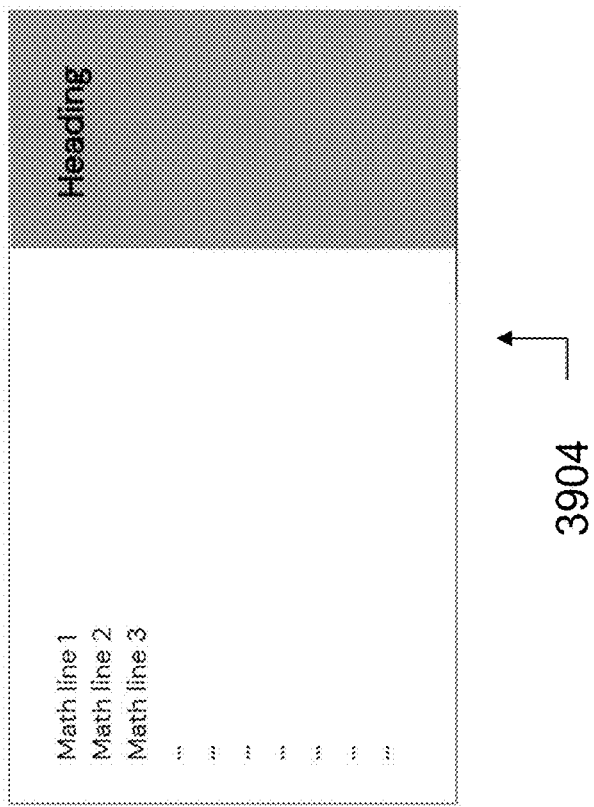
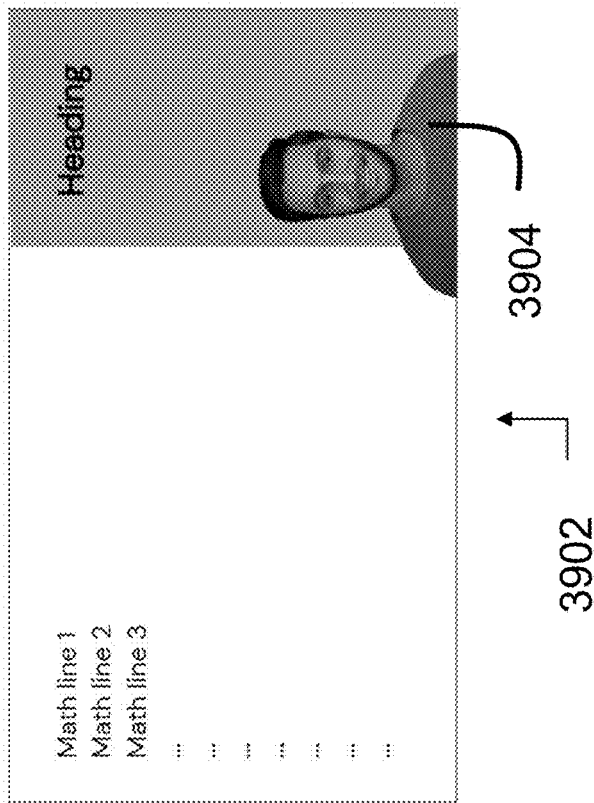
Fig. 39A

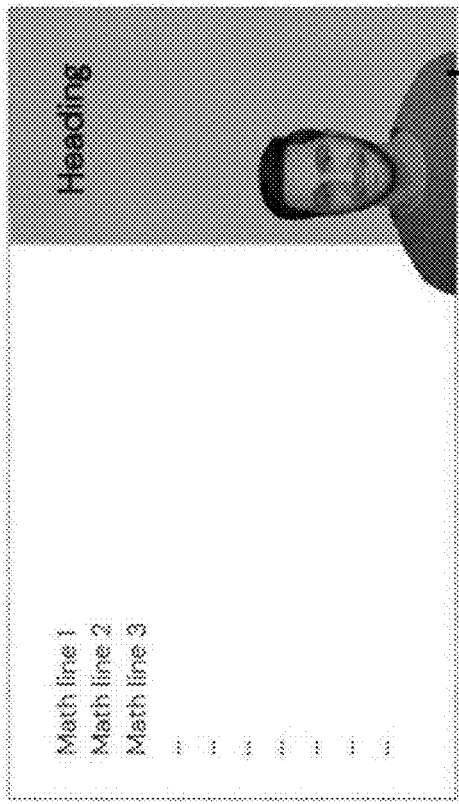
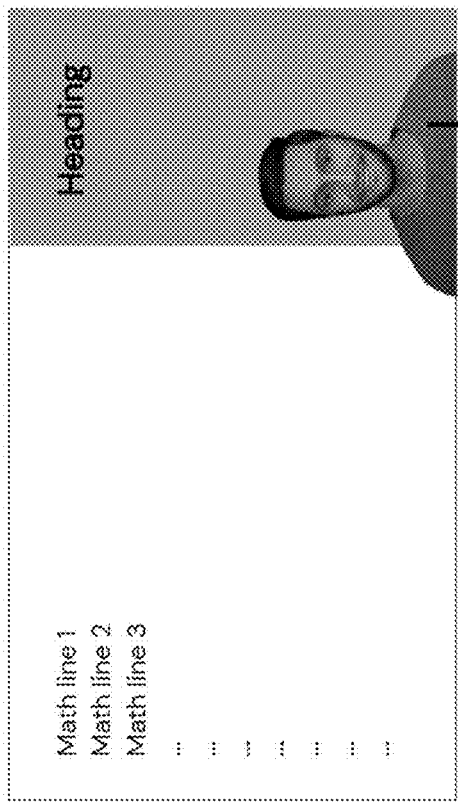
Fig. 39B

Florida is officially the largest state to mandate a financial literacy course for high school graduation. On Tuesday, Florida Gov. Ron DeSantis signed bill SB 1054 into law. The legislation was unanimously passed by both the state House of Representatives and Senate in early March. ⟵ 4060

"What the bill is doing with financial literacy is really providing a foundation for students that's going to be applicable in their lives regardless of what path they take," said DeSantis during a Tuesday press event. "This will provide a foundation for the students to learn the basics of money management, understanding debt, understanding how to balance a checkbook, understanding the fundamentals of investing." ⟵ 4062

The new law will apply to students entering ninth grade in the 2023-2024 school year, and require that they take a half-credit course in personal finance before they graduate.

"Whether our students choose to go to one of our great colleges or universities, do a trade or apprenticeship program, a career in the arts or the military, every student deserves to be equipped with the education and knowledge to succeed financially in our society," said Rep. Demi Busatta Cabrera, a Republican and one of the main sponsors of the bill. ⟵ 4064

A trend of personal finance education
Florida is the latest in a growing trend of states adopting legislation that includes personal finance education for students.
"The world of money is changing so fast, if we don't help our students keep up, the next generation is going to repeat cycles of a lack of financial literacy," said Yanely Espinal, director of educational outreach at Next Gen Personal Finance, a nonprofit. ⟵ 4066

Fig. 40E

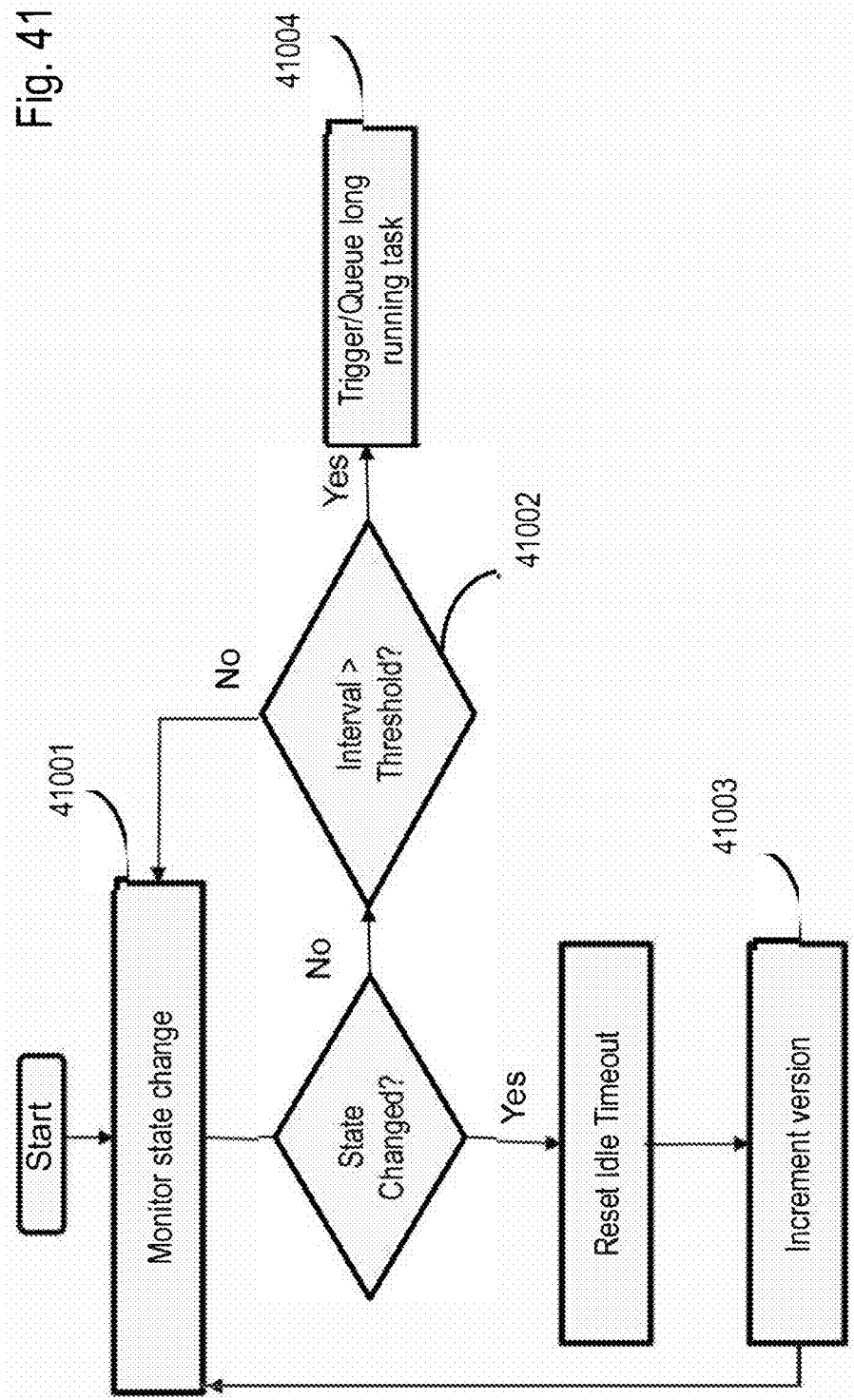

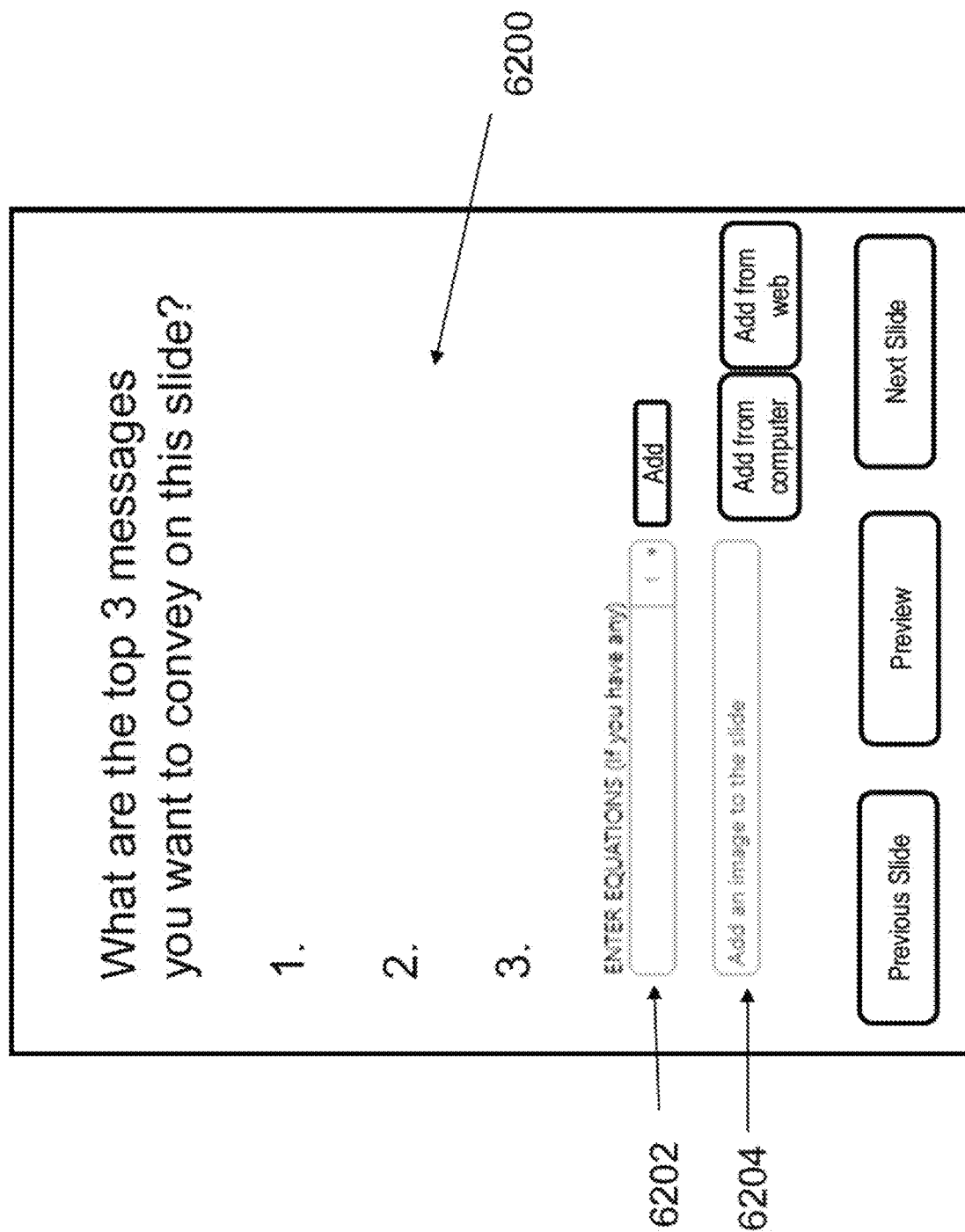

Let a facial landmark coordinate be be $P(x, y)$.

There are total of 68 facial landmark coordinates detected.

All the coordinates are concatenated to form a 136 dimension vector.

⇒ $V = \{x_1, x_2, x_3, ..., x_{68}, y_1, y_2, y_3, ..., y_{68}\}$

⇒ $Matrix = [V_1, V_2, V_3, ..., V_n]$

Fig. 65

$$\theta = \cos^{-1}\left(\frac{\vec{V_1} \cdot \vec{V_2}}{|V_1||V_2|}\right)$$

$\theta$ - Angle between Vectors $\cos^{-1}$ - Inverse of cosine $\vec{V_1}$ - Vector 1

$\cdot$ - Dot Product between vectors $\vec{V_2}$ - Vector 2

$|V_1|$ - Length of Vector 1

$|V_2|$ - Length of Vector 2

Fig. 66

Let X and Y be two vectors of n dimensions,
$X = (x_1, x_2, x_3, \ldots, x_n)$ and $Y = (y_1, y_2, y_3, \ldots, y_n)$ The Euclidian distance between X and Y, d(X,Y) is defined as $$d(X,Y) = \sqrt{(x_1 - y_1)^2 + (x_2 - y_2)^2 + (x_3 - y_3)^2 + \cdots + (x_n - y_n)^2}$$

Fig. 68

$$\text{Standardized Matrix, } Z = \frac{(\text{Variable Value} - \text{Mean})}{\text{Standard Deviation}}$$

Covariance between two vectors X and Y, $cov(X, Y)$ $$= \frac{1}{n} \Sigma_{i=1}^{n}(x_i - \bar{x})(y_i - \bar{y})$$

$$\text{Matrix} = [V_1, V_2, V_3, \ldots, V_n]$$

$$\text{Covariance Matrix} = \begin{bmatrix} cov(V_1, V_1) & \cdots & cov(V_1, V_n) \\ \vdots & \ddots & \vdots \\ cov(V_n, V_1) & \cdots & cov(V_n, V_n) \end{bmatrix}$$

$$C\lambda = v\lambda$$

C – Covariance Matrix, v – eigen vector, $\lambda$ – eigen value

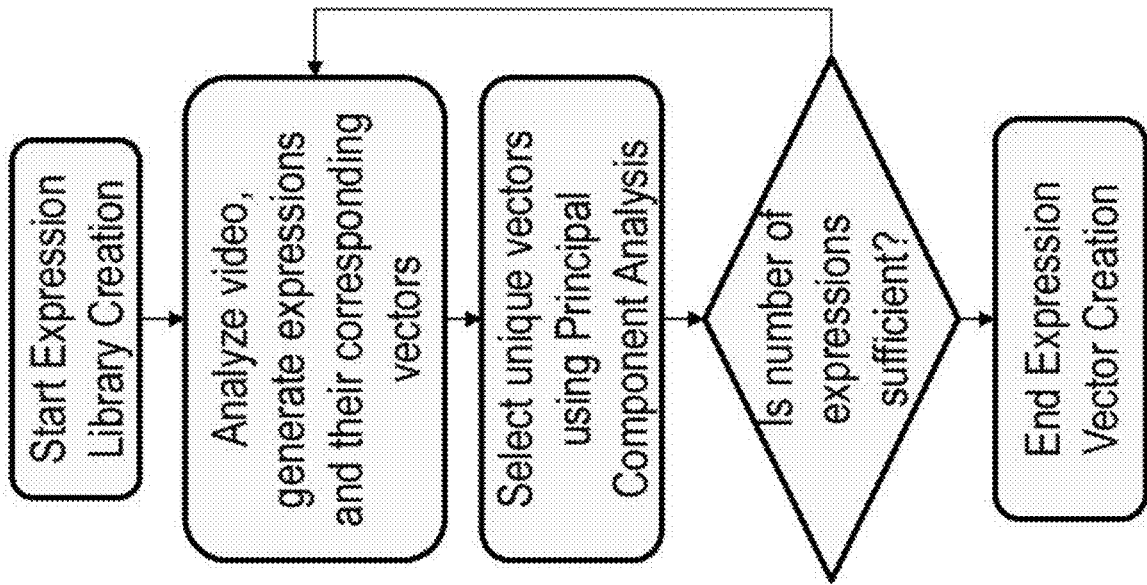

Fig. 71

Happy1-Small eyes-Thin Wide Lips-Sanguine
- A
- B
- C
- D

⬅ 7100

Happy2-Big eyes-Thin Wide Lips-Sanguine
- E
- F
- G
- H

⬅ 7102

Happy3-Big eyes-Thin Wide Lips-Choleric
- I
- J
- K
- L

⬅ 7104

Happy6-Small eyes-Thin Wide Lips-Choleric
- M
- N
- O
- P

⬅ 7106

...

SYSTEMS FOR AND METHODS OF CREATING A LIBRARY OF FACIAL EXPRESSIONS

CROSS-REFERENCE TO RELATED APPLICATIONS

The present application is a continuation of U.S. patent application Ser. No. 17/984,935, filed Nov. 10, 2022, which is a continuation of U.S. patent application Ser. No. 17/832,493, filed Jun. 3, 2022, now U.S. Pat. No. 11,532,179, issued on Dec. 20, 2022, the entire contents of each of which are incorporated herein by reference in their entirety.

BACKGROUND

1. Technical Field

The present invention is in the technical field of online learning. More particularly, the present invention is in the technical field of creating engaging teaching videos for online learning applications.

2. Introduction

Many online learning courses today are poorly made. Technologies that can address these and other challenges with online learning would be helpful.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A first method for performing the concepts disclosed herein can include: receiving, at a computer system, digital video of a speaker, resulting in a speaker video; executing, via at least one processor of the computer system, image processing of the speaker video to identify landmarks within facial features of the speaker; identifying, via the at least one processor, a plurality of vectors based on the landmarks; assigning, via the at least one processor, at least a portion of vectors within the plurality of vectors to expressions, resulting in a plurality of speaker expressions; scoring, via the at least one processor, the plurality of speaker expressions based on similarity to one another, resulting in speaker expression similarity scores; creating, via the at least one processor, at least one subset of similar expressions within the plurality of speaker expressions based on the speaker expression similarity scores; and generating, via the at least one processor, a video that comprises an animated avatar of the speaker, wherein the animated avatar uses at least one expression from the at least one subset of similar expressions.

A second method for performing the concepts disclosed herein can include: receiving, at a computer system from a user, a plurality of slide elements to be used in an animated presentation; summarizing, via at least one processor of the computer system executing a neural network, the plurality of slide elements, resulting in a summarization; processing, via the at least one processor of the computer system, the plurality of slide elements and the summarization, resulting in a plurality of slide recommendations, the plurality of slide recommendations comprising at least one animated avatar; providing, via a display of the computer system, the plurality of slide recommendations to the user; receiving, at the computer system from the user, a slide selection from among the plurality of slide recommendations; and generating, via the at least one processor based on the slide selection, a slide containing an animation using the at least one animated avatar, wherein the slide comprises the plurality of slide elements.

A third method for performing the concepts disclosed herein can include: receiving, at a computer system from a user, first inputs for a first slide, wherein the first slide, when rendered, will comprise an animation; receiving, via at least one processor of the computer system, a notification to begin rendering the first slide; rendering, via the at least one processor based on the notification, the first slide, resulting in a rendered first slide comprising the animation, wherein the rendering comprises: identifying, via the at least one processor, a plurality of portions of the first inputs; separately rendering, via the at least one processor, each portion of the plurality of portions, resulting in a plurality of sub-rendered portions; and combining, via the at least one processor, the plurality of sub-rendered portions together, resulting in the rendered first slide.

BRIEF DESCRIPTION OF THE DRAWINGS

FIG. 3A illustrates an example table aligning sentiments and teaching actions to determine speaker expressions;

FIG. 13B illustrates an example of automatic pause generation using AI;

FIG. 19 illustrates an example of a questionnaire which may be provided to find a student's learning score and content which may be recommended based on the student's learning style;

FIG. 23 illustrates an example wherein a sidekick may mention trivia during a lesson;

FIG. 24 illustrates an example of a sidekick profile document;

FIG. 27 illustrates an exemplary equation for term frequency;

FIG. 28 illustrates an equation for inverse document frequency;

FIG. 29 illustrates an exemplary equation for synset frequency;

FIG. 30 illustrates an exemplary equation for term relevancy;

FIG. 34 illustrates an example of inputs which can be used for fine tuning;

FIGS. 39A and 39B illustrate an example of providing different quality previews to increase rendering speed;

FIG. 40E illustrates an example of sub-dividing text into distinct portions for rendering;

FIG. 41 illustrates an example flow chart for improving the user experience during rendering;

FIG. 62A illustrates an example first step of a user creating slides and narration;

FIG. 65 illustrates an example formula for of using cosine similarity to measure the distance between two vectors;

FIG. 66 illustrates an example formula for measuring Euclidean distance between two vectors;

FIG. 68 illustrates an example of using Principal Component Analysis (PCA) to determine a library of facial expressions;

FIG. 69 illustrates an example flowchart for using PCA;

FIG. 71 illustrates an example of developing facial expressions for a specific speaker;

DETAILED DESCRIPTION OF THE INVENTION

Figure 1:
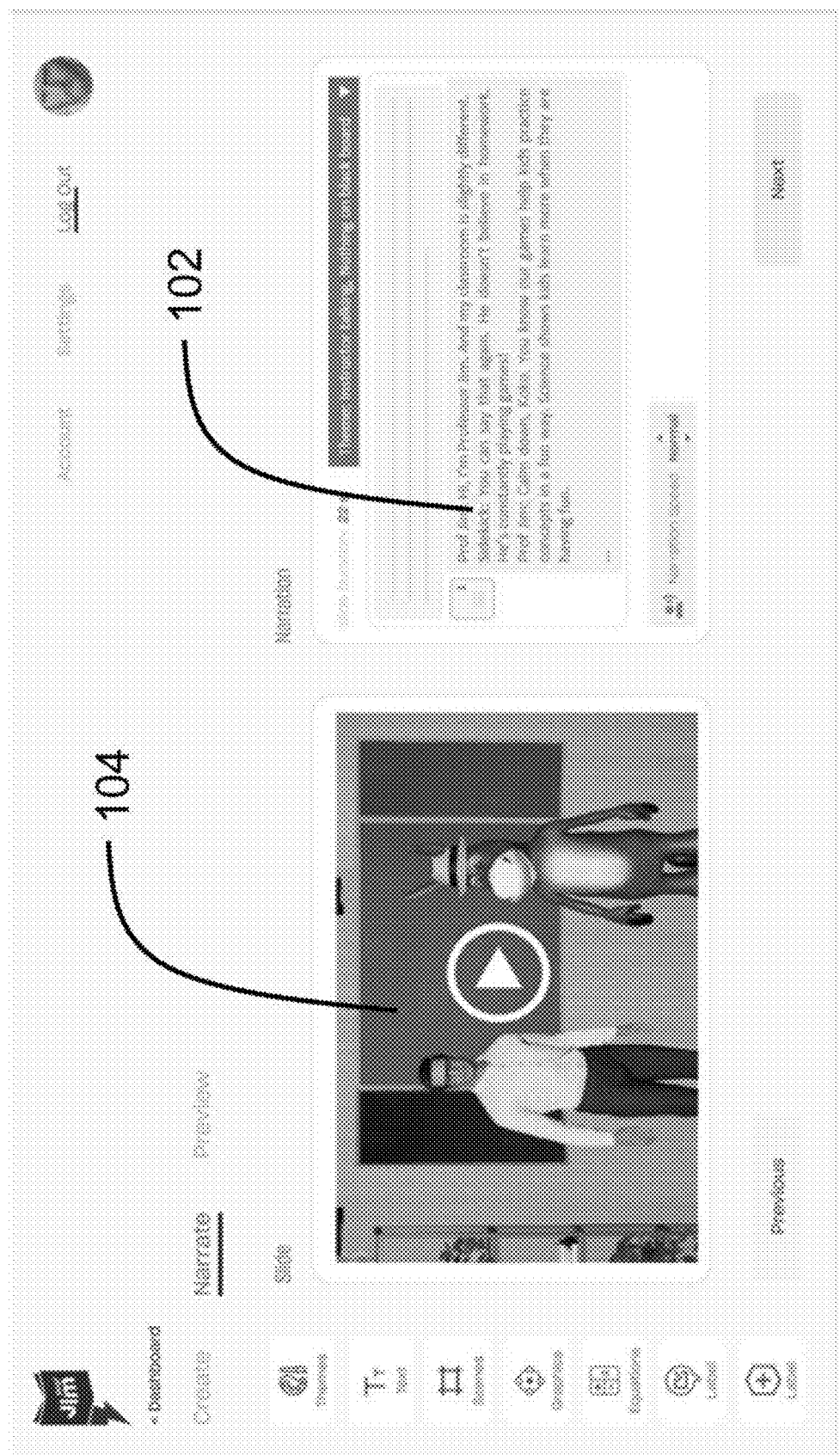
FIG. 1 illustrates an example of a speaker entering text that may be automatically converted to animation.

Embodiments of the present invention are now described with reference to the drawing figures. Persons of ordinary skill in the art will appreciate that the description and figures illustrate rather than limit the invention and that in general the figures are not drawn to scale for clarity of presentation. Such skilled persons will also realize that many more embodiments are possible by applying the inventive principles contained herein and that such embodiments fall within the scope of the invention which is not to be limited except by the appended claims.

The present patent application describes technology to assist speakers (such as teachers) with creating engaging online learning videos. Many online learning courses today are poorly made. Students find the content unengaging. Some of the challenges today include: (1) When slides are presented to students, the speaker image often becomes very small and it is hard to follow the speaker; (2) Lighting around a speaker is frequently bad; (3) Many speakers are not expressive on video and do not look at their camera when teaching; (4) Speakers often don't have the design skills to create good looking slides; and (5) What speakers say during teaching is frequently made up at the spur of the moment, and is not as impactful as it could be. Technologies that can address these and other challenges with online learning would be helpful.

Software to Convert Teaching Text to 3D Animation

FIG. 1 illustrates an example of a speaker entering text that may be automatically converted to animation. A speaker may enter text input in an interface, such as, for example 102. Text-to-animation software may automatically convert the material into an animation video or some other animation. Video 104 is depicted as an example. Text-to-speech technology may be utilized during the creation of video 104.

Figure 2A:
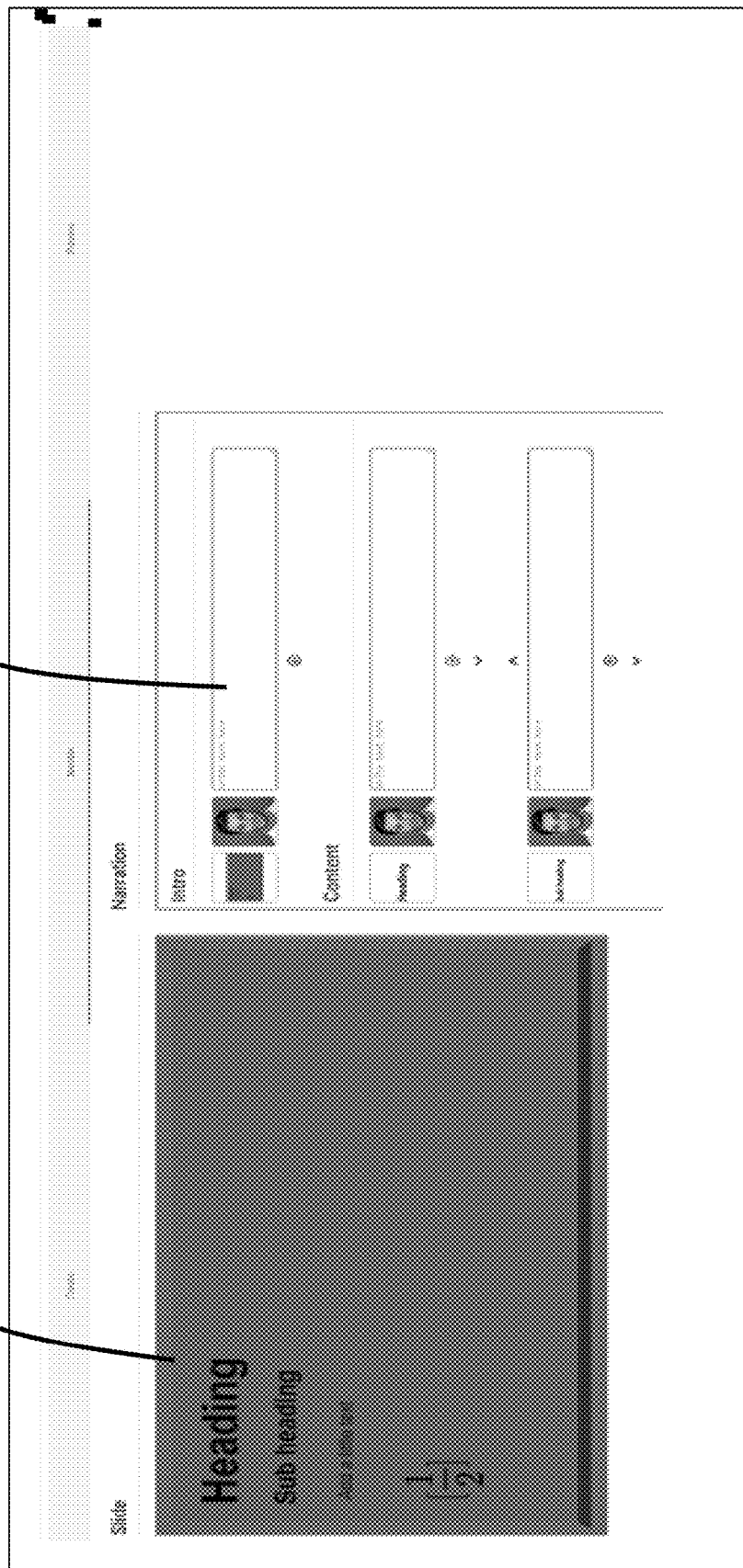
FIGS. 2A, 2B, 2C, and 2D are illustrations of text-to-animation text boxes and associated animations.
Figure 2B:
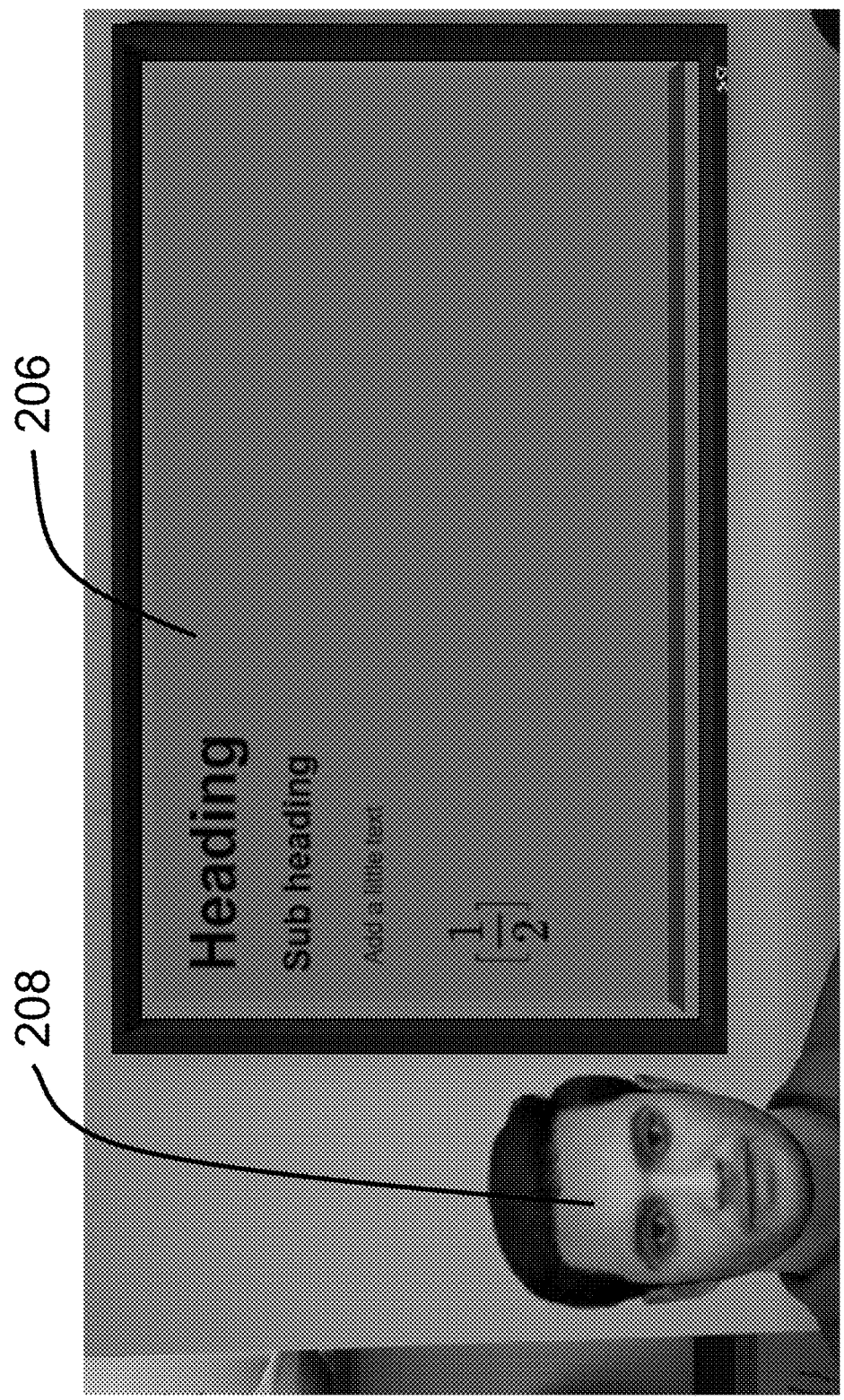
Figure 2C:
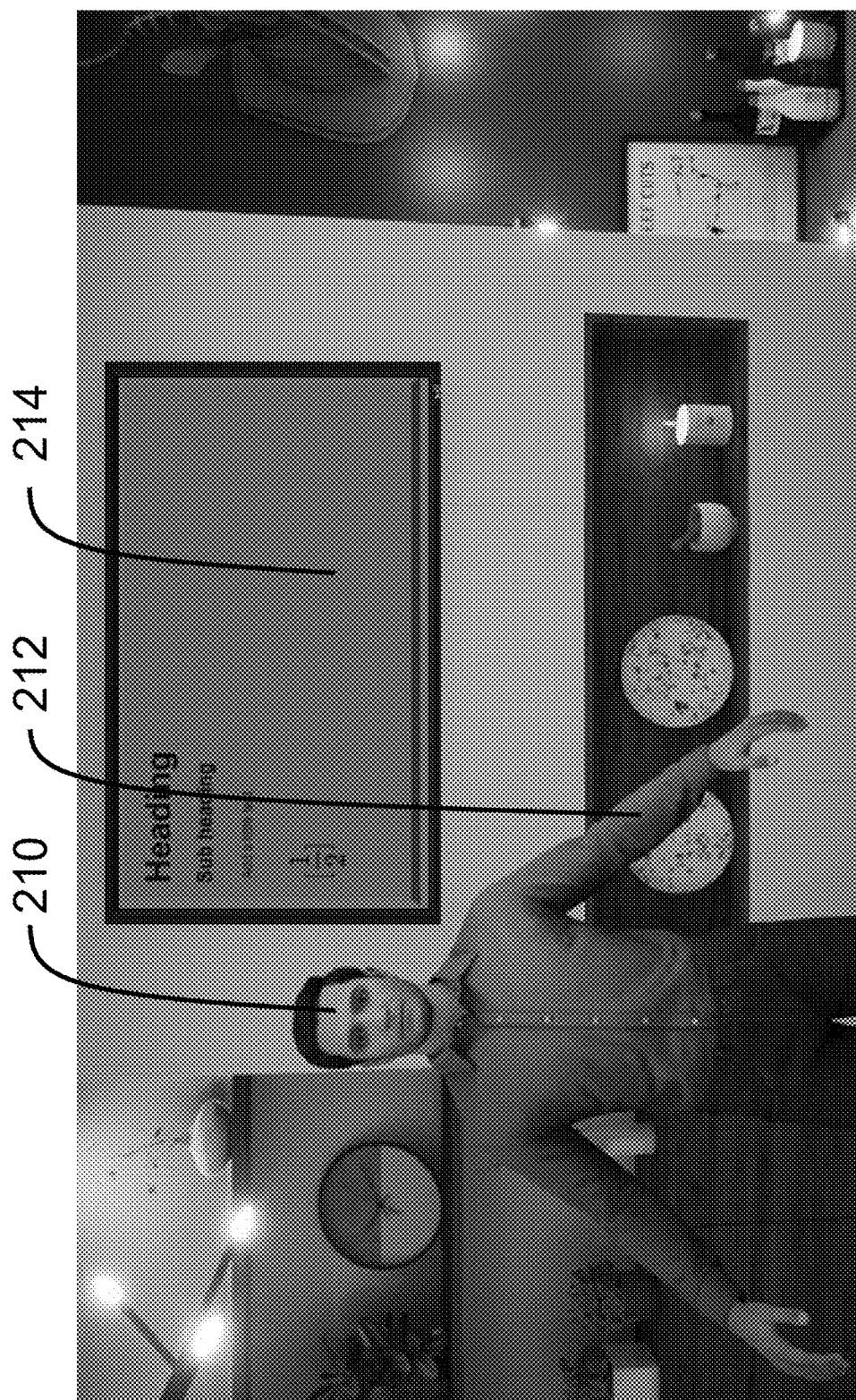
Figure 2D:

The text may be entered in the form of narration text 202 which one or more speakers in the video may say, as the exemplary illustration in FIG. 2A depicts. And in addition, the text may be entered in the form of content in slides 204. The animation video generated may have just the speaker's face 208 and optionally slides 206, as depicted in FIG. 2B. Alternatively, the animation video may have the hand gestures 212, facial expressions 210, and/or optional slides 214, as depicted in FIG. 2C. Alternatively, the animation video may have the full body of one or more speakers 216 and optional slides 218, as depicted in FIG. 2D. These examples are non-limiting, and combinations and/or variations of the illustrated examples are equally within the scope of this disclosure.

Figure 3B:
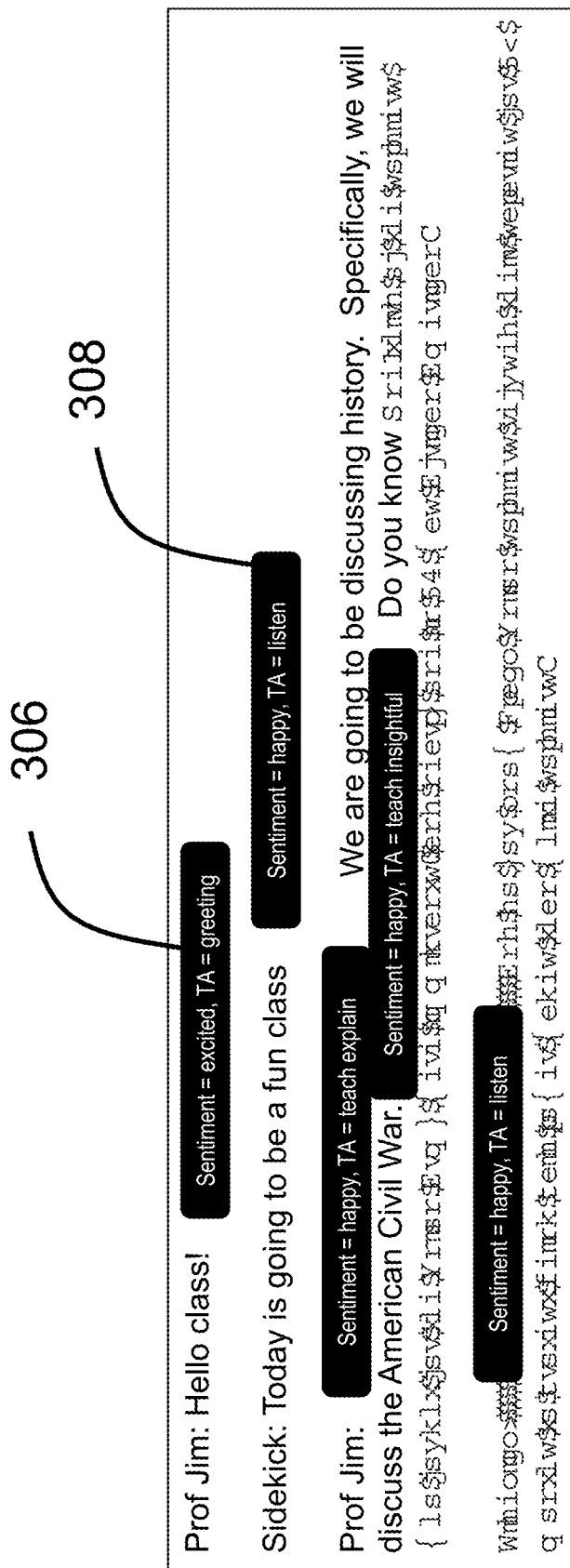
FIG. 3B illustrates an example of sentiments and teaching actions embedded into text.
Figure 3C:
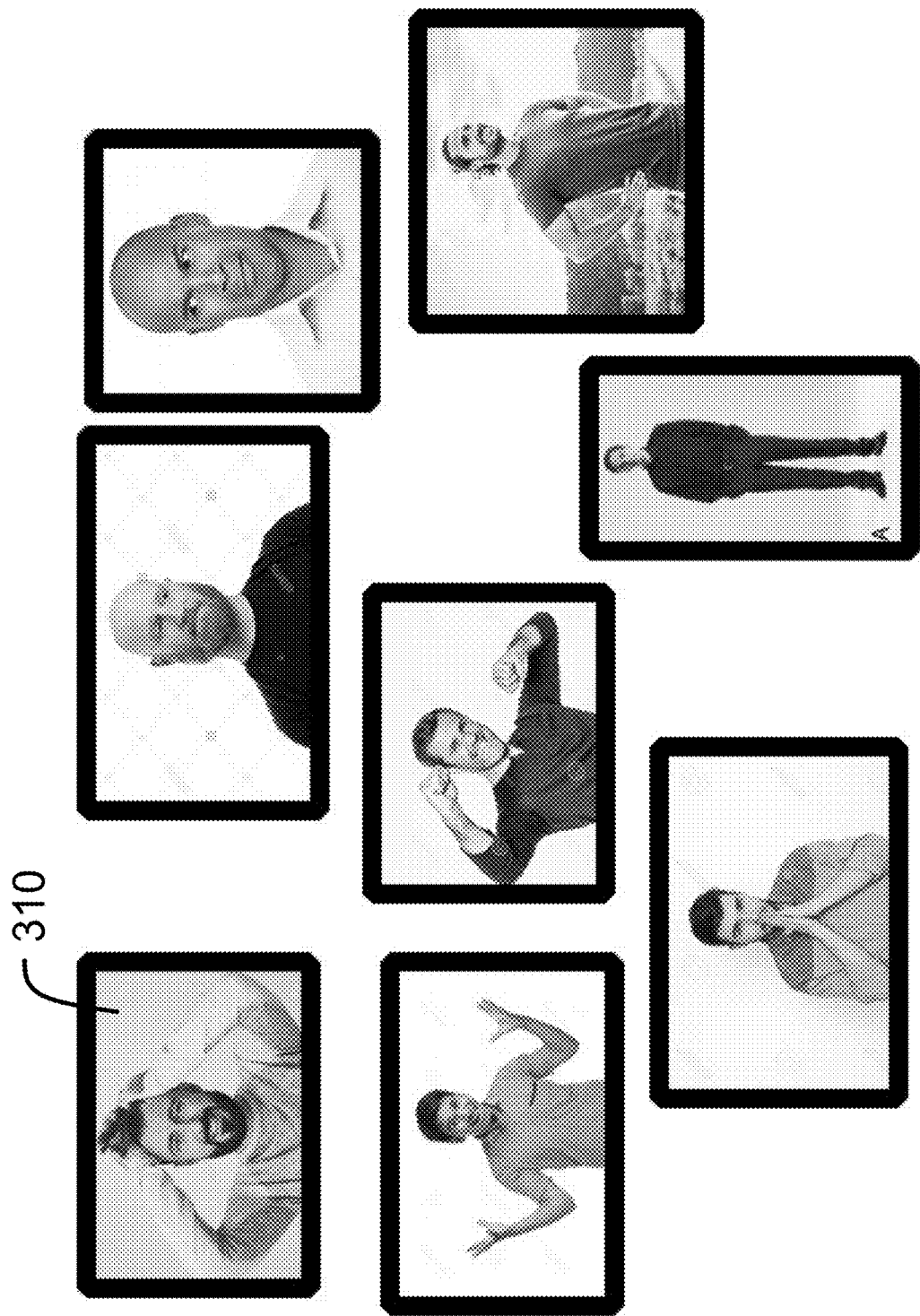
FIG. 3C illustrates a portion of a pose library, where poses correspond to states.

FIGS. 3A-3C illustrate generation of speaker expressions for the text-to-animation based on a sentiment 304 as well as a teaching action 302. Speaker expressions may include facial expressions, hand gestures, body expressions, and/or other physical attributes of a speaker. A speaker may be involved with actions such as, for example, "teach explain", wherein a concept is explained, "teach insightful" wherein something insightful is taught, "teach unsure" where they are unsure about something, "listen" where they may listen to something a student or another speaker says, "greet" where they greet a class, and so on. These actions may be performed with different sentiments such as, for example, those depicted in FIG. 3A, where a given combination of sentiment and teaching action results in a particular state. Every combination of sentiment and teaching action may be referred to as a state. The entered text for teaching may have sections with different sentiments and teaching actions. For example, FIG. 3B illustrates where multiple combined sentiments and teaching actions 306, 308, 310 are depicted within the body of the text. FIG. 3C illustrates a portion of a pose library, where poses corresponding to states depicted in FIG. 3A may be depicted. Pose 310, for example, may fit state 38 depicted in FIG. 3A, which may reflect a teaching action of "teach unsure" and a very negative sentiment. Similarly, other poses in the pose library may be mapped to their own unique states. Depending on the state required for a certain section of the text, one or more poses mapped to that state may be used for that section of the animation video. While some pictures in the pose library portion depicted in FIG. 3C have just facial expressions, the pose library may have hand gestures, feet movement, and movement of other body parts. The examples of facial expressions, hand gestures, feet movement, other body parts, etc., are non-limiting, and combinations and/or variations of such examples or similar pictures which can convey emotions, sentiments, and/or other feelings are equally within the scope of this disclosure.

An AI to Figure Out a Speaker's Actions and Emotions Based on Entered Text from a Speaker While FIG. 3B illustrates an example of a speaker entering the required sentiment and teaching action, the sentiment and teaching actions may also be determined automatically using one or more neural networks. The neural network(s) may be trained based on general purpose teaching content, teaching content specific to that subject, and/or using plain text and/or videos. Sentiment analysis may be performed using a sentiment detection algorithm, which identifies the sentiments associated with a body of text and/or video. The sentiment analysis neural network may be fine tuned based on teaching content related to what's being taught. A second neural network may be used to determine teaching action. The teaching action may be determined partially based on text entered for the lesson—for example, based on the text entered, one can determine if a speaker is "teaching" themselves or "listening" to someone else talk.

Figure 4A:
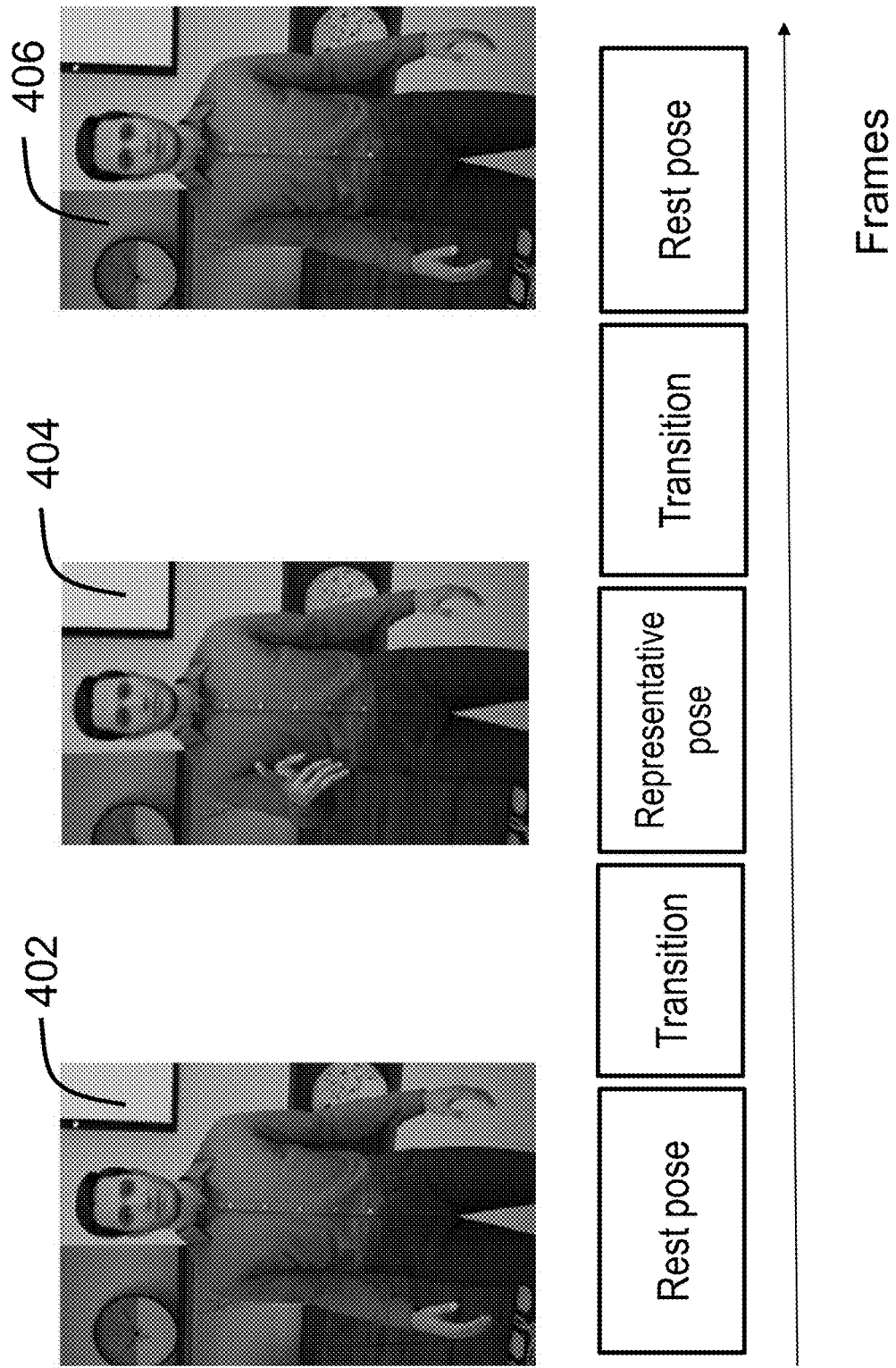
FIGS. 4A and 4B illustrate an example of a speaker in an animation video which may smoothly transition from one state to another using rest poses as intermediaries.
Figure 4B:
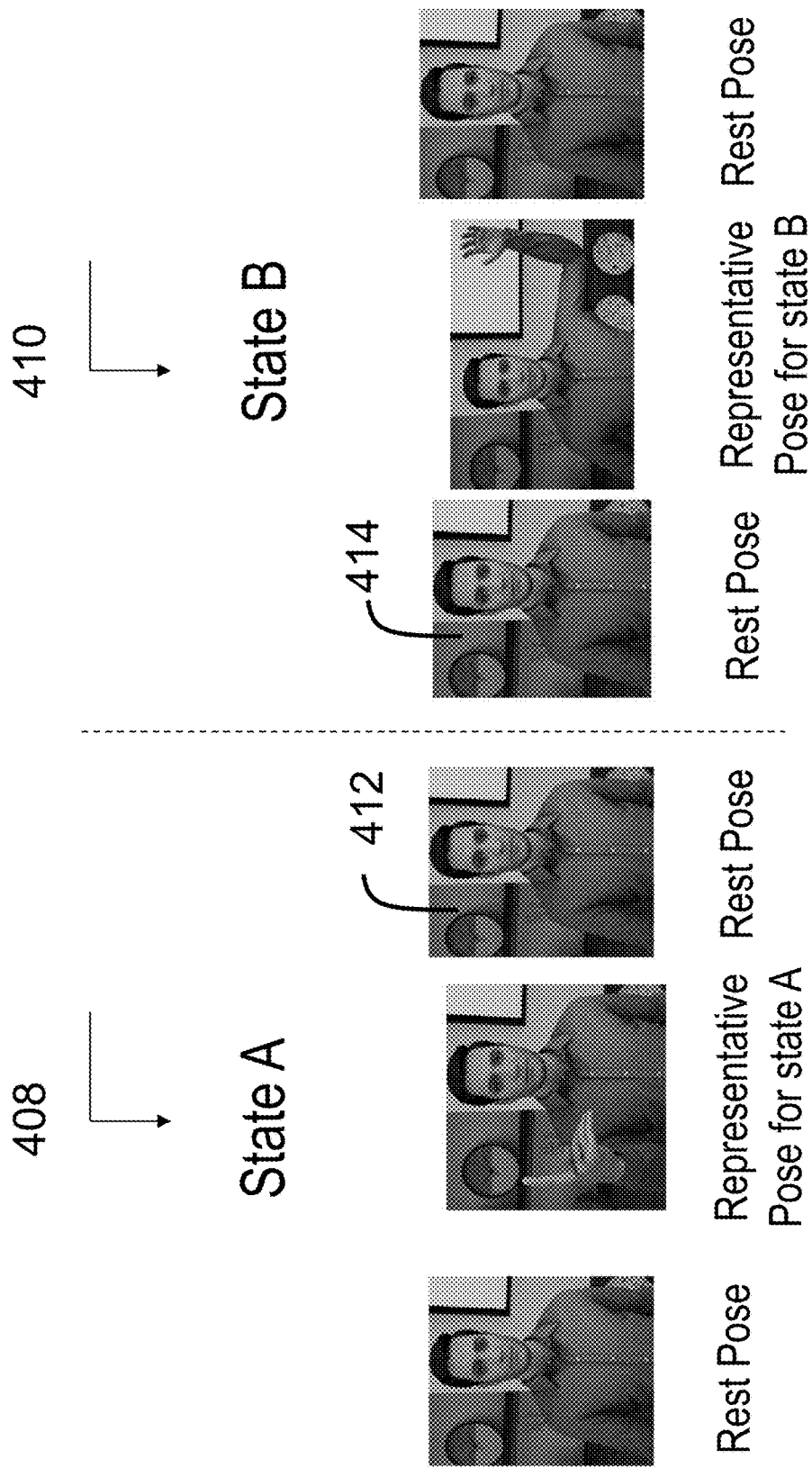

Stitching Poses Recorded Using Motion Capture (for Example) for Teaching Applications FIGS. 4A and 4B illustrate an example of a speaker in an animation video which may smoothly transition from one state to another using rest poses as intermediaries. FIG. 4A illustrates an example of speaker expressions during a state depicted in FIG. 3A. A speaker may start from a "rest pose" 402. Following a section of time (referred to as "rest pose time"), the speaker may transition to a pose representative of that state 404. Following that state 404, the speaker may enter a subsequent "rest pose" 406. This sequence of rest pose 402, representative pose 404, and subsequent rest pose 406 may be generated based on a motion capture recording. Alternatively, the sequence may be generated in an automated manner based on selection of the representative pose 404. In some configurations, such as that illustrated, the rest pose 402 and the subsequent rest pose 406 can be identical poses. However, in other configurations, the animation video may have multiple rest poses, such that the speaker/teacher/avatar does not return to a single common rest pose, but rather one of multiple poses, allowing for a less robotic, more natural feel. In addition, in some cases the order can vary, such that multiple representative poses 404, or multiple rest poses 402, follow one another. For example, a state may have multiple representative poses for that state placed one after another. In such cases, the multiple rest poses may not be identical, such that the animated speaker continues moving.

FIG. 4B illustrates an example of how a speaker may transition from one state 408 to the next state 410 using rest poses as intermediaries to allow smooth transitions from one state to the next. The rest poses and camera angles, according to an embodiment to this invention, may be carefully chosen by the computer processor such that even if the motion capture recording has rest pose 412 looking slightly different from rest pose 414 (as far as position of the hands goes, for example), the animation video may still look smooth and professional when these rest poses are placed right after each other. An example of a good rest pose for teaching may be hands placed on the speaker's sides. An example of a good camera view may be a waist-up view.

Figure 5:
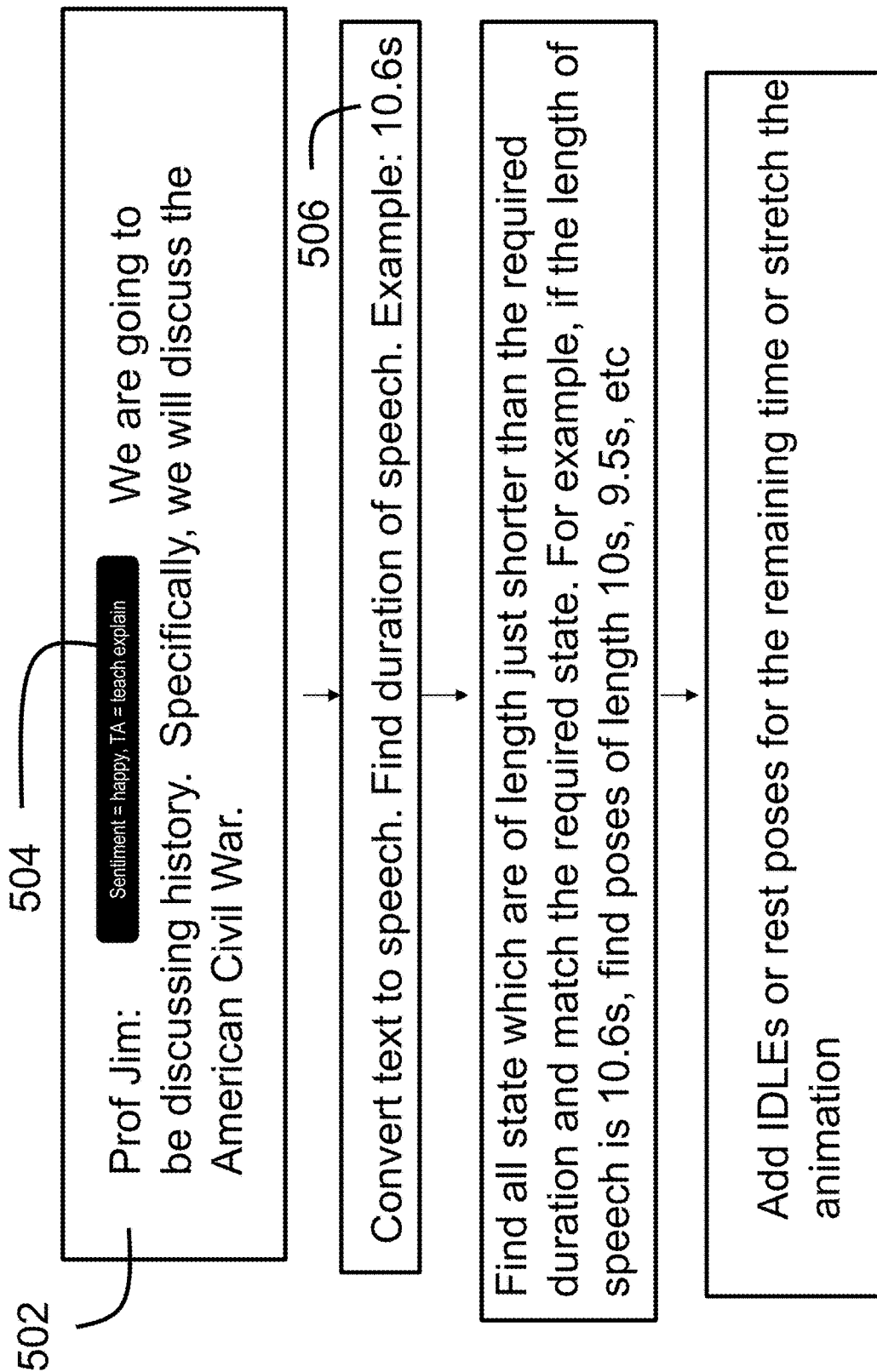
FIG. 5 illustrates an example process for utilizing the transitions depicted in FIG. 3-4.

FIG. 5 illustrates an example process for utilizing the transitions depicted in FIG. 3-4. For a certain text 502 given by the speaker, having a state 504, text may be converted to voice-only speech. The duration of the voice 506 may be found. Following that, all state animations of duration lower than 506 may be found. An appropriate state animation may be chosen based on various considerations. The difference in time between the duration of voice-only speech and the duration of the state animation may be compensated by adding rest poses, idle animations, and/or by stretching the length of the state animation.

Stitching Poses and Holding Poses Using AI

Figure 6:
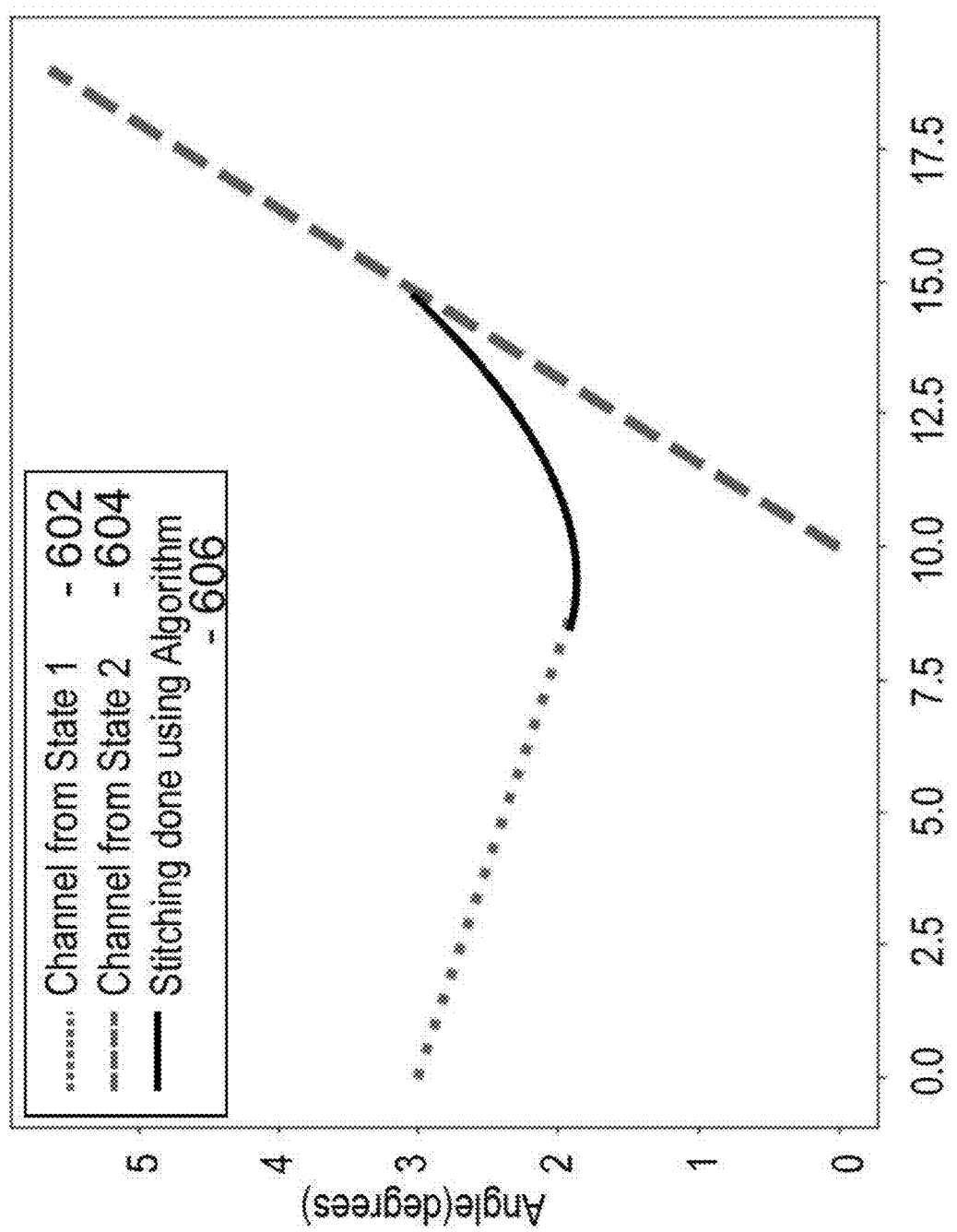
FIG. 6 illustrates an example of a transition from one pose to another being controlled using an algorithm.

Human body animation illustrates the movement of multiple joints in a human skeleton. Each joint has multiple channels—i.e., translation in x, y, and z axes, and rotation in the x, y, and z axes. FIG. 6 illustrates an example of a transition (also referred to as stitching) from one pose to another being controlled handled using an algorithm. In the example shown in FIG. 6, a channel 602 from a first state is stitched to a channel 604 from a second state using an algorithm. This may reduce the burden of motion capture recordings for rest poses, and may also allow more realistic looking transitions where rest poses may be eliminated. An algorithm may also be used for holding a certain representative pose for a duration of time. For example, if a representative pose requires a speaker to point his or her index finger at the audience for five seconds, it may look unrealistic to not move the finger even a little bit for those five seconds. To correct for this situation an algorithm may be used to move the finger slightly. The algorithm can, for example, make use of a recurrent neural network to perform the stitching.

Figure 7:
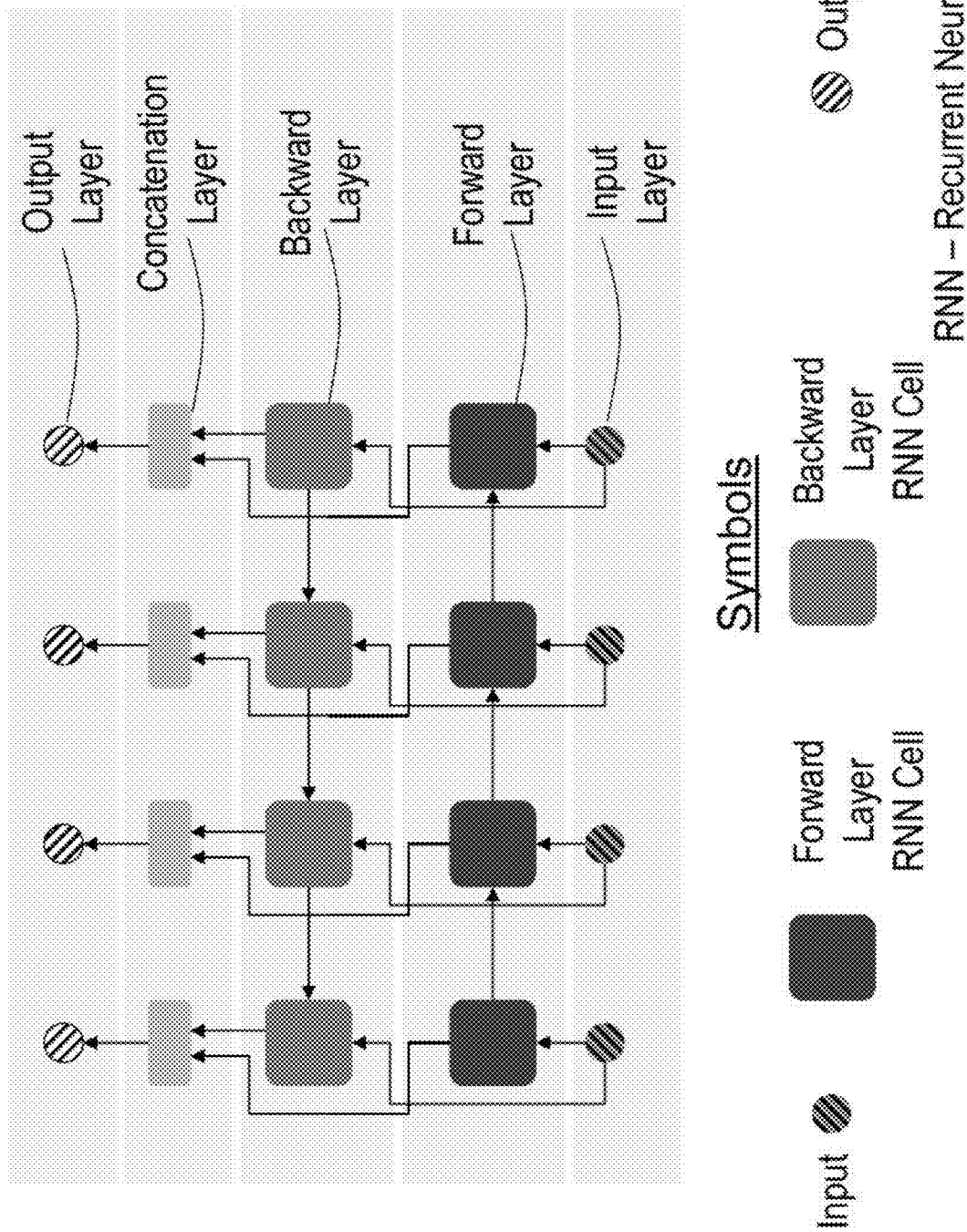
FIG. 7 illustrates an example multilayered bidirectional neural network.
Figure 8:
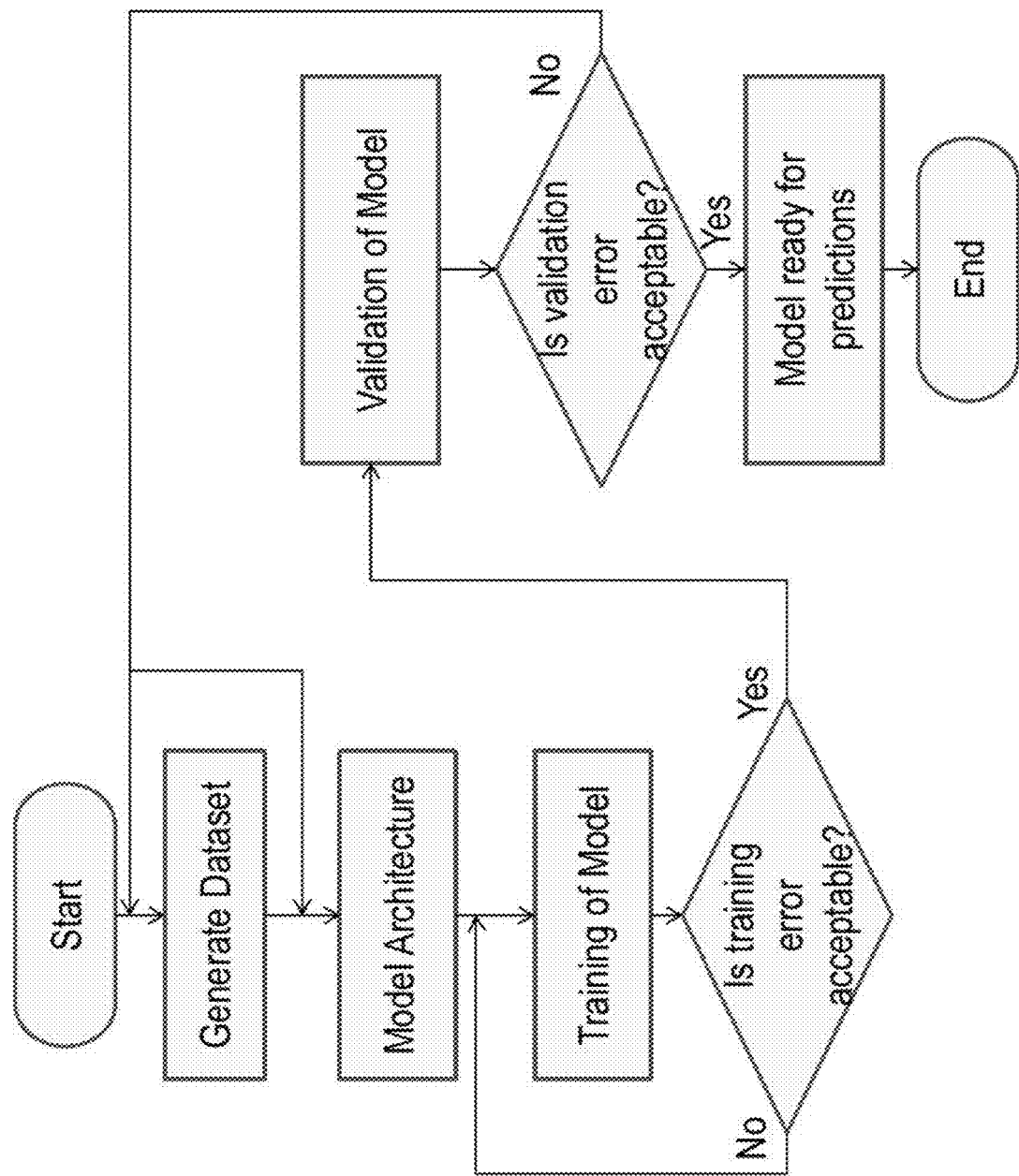
FIG. 8 illustrates a flowchart of various processes used for training of the model.

FIG. 7 depicts a multilayered bidirectional recurrent neural network model which may be used to assist with the stitching process, the multilayered bidirectional recurrent neural network model created using gated recurrent unit (GRU) cells and long short-term memory (LSTM) cells. The recurrent neural network model may be trained with a mean square error as the loss function and a stochastic gradient descent optimizer. The number of iterations in the model for training for may increased till the training loss is acceptable. FIG. 8 illustrates a flowchart of various processes used for training of the recurrent neural network model. The recurrent neural network model may be trained based on stitching poses and holding poses from motion capture recordings, other sources such as videos of speakers talking and so on. Videos based on speakers talking may be combined with pose recognition algorithms. Persons skilled in the art will recognize that several pose recognition algorithms may be feasible for this application. The model architecture may be optimized as well based on trial and error, or iterations based on what leads to an acceptable training error. Following achievement of an acceptable training error, the model may be validated using a validation data set. Once the validation data set provides an acceptable error, the model may be used for predictions. During the training and validation processes, the model may consider factors such as skeleton size of the character used for training and the character used for the speaker in the animation video. Retargeting may also be carried out using various algorithms.

Train Face and Hand Gestures with an AI Based on Pre-Existing Videos

Figures 9A, 9B:
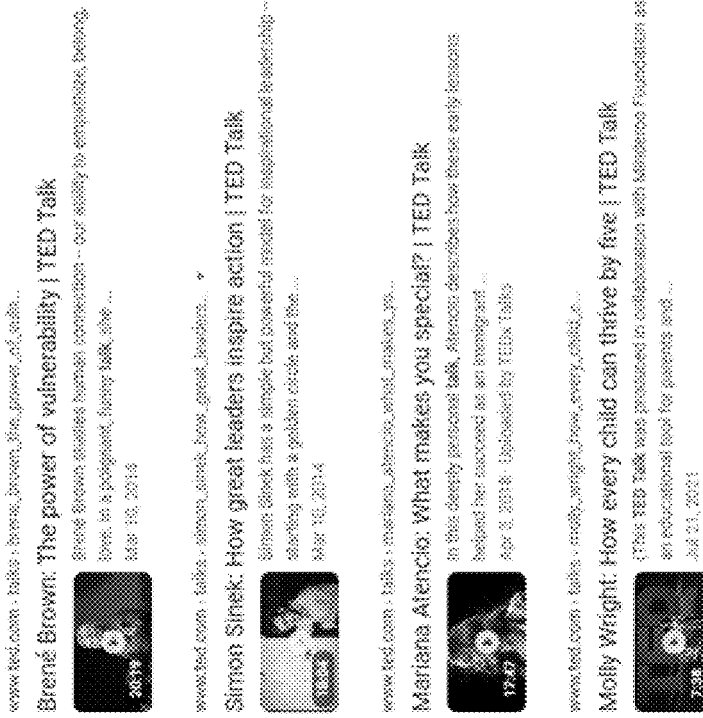
FIG. 9A illustrates an example of creating a speaker profile.
FIG. 9B illustrates an example of how videos of speakers with similar speaker profiles may be used for training data of a neural network, where the neural network can be used to determine representative poses for various states.

FIG. 9A illustrates an example of creating a speaker profile. The speaker profile may indicate various things, such as, for example, the speaker's personality, their teaching style, their native place, speaking speed, exuberance, and other parameters. Based on these parameters, the text-to-animation may be tuned differently. The example characteristics may be expanded upon or removed/reduced depending on the specific needs of a given system, or based on the specific ways in which the speaker will be communicating.

FIG. 9B illustrates an example of how videos of speakers with similar profiles may be used for training data of a neural network, where the neural network can be used to determine representative poses for various states. Transitions between representative poses may also be determined by neural networks trained based on videos. Animations for the time spent in the representative pose may also be determined by neural networks trained based on videos.

Figure 10:
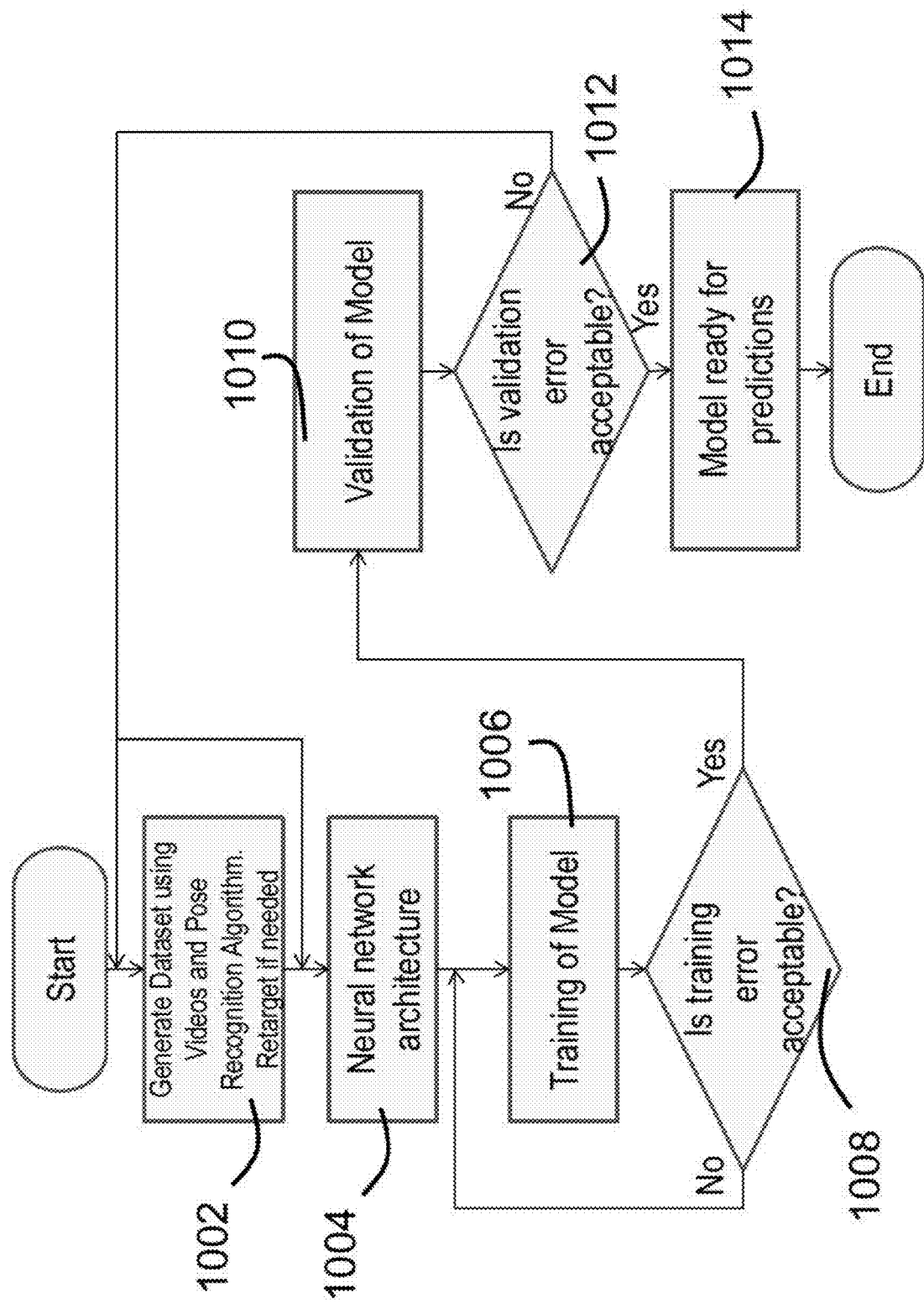
FIG. 10 illustrates an example process of using recorded videos to predict representative poses for states, transitions between states, and/or animations for holding a representative pose.

FIG. 10 illustrates an example algorithm of using recorded videos to predict representative poses for states, transitions between states, and/or animations for holding a representative pose. The pose recognition algorithm can generate, based on the input videos, a training dataset for body animation motions as indicated in step 1002. The system can perform retargeting so that different skeleton types all lead to useful data. Following that, neural network architecture may be determined, in step 1004, for example. The neural network can, for example, use recorded videos to predict representative poses for states, transitions between states, and/or animations for holding a representative pose. For example, the neural network can receive input text which is translated into body animation motions. Body animation motions may be represented as coordinates, trajectories, or some other representation for various bones and points on the character's body, for example.

Figure 11:
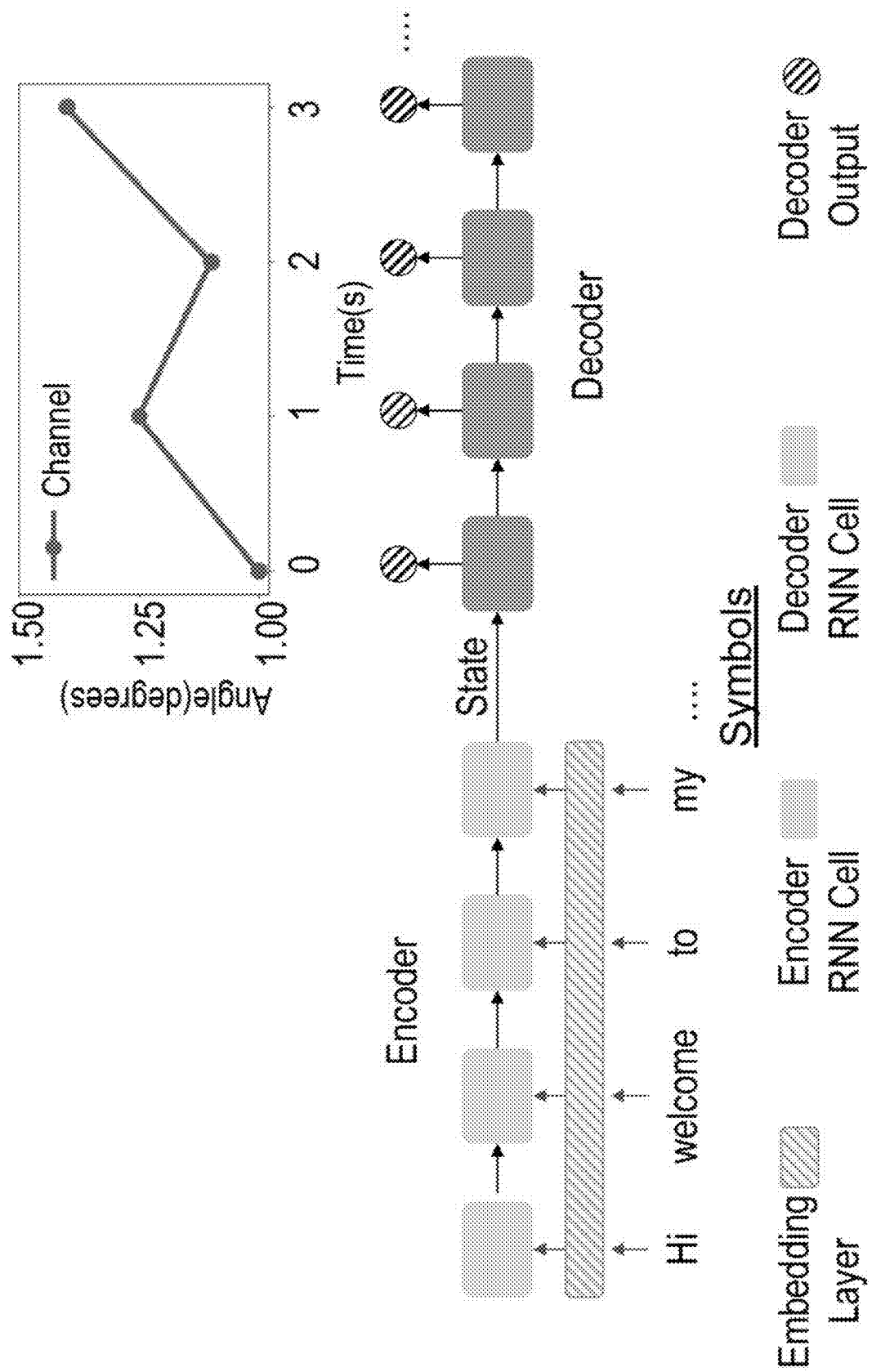
FIG. 11 illustrates an example of using recorded videos to predict representative poses for states, transitions between states, and/or animations for holding a representative pose.

FIG. 11 shows an example of a neural network model. A multilayered encoder decoder model with recurrent neural network cells may be trained for predicting body poses from text spoken by the character. The input text may be passed through a pretrained embedding layer converting each word into a vector. The recurrent neural network cells in the encoder and decoder may be created using long short term memory (LSTM) and gated recurrent unit (GRU) cells. The recurrent neural network model may be trained with mean squared error as loss function and/or with Stochastic Gradient Descent optimizer. Returning to FIG. 10, the number of iterations of training the recurrent neural network 1006 may be adjusted until an acceptable training loss is reached in step 1008. The model may be validated using validation dataset in step 1010, if validation losses are high, model complexity may be changed and trained again. This cycle may be repeated till decent results are obtained in step 1012. The recurrent neural network model may then be ready for predictions in step 1014. In other configurations, several neural network algorithms may be used for the steps illustrated in FIG. 10 and FIG. 11.

Figure 12:
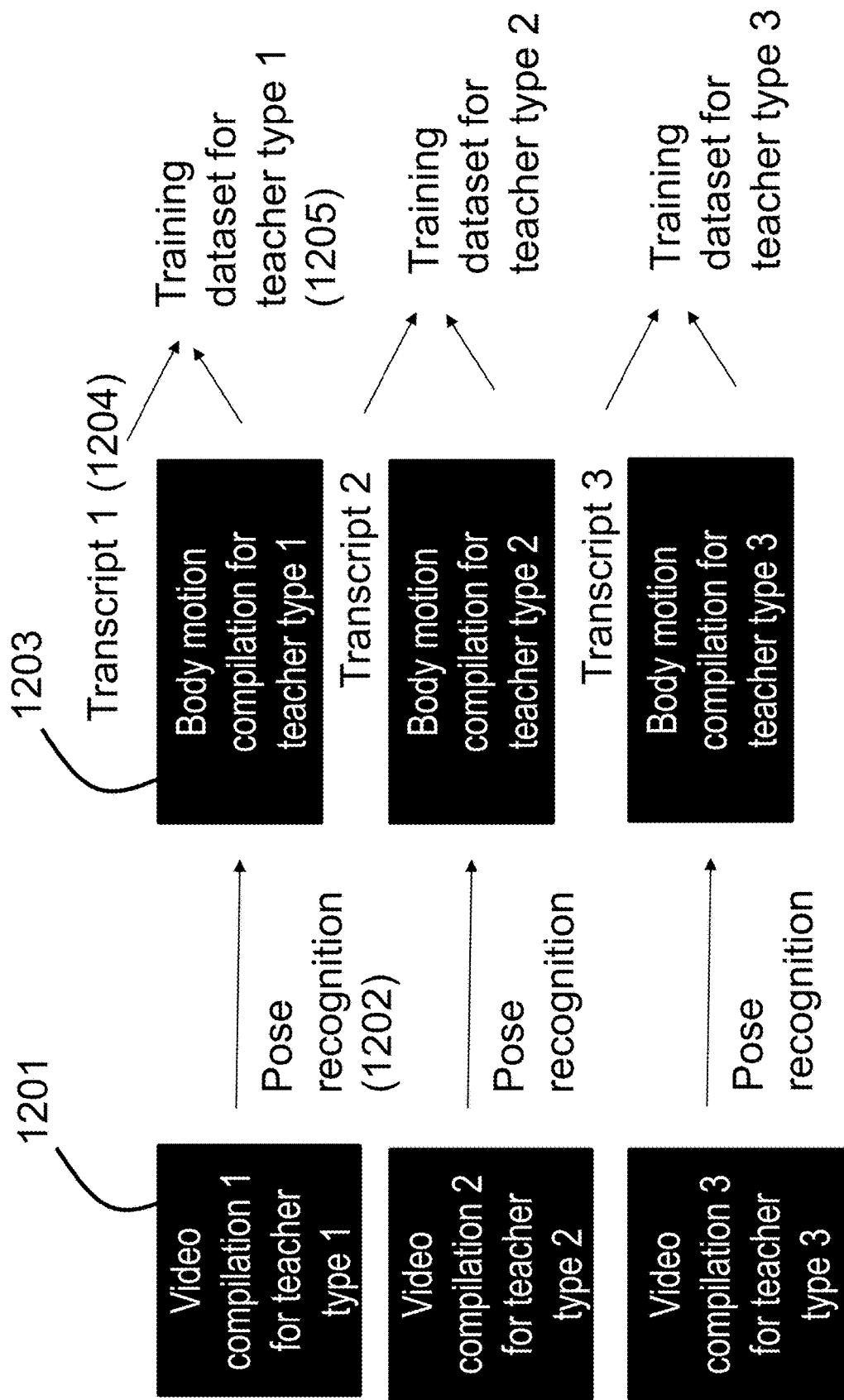
FIG. 12 illustrates an example of obtaining training data for body motions of a speaker.

Different speakers often have different mannerisms when it comes to body motions. FIG. 12 illustrates an example of obtaining training data for body motions of a speaker, such that a neural network may be trained with body motion data for a certain speaker type. A library of video 1201 of a certain speaker type may be compiled. Following that, pose recognition algorithms and software 1202 may be used to generate a collection of body motions 1203. Retargeting may be performed to account for different body shapes and sizes. Using that and a transcript of the speech, a training dataset for speaker type 1 1205 may be obtained. Following training of that neural network, new text provided to that neural network may generate body animation corresponding to that text. Similar methods may be used to generate body animations for other speaker types. For example, the training data for all speaker types may be merged into one big training database and used to train a neural network. The neural network output may be fine tuned based on training data for each speaker type. Techniques similar to the ones described in FIG. 12 for body animation may be used for facial expressions as well.

Automatic Camera Positioning Using AI

Figure 13A:
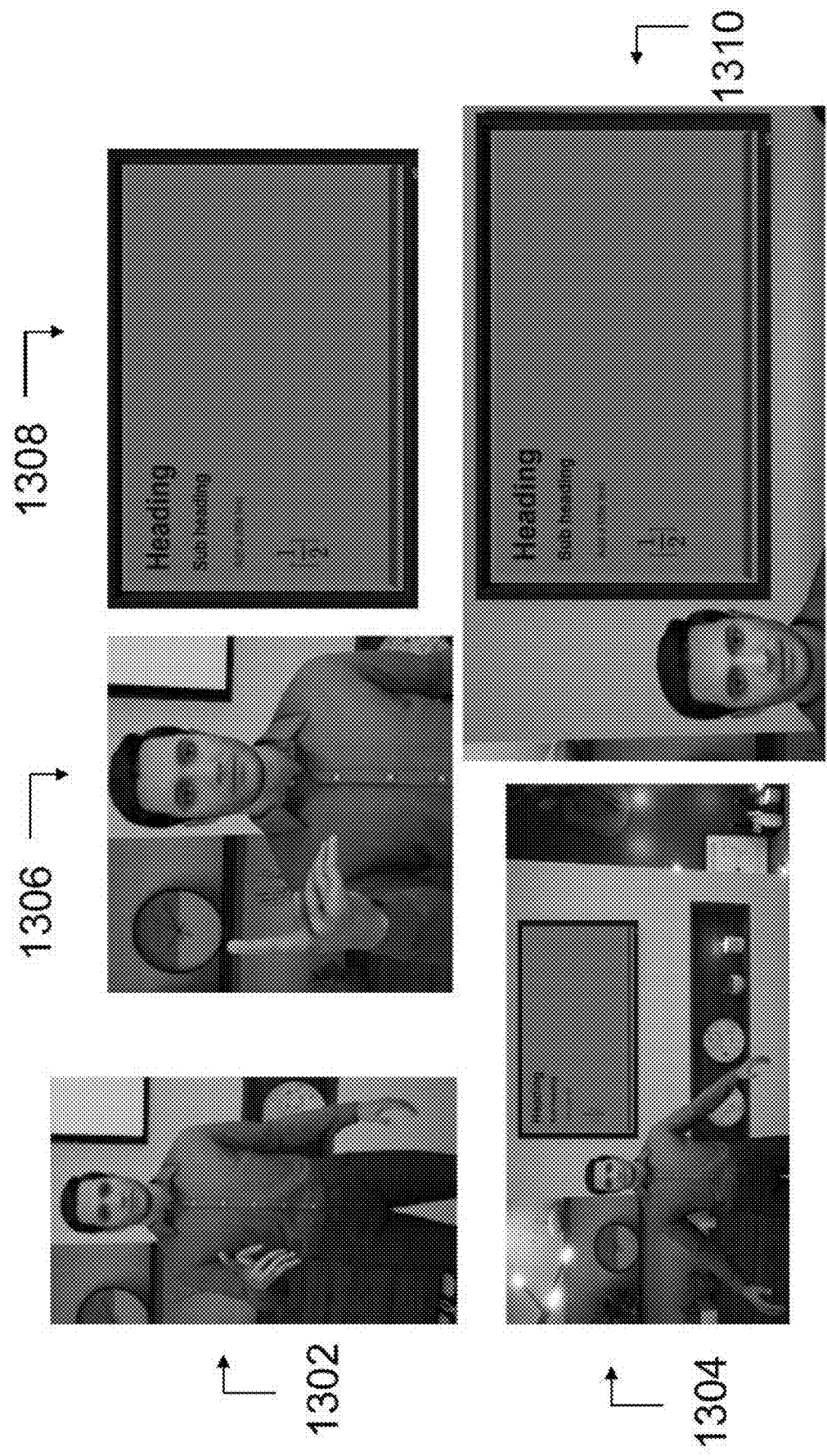
FIG. 13A illustrates an example of camera views which are automatically generated based on an algorithm.

FIG. 13A illustrates an example of camera views which are automatically generated based on an algorithm. The different camera views 1302, 1304, 1306, 1308, 1310, or other views, may be automatically generated based on an algorithm, which may be dependent on a neural network, where the camera view is further dependent on whether content on the slide is being referred to and/or based on other considerations. The neural network may be trained based on a few lessons or based on videos of teaching.

Automatic Pause Generation Using AI

FIG. 13B illustrates an example of automatic pause generation using AI. As illustrated, the pauses for speech may be automatically determined using an algorithm: (1) Fine training a general model with a speaker voice, and (2) using the model. The model may be a neural network. The algorithm may be further trained based on voices and transcripts in video and audio. The neural network may be fine-tuned further with data based on the specific voice being used. Following that, the model may be used to predict pauses in speech.

Mimicking a Classroom Experience

Figure 14:
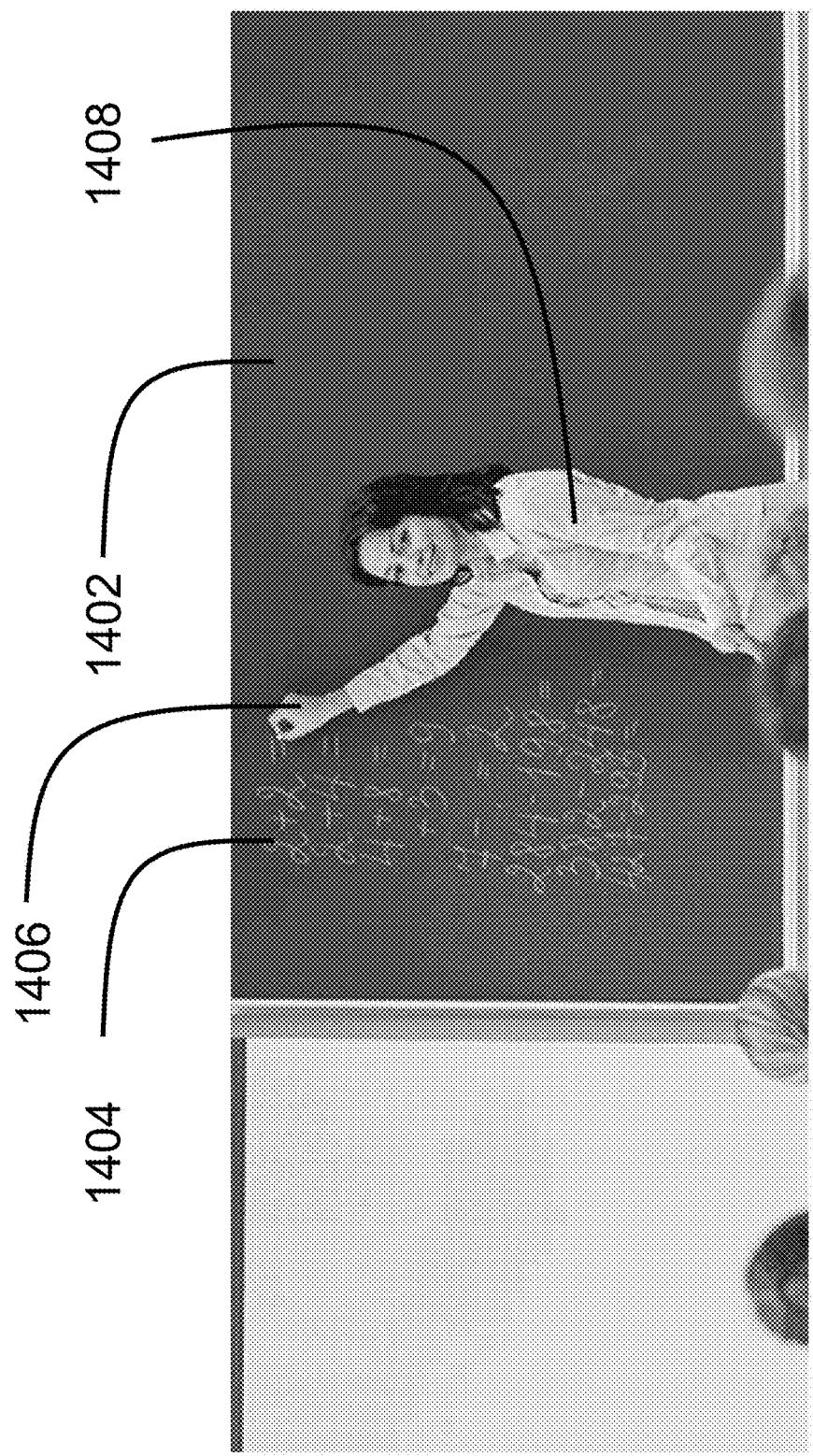
FIG. 14 illustrates an example of a regular classroom experience that may be mimicked.

FIG. 14 illustrates an example of a regular classroom experience that may be mimicked. Depending on the text to be written on the board 1402 by the speaker 1408 and the font 1404 to be used for writing, the speaker's hand 1406 may move on the board to write.

Creating and Utilizing Learning Profiles for Personalized Education

Figure 15:
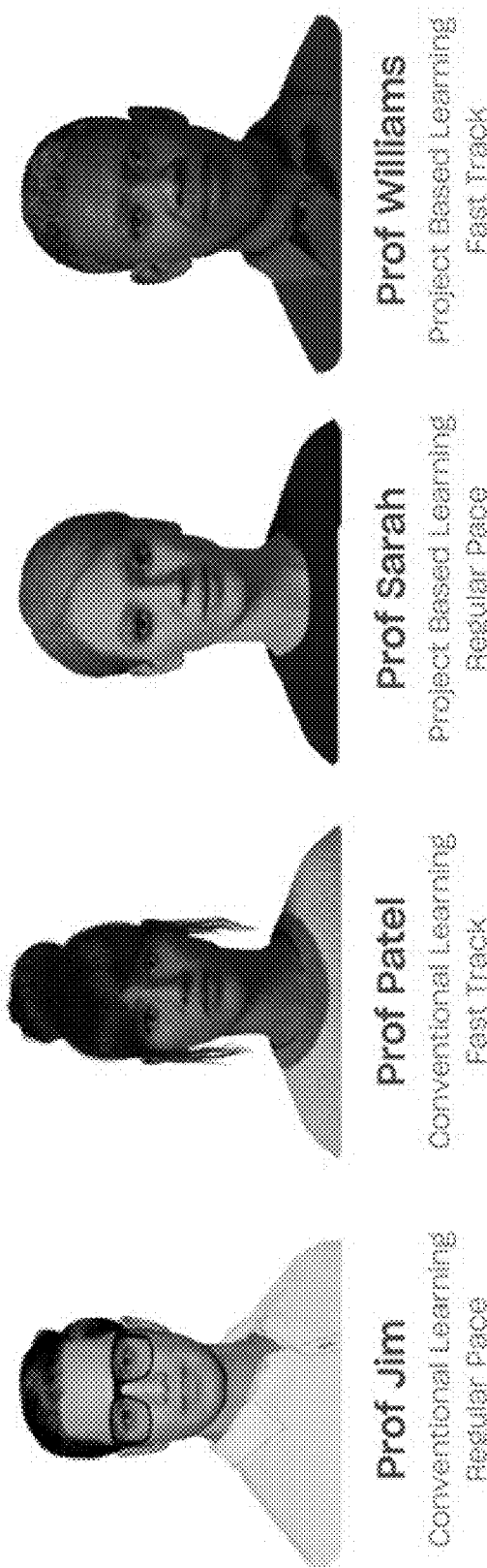
FIG. 15 illustrates examples of virtual speakers having various teaching styles.

Personalized teaching, where students get lessons based on their learning preferences, is a much sought-after goal in the education industry. FIG. 15 illustrates examples of virtual speakers having various teaching styles. However, generating such virtual speakers tends to be labor intensive. Systems configured as disclosed herein can reduce the effort needed to create personalized learning and to provide personalized learning in a more effective way.

Figure 16:
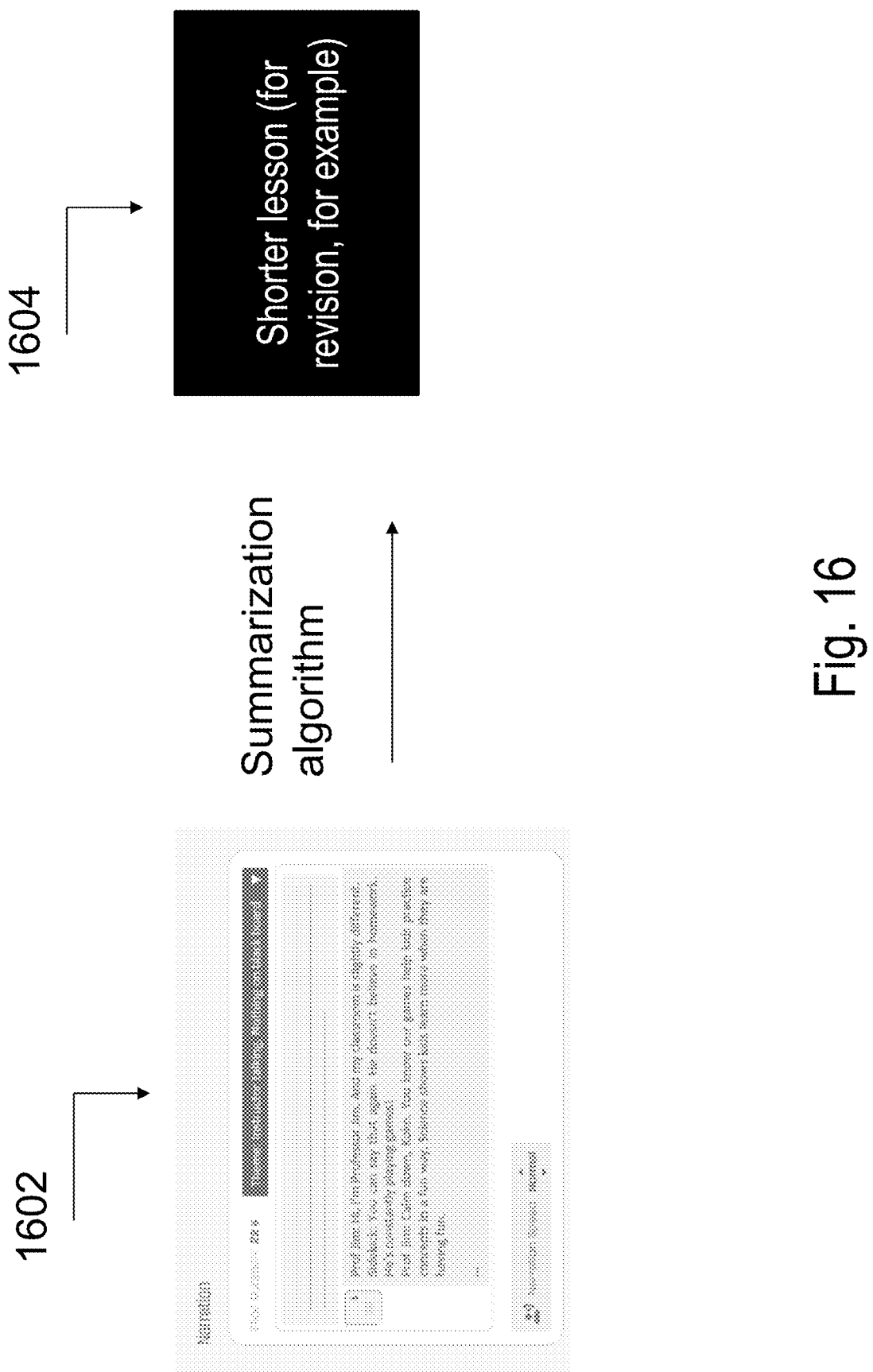
FIG. 16 illustrates an example where teaching text given for text-to-animation is shortened based on a summarization algorithm.

FIG. 16 illustrates an example where teaching text given for text-to-animation is shortened based on a summarization algorithm. When a speaker provides text and optionally slide material 1602 to create automated animation, an auto-summarization algorithm may run on the speaker's text and optional slides to create a shortened version 1604. The speaker may then review the summarized content and choose it if it is accurate. Different styles and types of summarization algorithms may be possible.

Figure 17:
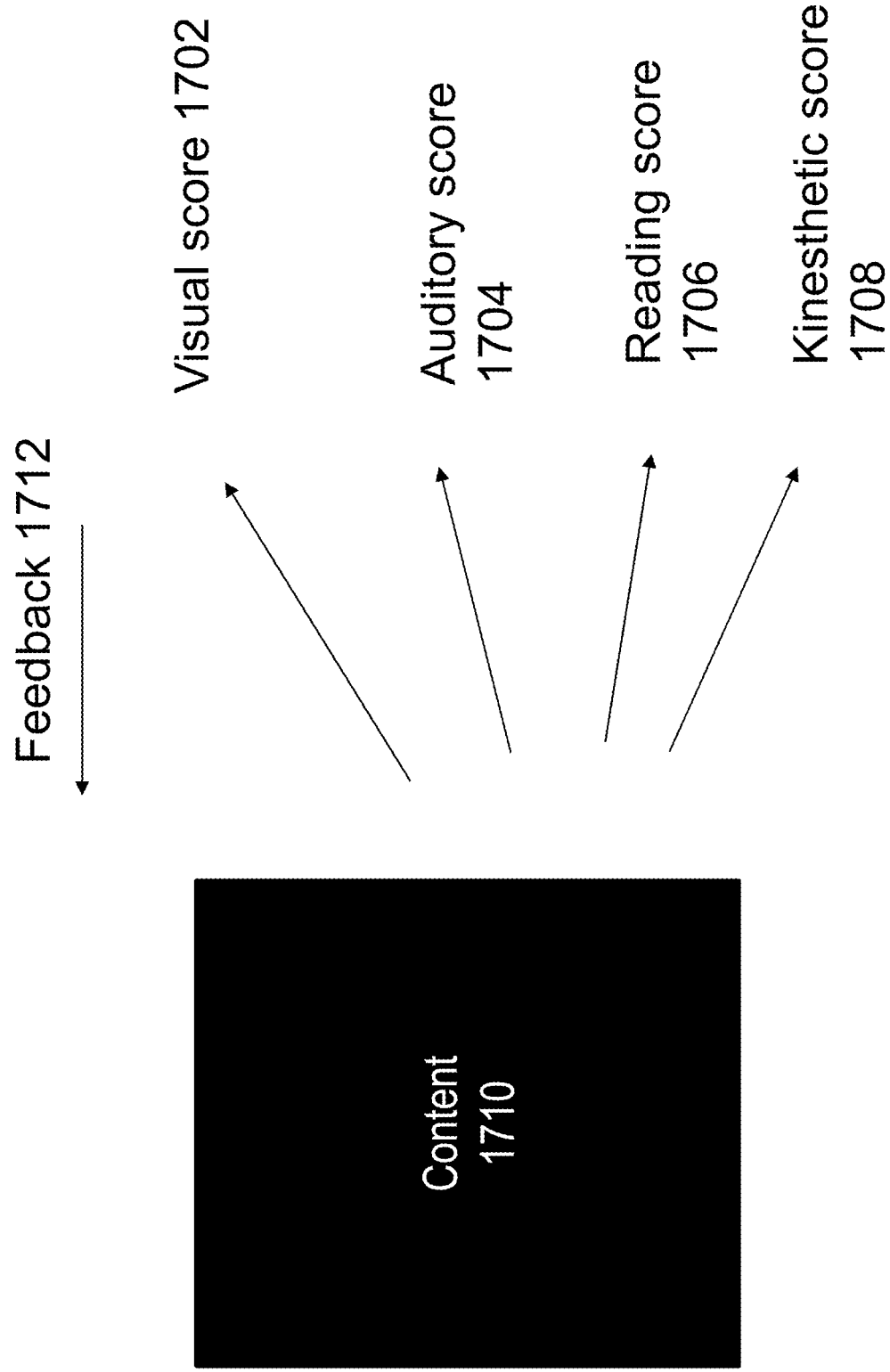
FIG. 17 illustrates example of scores being assigned for visual, auditory, reading, and kinesthetic matters in a piece of content and feedback may optionally be provided to a speaker.

FIG. 17 illustrates example of scores being assigned for visual, auditory, reading, and kinesthetic matters in a piece of content and feedback may optionally be provided to a speaker. If the speaker provides content 1710 for teaching, scores may be estimated for visual, auditory, reading, and kinesthetic strength. Auditory scores 1704 may be assigned based on how much voice inflection may be produced, for example, or how exciting the content sounds or how much verbal explanation is provided. Visual scores 1702 may be provided based on how many figures are provided and how catchy those may be. Kinesthetic scores 1708 may be provided based on how many practical examples are given. Reading scores 1706 may be provided based on how much reading material is provided to students. Several distinct algorithms may be used for determining visual, auditory, reading, and kinesthetic strength. Based on the feedback on the scores 1712, the speaker may attempt to increase his/her scores by improving the content. This also makes it easier to create personalized content—by targeting high kinesthetic scores for some learners but targeting high auditory scores for other learners. Suggestions may also be provided to the speaker for improving the scores.

Figure 18:
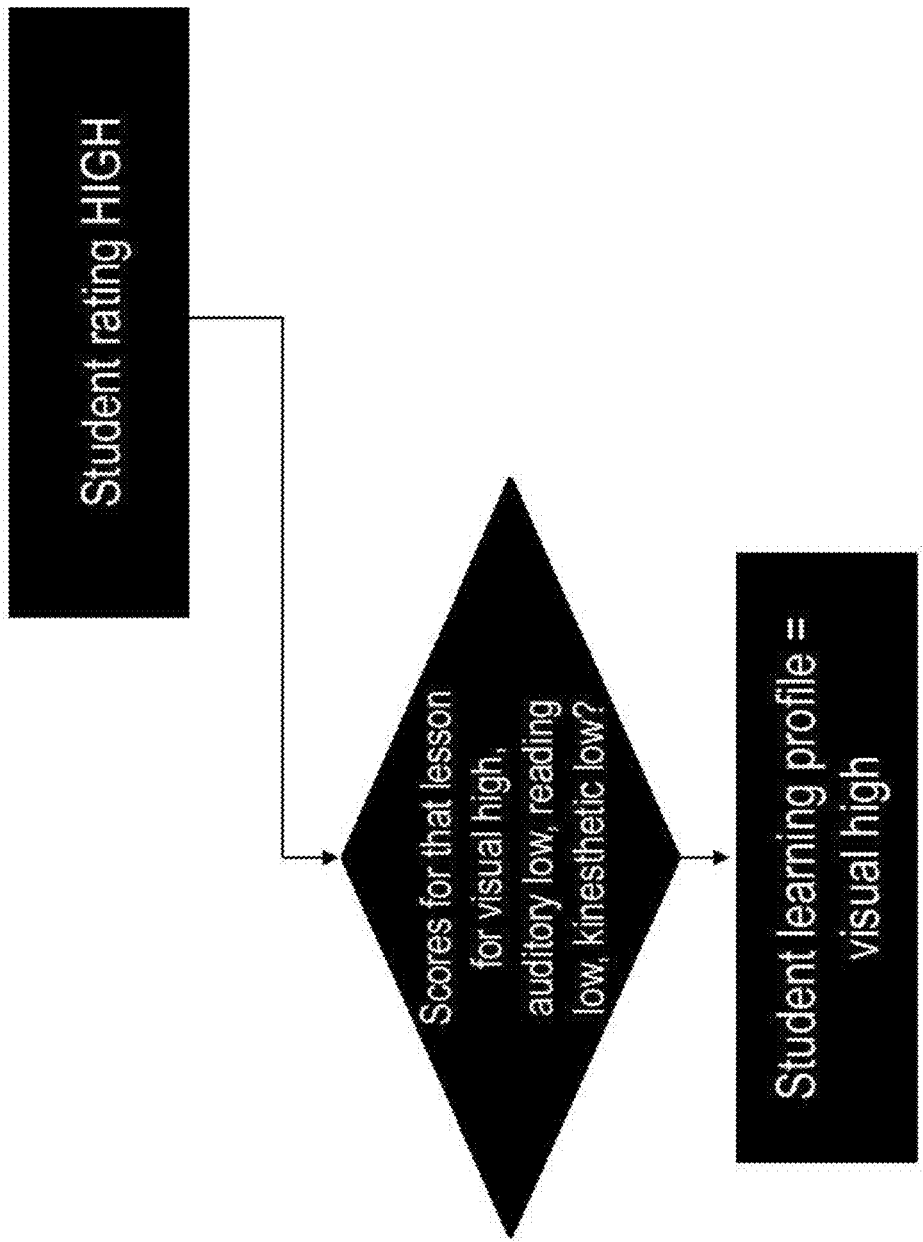
FIG. 18 illustrates an example of student feedback to a lesson being utilized along with visual, auditory, reading, and kinesthetic scores to determine a student's learning profile.

FIG. 18 illustrates an example of student feedback to a lesson being utilized along with visual, auditory, reading, and kinesthetic scores to determine a student's learning profile. For example, the student's learning type may be surmised with a neural network partially based on his/her feedback to a class and the VARK (visual, auditory, reading, and kinesthetic) score the class has been assigned.

FIG. 19 illustrates an example of a questionnaire which may be provided to find a student's learning score and content which may be recommended based on the student's learning style. For example, the survey to the student could be provided to estimate his/her VARK tendencies. The information provided in FIG. 19 may be used as part of the neural network for determining the student's learning type as well. The information in FIG. 18 and FIG. 19 can also help personalize the learning for a student. Content recommendations for students may change based on learning style detected, for example. Content shown to the student may be tuned based on learning style. Several learning style classification methods exist for educational matters, and the techniques described herein can also apply to other learning style classification methods.

Face-Tracking Based Personalization

In some configurations, a video camera located on a computing device used by a student may be used to determine or track the student's facial expressions. These, in turn, may be used to judge the student's interest, engagement, and comprehension to various types of content. The student's interest, engagement, and/or comprehension may then be used to determine a student's learning style, which could be used to enhance the content and/or make recommendations. For privacy reasons, the data may be stored in the student's computer, or not saved at any location. In addition, in some configurations only the student's learning pattern inferences based on the video may be transmitted over the internet.

Side-Kicks for Speakers, and Automating the Concept

It is often boring to listen to just one speaker talk. For an automated teaching approach, having a sidekick with an interesting personality can make a lesson more engaging. FIGS. 20-25 illustrate examples of configurations in which a speaker has added a sidekick in a teaching video.

Figure 20:
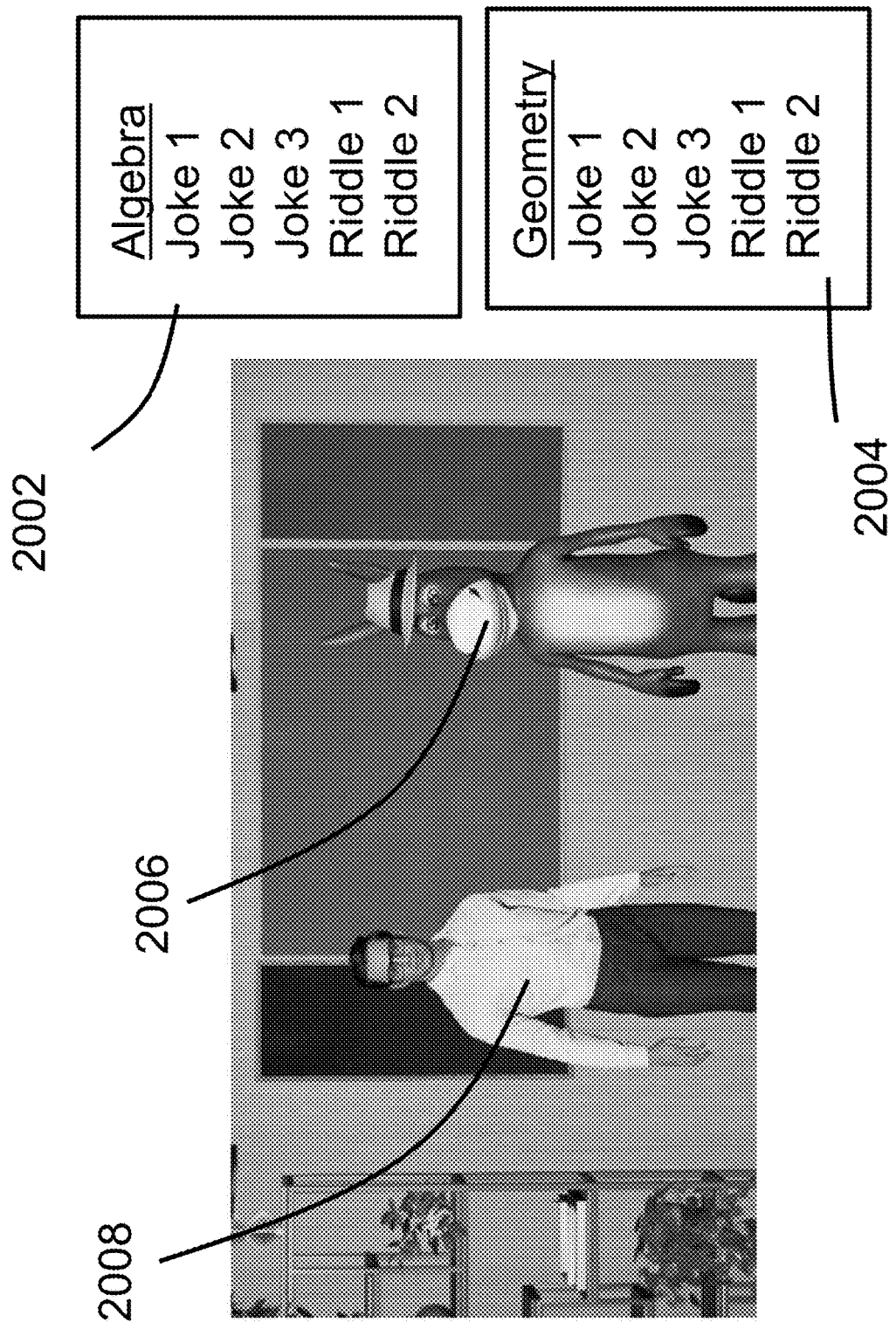
FIG. 20 illustrates an example of a sidekick which may provide humor to a lesson.

FIG. 20 illustrates an example of a sidekick 2006 which may provide humor to a lesson, optionally, along with a speaker 2008. Depending on the lesson subject matter, a database of jokes and riddles, such as for example 2002 or 2004, may be provided that may be pertinent to it. The speaker may select any of these to be inserted at various points in the lesson to provide comic relief. In some configurations these jokes, or riddles, may be automatically obtained by searching on the internet.

Figure 21:
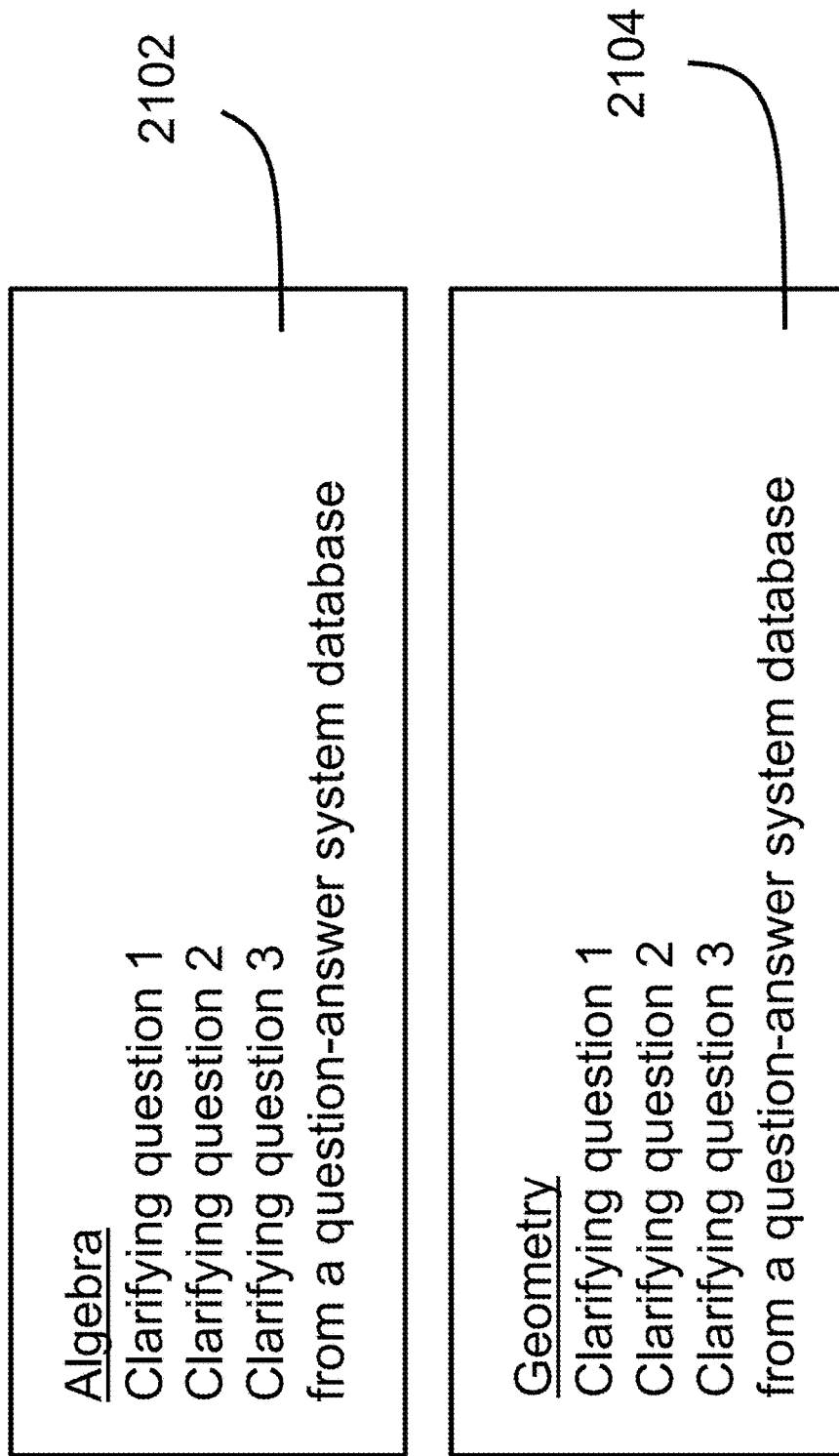
FIG. 21 illustrates exemplary questions a sidekick may ask questions to a speaker during a lesson.

FIG. 21 illustrates exemplary questions a sidekick may ask to a speaker during a lesson, where a sidekick who assists the speaker by asking clarifying questions to the speaker may be added to a lesson. The speaker preparing the lesson may add the questions when entering the lesson in the software. Alternatively, a database of questions, such as, for example, 2102 and 2104, may be provided by the software based the lesson subject matter. The speaker may select any of these to be inserted at various points in the lesson. In some configurations these questions may be automatically obtained by searching on the internet.

Figure 22:
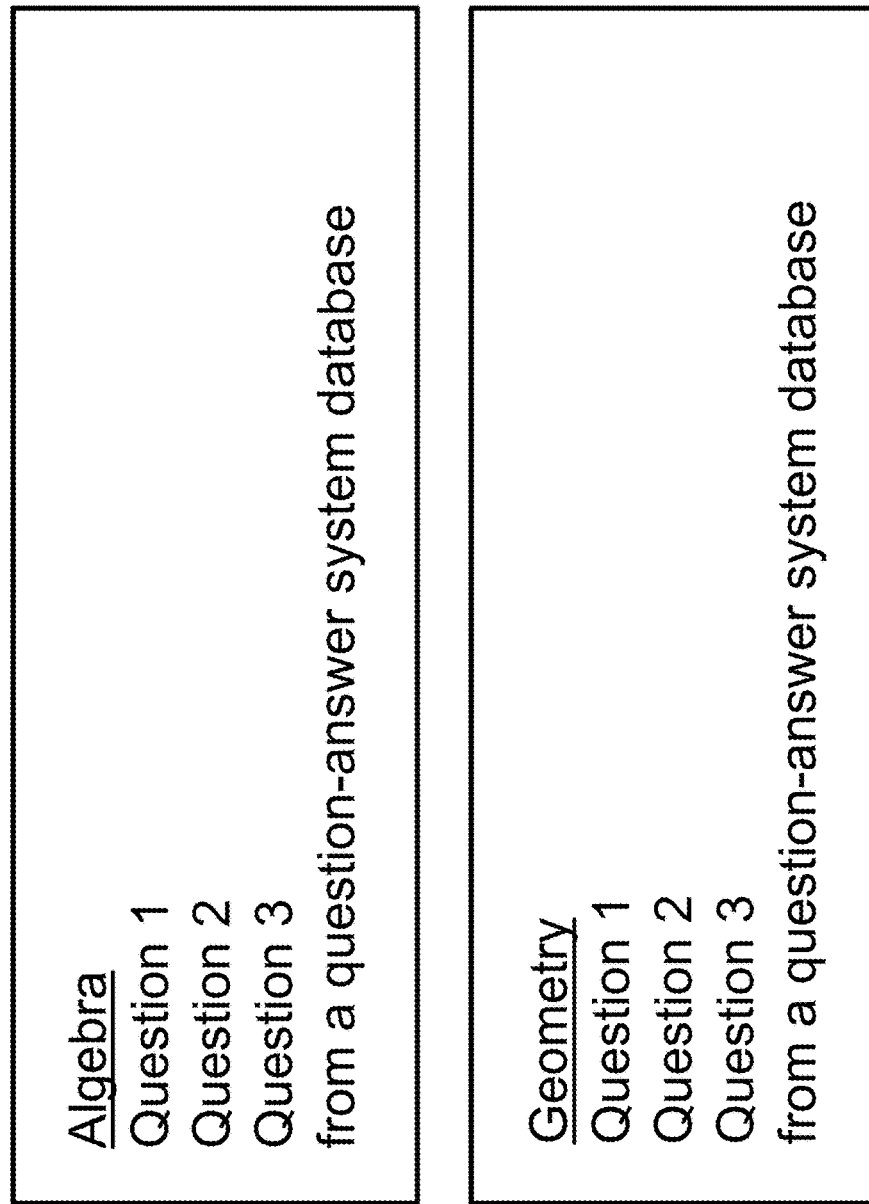
FIG. 22 illustrates exemplary questions a sidekick may ask students questions during a lesson.

FIG. 22 illustrates exemplary questions wherein a sidekick may ask students questions during a lesson, where a sidekick who ask questions to the students of the class may be added to aid a speaker. The speaker preparing the lesson may add the questions when entering the lesson in the software. Alternatively, a database of questions may be provided by the software based on the subject of the lesson. The speaker may select any of these to be inserted at various points in the lesson. In some configurations these questions may be automatically obtained by searching on the internet.

FIG. 23 illustrates an example wherein a sidekick may mention trivia during a lesson, where a sidekick may provide trivia facts or questions (in a "do you know" format, for example). The speaker preparing the lesson may add these. Alternatively, these may be provided by a database saved into the software. Alternatively, these may be automatically provided from internet searches.

FIG. 24 illustrates an example of a sidekick profile document. A speaker may, for example, create a sidekick profile document and indicate what behavior a sidekick may exhibit when called on. In the example shown in FIG. 24, the sidekick may exhibit humor 40% of the time, ask clarifying questions to the speaker 20% of the time, ask students questions 20% of the time and mention trivia 20% of the time. Different characteristics, features, and weights associated with those characteristics and features may be defined as needed by the speaker. A speaker preparing a lesson may ask for a sidekick to appear at a certain point in the lesson by entering it in the software.

Figure 25:
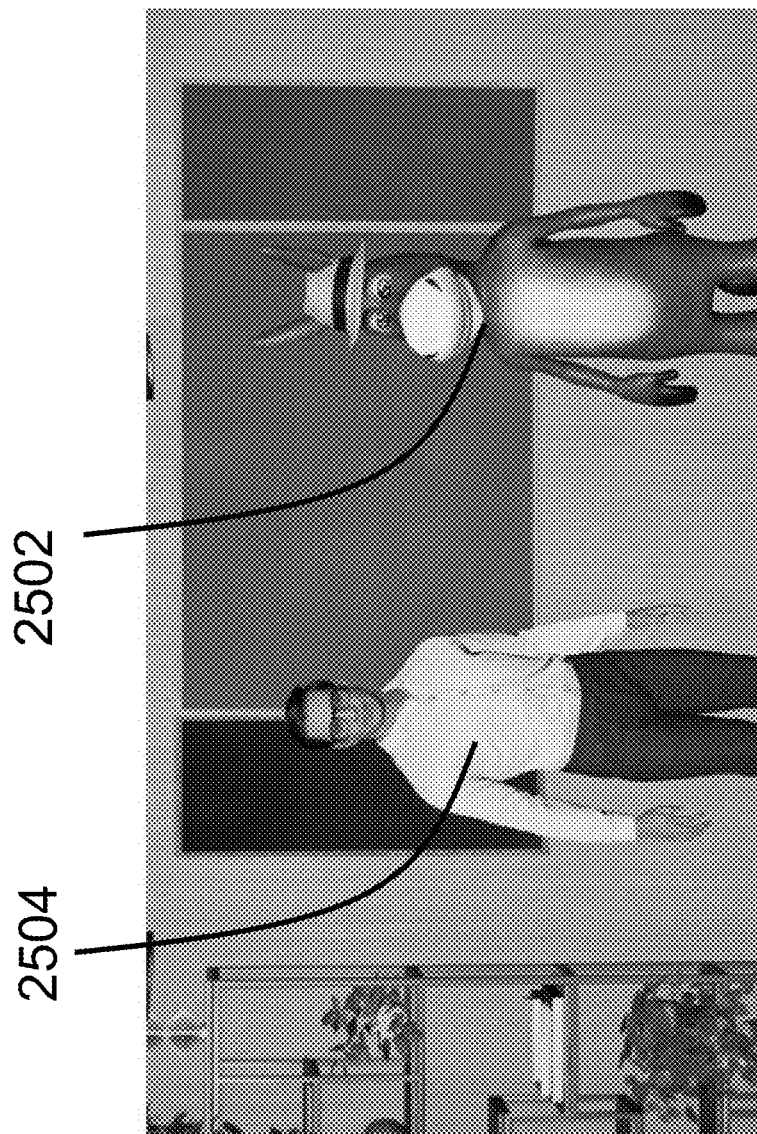
FIG. 25 illustrates an example where expressions or reactions for a speaker are determined based on what a sidekick is saying and vice versa.

FIG. 25 illustrates an example where expressions or reactions for a speaker are determined based on what a sidekick is saying and vice versa. Here expressions or reactions for a sidekick 2502 or speaker 2504 may be automatically determined by an algorithm based on what the other person is saying.

Figure 26:
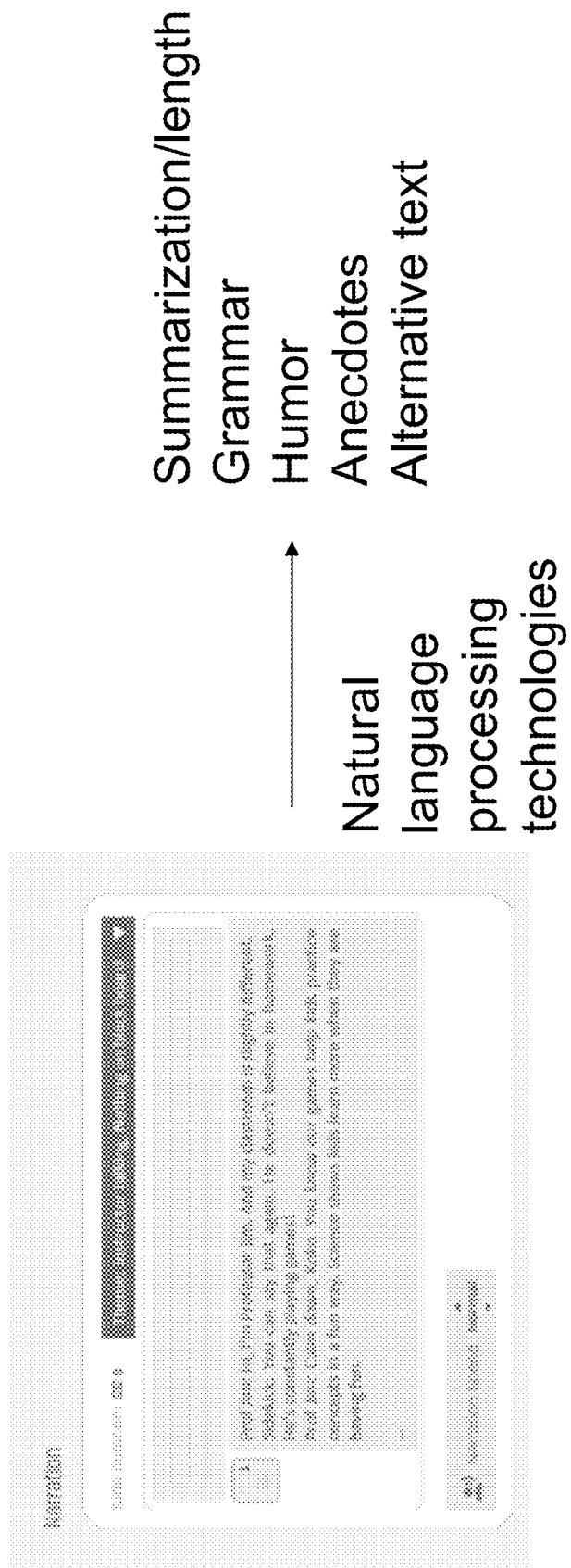
FIG. 26 illustrates an example of using natural language processing to improve entered text for text-to-animation software.

Improving Lessons Entered by a Speaker: Summarization, Alternative Text, Grammar Correction, Adding Humor, Adding Anecdotes and Stories, Etc FIG. 26 illustrates an example of using natural language processing to improve entered text for text-to-animation software. When text content is provided by a speaker for a text-to-animation software, natural language processing technologies may be used to improve a lesson. Summarization algorithms may be used to create crisper content. This may reduce the time needed to teach a concept, be more compatible with students' attention spans, and/or make the content easier to follow. Alternatively, the summarization may help students revise a concept they have already learned before. The entered text may be scanned using natural language processing algorithms to see if grammar is okay. The amount of humor, anecdotes, trivia, or other content may be evaluated with algorithms to give scores for that type of content. Suggestions may be provided to improve these scores.

Improving Lessons Entered by a Speaker: Course Comprehensiveness

FIG. 27-32 illustrate various equations that can be used to score text, lessons, or other inputs to the system. These equations can provide a mechanism to automatically score a course outline given a topic, offer suggestions on topics to include for course creators and/or offer a score to measure how well the course covers various sub-topics related to the course. A scoring mechanism may provide a course creator feedback on how comprehensive their course is with respect to other public sources of data on the same subject along with suggestions of actual topics and sub-topics to incorporate in their course.

FIG. 27 illustrates an exemplary equation for term frequency (TF), where the frequency of a given term is based on how frequently a term appears in a document normalized with the total number of tokens (e.g., words or terms) in the document.

FIG. 28 illustrates an equation for inverse document frequency (IDF), which is a numerical statistic that is intended to reflect how important a word is to a document in a collection or corpus. The IDF is formed using the ratio of total number of documents in the corpus to the number of documents that have the given term or phrase FIG. 29 illustrates an exemplary equation for synset frequency (SF), where a synset is a set of one or more synonyms that are interchangeable in some context, and the synset frequency represents how often a particular word is used within that body of synonyms.

FIG. 30 illustrates an exemplary equation for term relevancy, which multiplies the term frequency, inverse document frequency, and synset frequency together. In some configurations, the TF, IDF and SF can have weights, such that the overall term relevancy is more highly weighted for certain types of term use than other types.

To detect topic comprehensiveness, the system may:
1. Scan and parse a corpus of curated source or a public source for content related to the topic of the course.
2. Assign a grade level for each scanned source. May filter the content based on the target audience grade. The grade level may either be:
   a. automatically extracted from the source by parsing the content for specific keywords and tokens
   b. manually tagged
   c. extracted via a trained, supervised machine learning algorithm/models
3. Extract key terms and phrases as potential topic candidates from each source
4. Make suggestions prioritizing sub-topics that tend to occur frequently across multiple documents.

A consideration to the topic recommendation engine lies in identifying and extracting relevant sub-topics from the source corpus. For example, to ensure the topics suggested are relevant, the source corpus may either be a curated source such as books for a particular grade level or other public source such as public websites identifying as intended for a particular grade level. When parsing a digital source, semantic structure of the source document may be used to add relevance and weightage to potential topic identification and/or suggestions.

Figure 31:
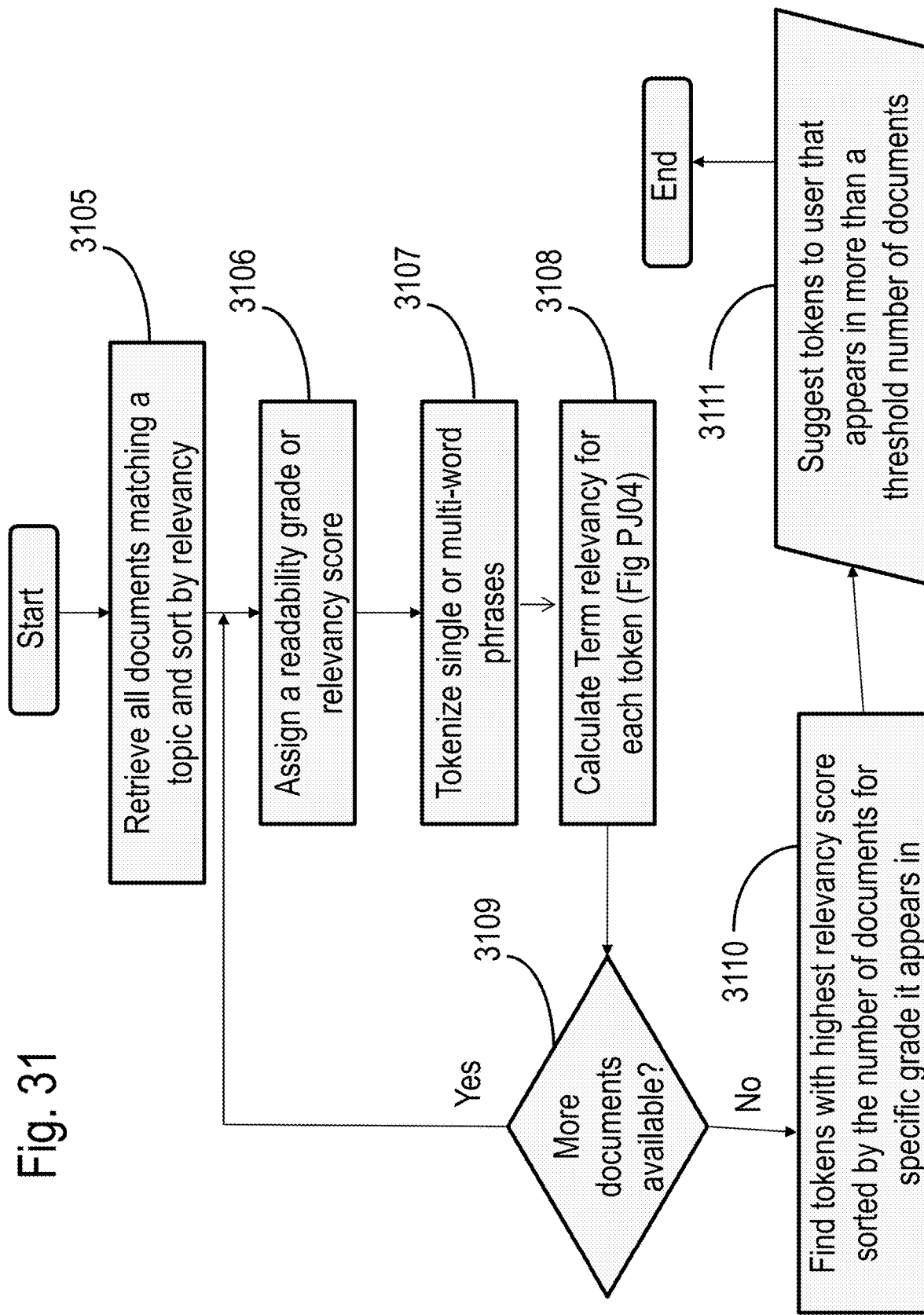
FIG. 31 illustrates an exemplary flow chart for suggesting sub-topics for a certain course topic.

FIG. 31 illustrates an exemplary flow chart for suggesting sub-topics for a certain course topic, which may be used to find sub-topics for a certain course provided to a text-to-animation program. Given a plain text document or a document with a semantic structure such as HTML, a document in MS Word, .pdf, .txt, or some other format, the process may for example involve the following. As indicated in step 3105, documents may be searched or retrieved which may contain the target term or phrase. Following that, a grade score or relevancy score may be applied as indicated in step 3106. This may be based on several criteria such as, for example, the target audience school grade level, experience in a particular field, subscription level, or any other criteria as may be applicable. Following that, as indicated in step 3107, the contents of the document may be tokenized using any tokenization algorithm such as word breaks, dictionary lookups, a machine learning algorithm or something else. The tokenization may include single word tokens or multi word phrases. Following that, as mentioned in step 3108, a relevancy score may be assigned to each token or phrase. As discussed above, this may be identified as the product of the term frequency (TF), inverse document frequency (IDF) and the synset frequency (SF) (where a synset is set of one or more synonyms that are interchangeable in some context without changing the underlying meaning). The term frequency (TF), as indicated in FIG. 27, may be based on how frequently a term appears in a document normalized with the total number of tokens in the document. The inverse document frequency (IDF), as indicated in FIG. 28, may be based on the ratio of total number of documents in the corpus to the number of documents that have the given term or phrase. In documents with a semantic structure, the number of unique semantic features the term appears in may be a consideration, as indicated in FIG. 29. Several variations or alternative algorithms may be used depending on the use case and document structure. For example, in html documents, tokens found in the <title> tag may be assigned more weight than tokens in <h1> tags which in turn may have more weight than a <h2> tag and so on. The next step in the flow chart shown in FIG. 31 may involve repeating the process shown in 3108 until all documents in the corpus have been processed. Following that, in steps 3110 and 3111, the candidate tokens may be further filtered based on various criteria, for example, it may be sorted in descending order of how many documents in the corpus contain the candidate sub-topics. The comparison and sorting of topics across different documents may be used as a signal of importance as it may avoid extremely niche suggestions and false positives.

Figure 32:
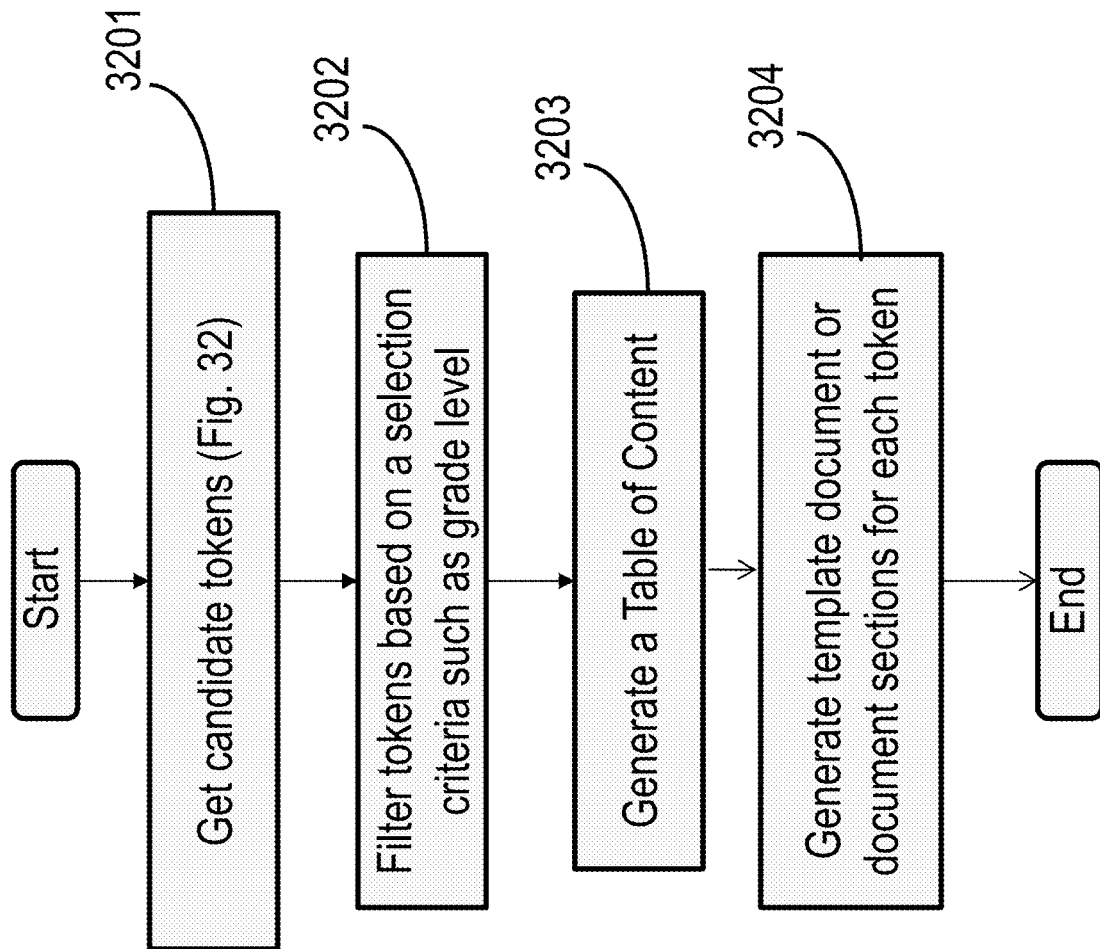
FIG. 32 illustrates an example process where a table of contents or a course's contents may be suggested given a course topic.

FIG. 32 illustrates an example process where a table of contents or a course's contents may be suggested given a course topic, where the course template or detailed course may be automatically created for a course topic provided to a text-to-animation program. The procedure may begin with a discovery process to identify potential candidate topics or subtopics, which may be associated with tokens, as indicated in step 3201. Several approaches may be taken, such as the one outlined in FIG. 31. Once candidate tokens are identified, the list may be shortened to extract the most relevant or important ones using one or more criteria based on the application use case, as indicated in step 3202. For example, this could be the grade level of the student in the classroom, or experience level of a student or audience in a professional setting, or level of subscription or fee purchased by a student, or any other criteria that may be applicable. Following that, as indicated in step 3203, the candidate tokens may be sorted or grouped using various criteria such as ease, dependency on requiring a pre-requisite understanding of a topic or subject before introducing another, and so on, to generate a table of contents. Once the table of contents is generated in step 3203, further material may be created to create a detailed course structure which may include relevant audio, video, text, or other multimedia content, as indicated in step 3204.

Improving Lessons Entered by a Speaker: Sentence Completion

Figure 33:
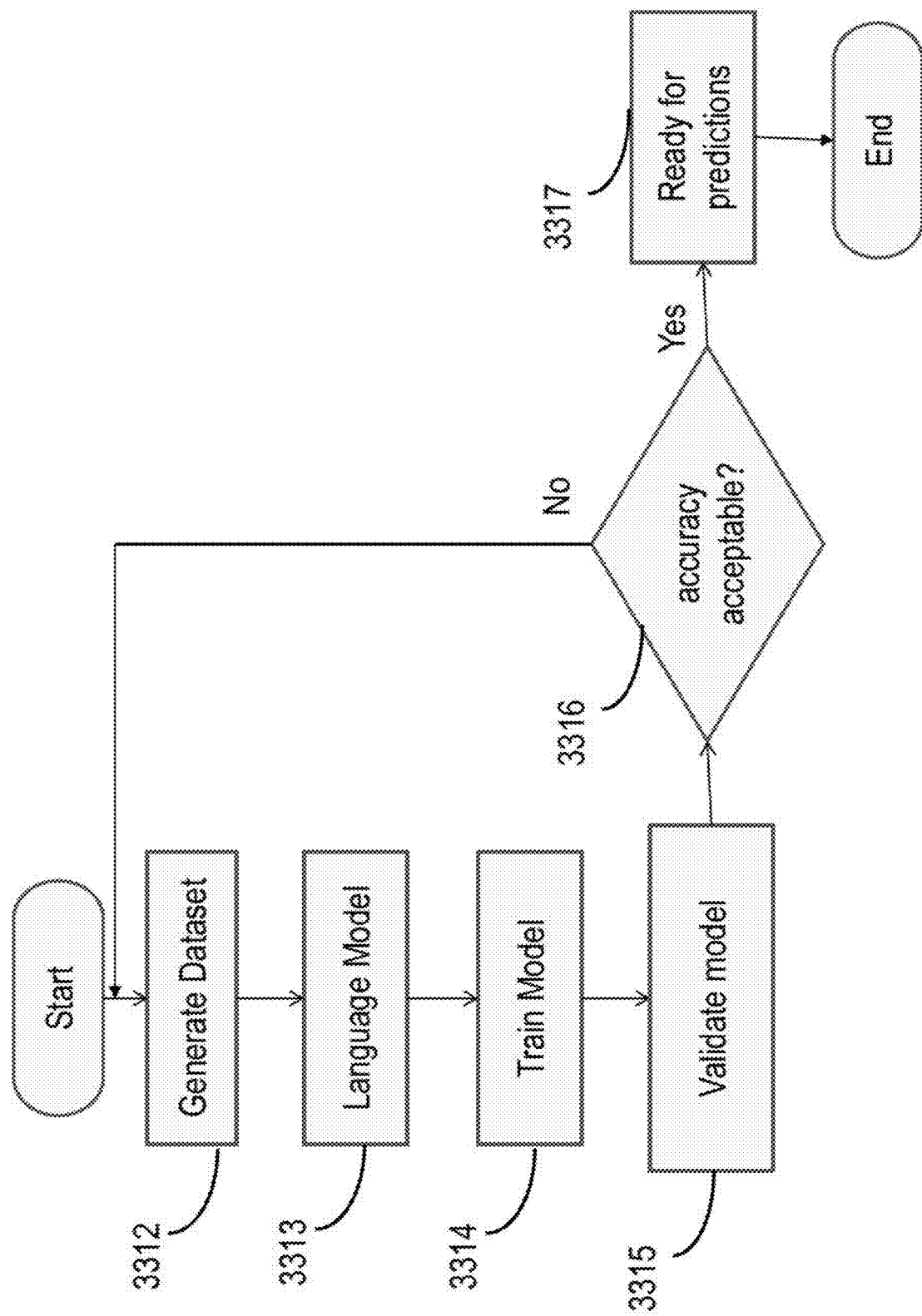
FIG. 33 illustrates an example of a general-purpose machine learning model being fine-tuned for various applications, including sentence simplifications for improved reading comprehension or sentence completion.

As indicated in FIG. 26, the input text in a text-to-animation system may be analyzed using technology and suggestions may be given to improve learning outcomes. Suggestions may be in the form of audio, visual or text improvements. Alternatively, when the course creator is typing a lesson, sentence completion may be used which may lead to improved learning outcomes such as, for example, shorter lessons. FIG. 33 illustrates an example of a general-purpose machine learning model being fine-tuned for various applications, including sentence simplifications for improved reading comprehension or sentence completion, which may be a method to do any of the following, and may be used for more applications as well:
1. Analyze text complexity and other content entered by the course creator for reading ease for the target audience age group and/or reading comprehension.
2. Automatically suggest sentence completion using words the target audience would find easy to comprehend 3. Analyze text and offer alternate sentence constructs to improve readability including
   a. Converting passive voice to active voice
   b. Alternate, simplified wordings for better comprehension
   c. Shorter lessons
4. Offer related trivia, humor, or everyday examples to make the content more engaging Modern Natural Language Processing (NLP) algorithms such as GPT3 or BERT already do a reasonable job of common NLP tasks such as completing general sentences in similar style, text summarization, sentiment analysis, and so on. However, models trained on general purpose training data, have an inherent upper limit on the quality of generated output, and there is a limit to how good a result one can get on specialized tasks that don't relate to day-to-day conversations. This quality limit can sometimes be significantly short of the desired output in specialized use cases. This quality aspect can sometimes be addressed by using larger models, but these incur higher costs, latency, and more complex prompts, and as such may not be feasible for several real time applications. These models can be overcome by finetuning existing models with custom training data. The advantage of this approach is that fine tuning existing models with custom data creates specialized models resulting in much higher performance for specialized domains and use cases. Considering the several steps may be used for this method:

Step 3312: A fine-tuning dataset may be created, optionally with appropriate labels such as student grades or expertise level in the subject matter and/or language the course is being taught in. If an existing model is being trained which supports additional metadata to be captured which can be used to later generate a particular output, this may be included in a single training data set. If the language model does not support additional metadata, then multiple datasets can be created, each optimized for a specific use case. The training data may be designed with labels such as, for example, those shown in FIG. 34 (FIG. 34 illustrates an example of inputs which can be used for fine tuning).

Figure 35:
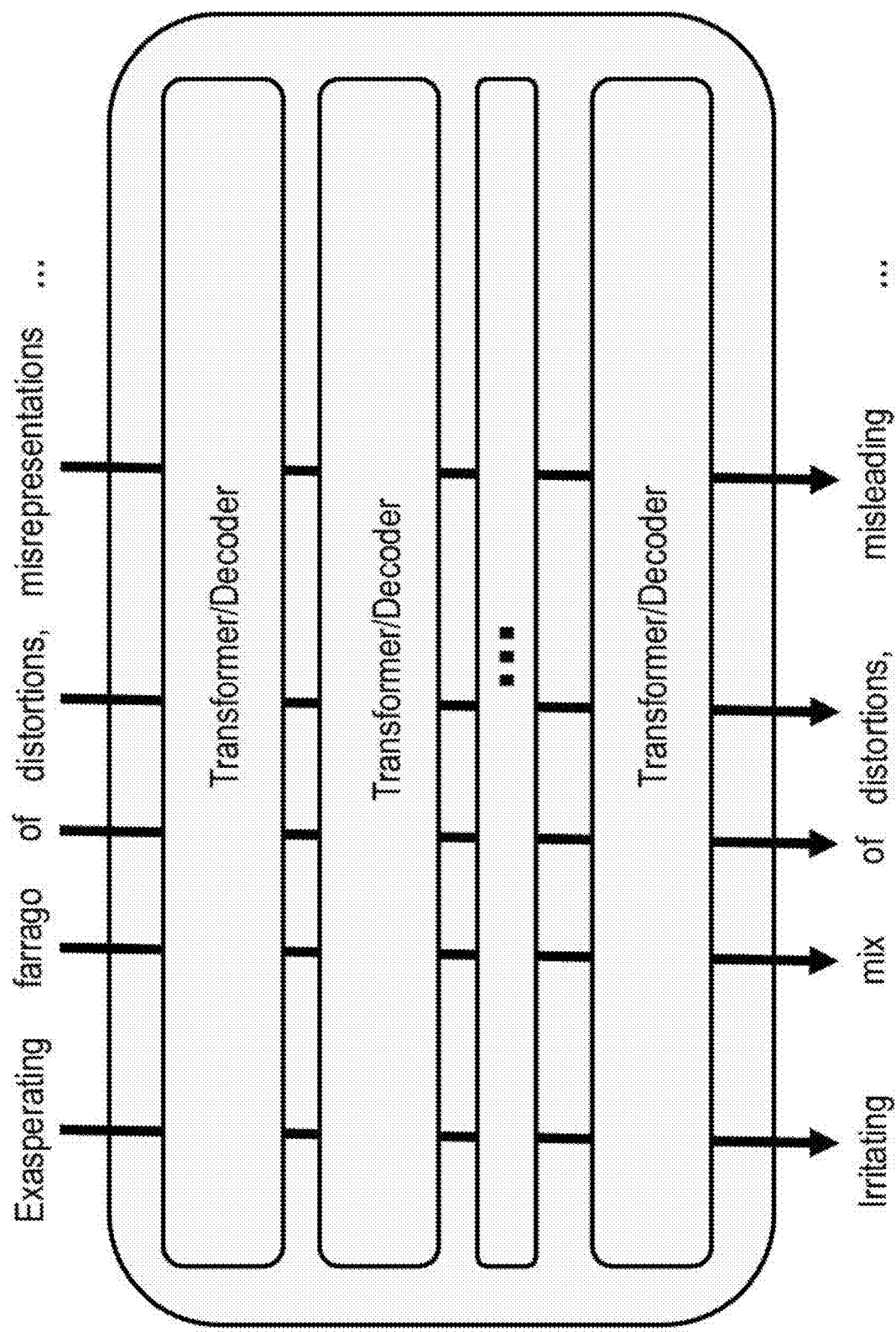
FIG. 35 illustrates an example of sentence simplification for improved reading comprehension using a transformer model.

Step 3313: An appropriate language model may be used for the training purpose (such as GPT-3, Bert, other known model, and/or a model trained from scratch). An appropriate transformer model with multiple layers may be used as shown in FIG. 35 (FIG. 35 illustrates an example of sentence simplification for improved reading comprehension using a transformer model).

Step 3314: The model may be trained using one or more of several loss functions such as Cross Entropy Loss and iterations adjusted until an acceptable training loss is achieved.

Step 3315: A validation step may be performed to determine the accuracy of the model.

Step 3316: The model may be further trained with more or better data until a desired accuracy is achieved.

Step 3317: The model is ready for predictions.

The above general technique may be used to provide complete "translations" for full sentences or paragraphs or offer sentence completion prompts for partial sentences.

Efficient Rendering of a Lesson

In text-to-animation systems, it often takes a lot of time to render finished animations. For example, if a teaching lesson has six slides and each slide has one minute of explanation, for that six-minute teaching lesson it can often take thirty minutes of waiting for the render process to complete. The user may need to wait a long time to preview the lesson, leading to a poor user experience. Systems configured as disclosed herein can render the lesson in a more time efficient manner.

Figure 36:
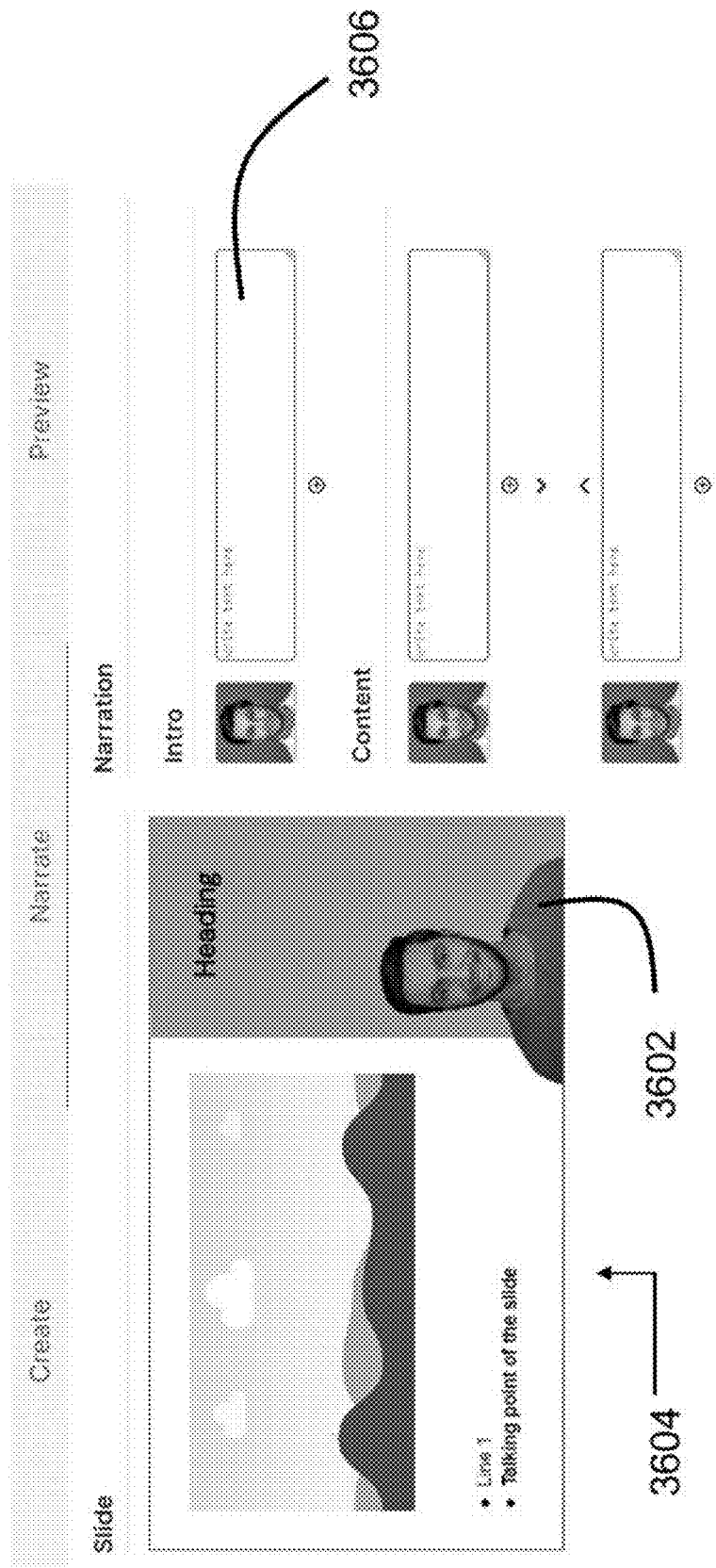
FIG. 36 illustrates an example a lesson creation process in a text-to-animation system.
Figure 37:
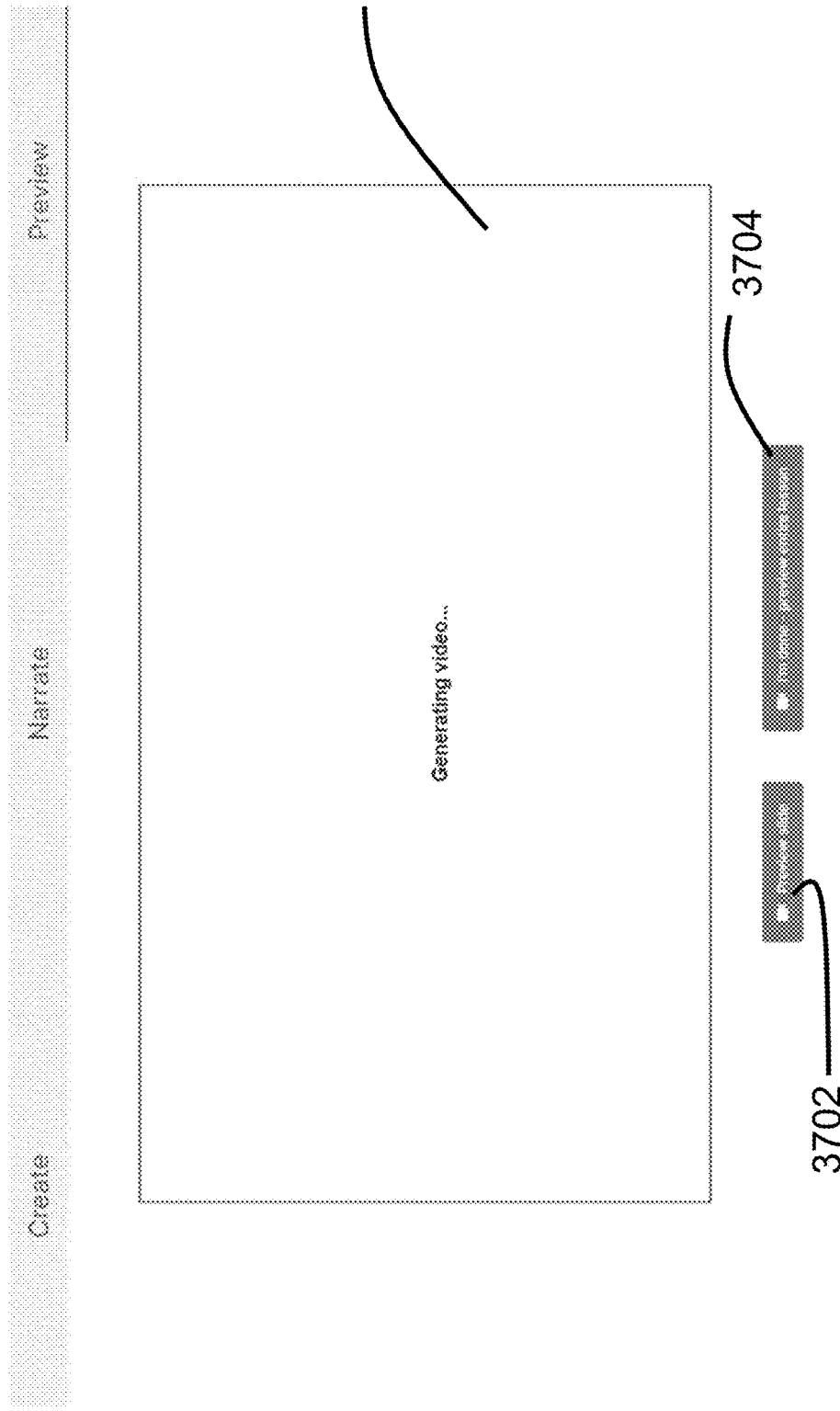
FIG. 37 illustrates an example of a user interface of a text-to-animation system.

FIG. 36 illustrates an example a lesson creation process in a text-to-animation system. An animated character 3602 may be explaining the lesson with slides 3604 in the background. The speaker creating the lesson may mention what the animated character may say in entry 3606. Following the creation of the slide and description of what the speaker may say, the speaker may then want to see a preview of the slide and the animated character explaining it. FIG. 37 illustrates an example of how the screen for that may look. Once the speaker enters the button 3702 for preview slide, the slide's contents may be previewed. When the speaker has finished preparing the whole lesson, he or she may preview the whole lesson by clicking on button 3704. The preview video may show in section 3706.

Figure 38:
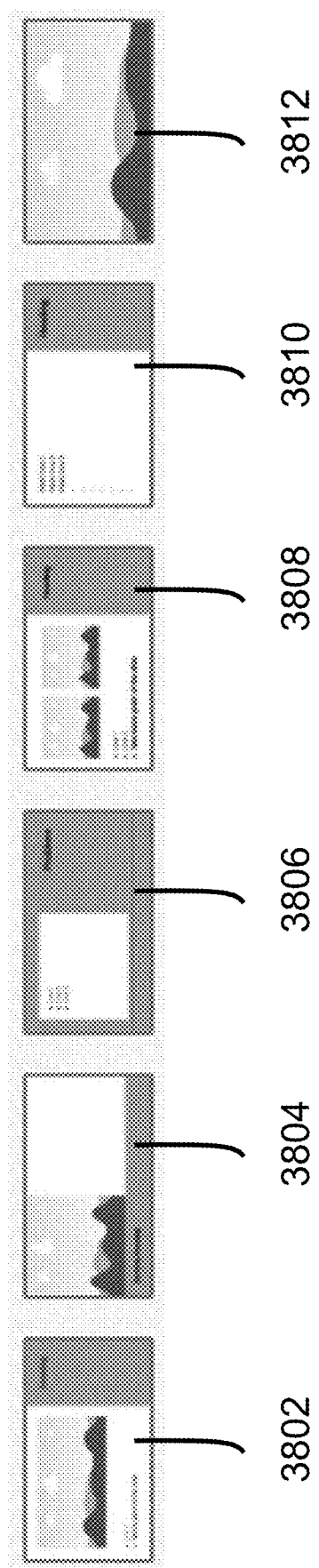
FIG. 38 illustrates an example of improving user experience while rendering the lesson.

FIG. 38 illustrates an example of improving user experience while rendering the lesson. After slide 3802 is created, the narration for that slide 3802 may be entered. When the user starts editing slide 3804, the rendering process for slide 3802 may be started. That is, once the system detects that the user has changed slides, the system can automatically begin rendering the previous slide. Similarly, after the user has moved to slide 3806, the rendering for slide 3804 may be started—this process may be known as pre-caching. Due to this process, if the user says "I am done—render video" after finishing creating slide 3812 and its narration (i.e., at the end of lesson preparation), there is a good chance that the rendering for previous slides 3802, 3804, 3806, 3808 and 3810 (also known as intermediate cached copies) may have partially or completely finished already, allowing the six slide rendering to be shown in as little as five minutes after the user has clicked the button. This is distinct from systems which finish preparing a lesson and then have the user press a button which says, "I am done—render video," at which point the render process for the slides may start (which, as discussed above, may be a lengthy process).

FIGS. 39A and 39B illustrate an example of providing different quality previews to increase rendering speed. FIG. 39A illustrates an example slide 3902 with animation 3904 and voice. Another example slide 3904 is shown where a preview may be provided with just voice and the slide (no animation). For example, sometimes the speaker preparing the lesson may just want to see the slides and hear how the animated character 3904 will verbally pronounce various words (i.e., the audio associated with the animation), without needing to see the animated character 3904, such that a quick preview with just the slides and voice without the animation 3904 may be helpful.

FIG. 39B illustrates an example providing an improved user experience. When the user wants to preview a particular slide, for example, a preview 3942 may be provided with the animation 3946 being higher quality, which may give a slower render. Alternatively, the user may preview a slide 3944 with a lower quality animation 3948, which can be rendered faster. For example, the system can automatically initiate an initial rendering of a slide upon detecting that the user has begun providing inputs for another slide. This initial, or unofficial, rendering can be done at a lower resolution such that when/if the user desires an immediate preview (before requesting that the rendering/animation be formally performed), the user can view a lower quality/resolution (unofficial) render of the animated slide. When all the slides may have been completed and the user may want to generate the final rendered video, higher quality renders may be used.

Figure 40A:
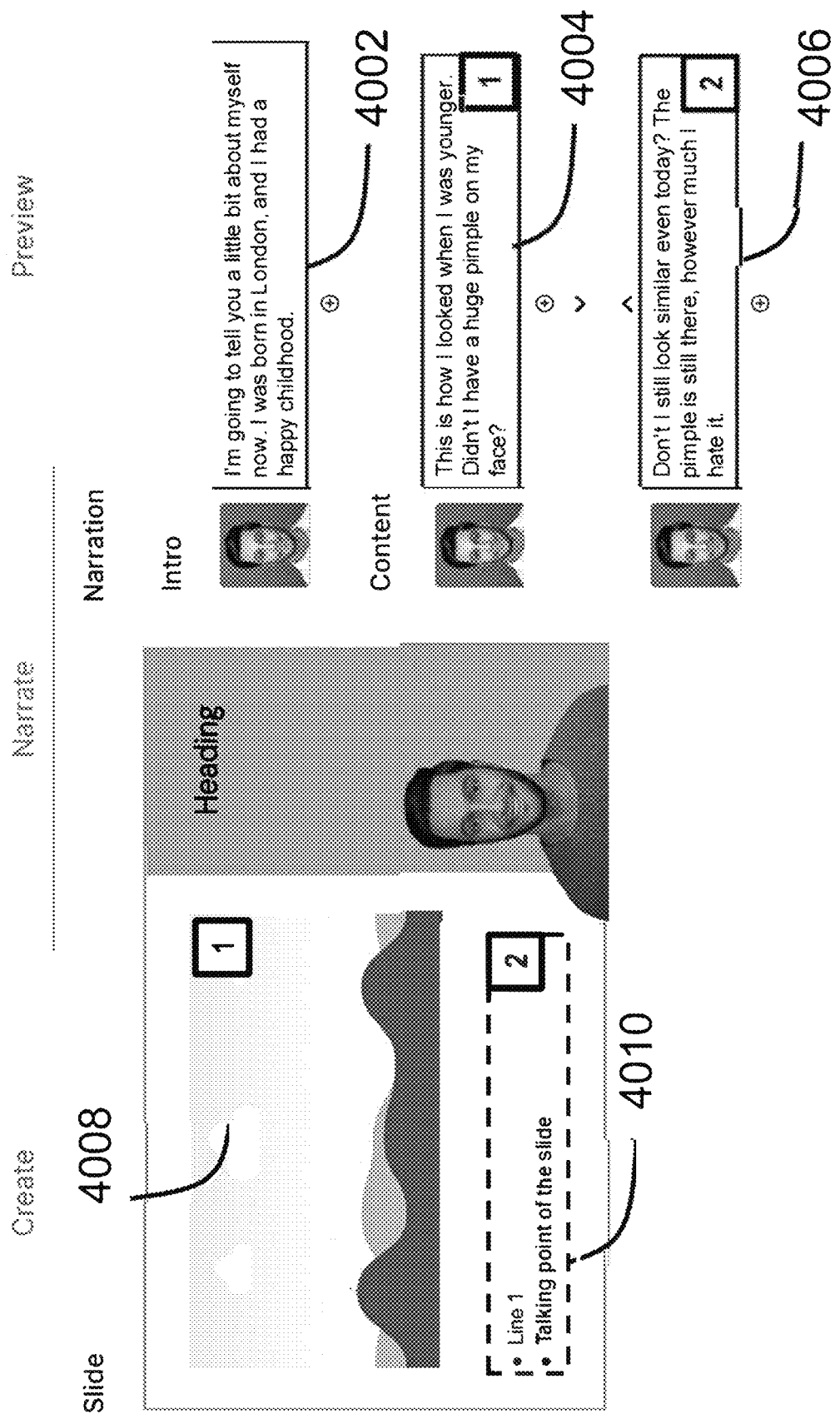
FIG. 40A illustrates an example of entering text for a slide.

FIG. 40A shows how narration for a slide may be entered. Before any material on the slide is shown, the text shown in the intro section 4002 may be narrated using text-to-speech technology. Once the picture marked 1 (4008) is shown, the text 4004 may be narrated using text-to-speech technology. Once the text box marked 2 (4010) is shown on the slide, the text 4006 may be narrated using text-to-speech technology. If the whole slide needs to be converted to animation using text-to-animation technology, the entire text 4002, 4004, and 4006 may be converted to voice and a video may need to be rendered. Many of the methods used for text-to-animation may be such that when a sentence length is ten words, for example, the time to render that video may be one minute, but if the sentence length is thirty words, the time to render that video may be nine minutes or higher, as an example (meaning the time to render may increase more than linearly with number of words).

Figure 40B:
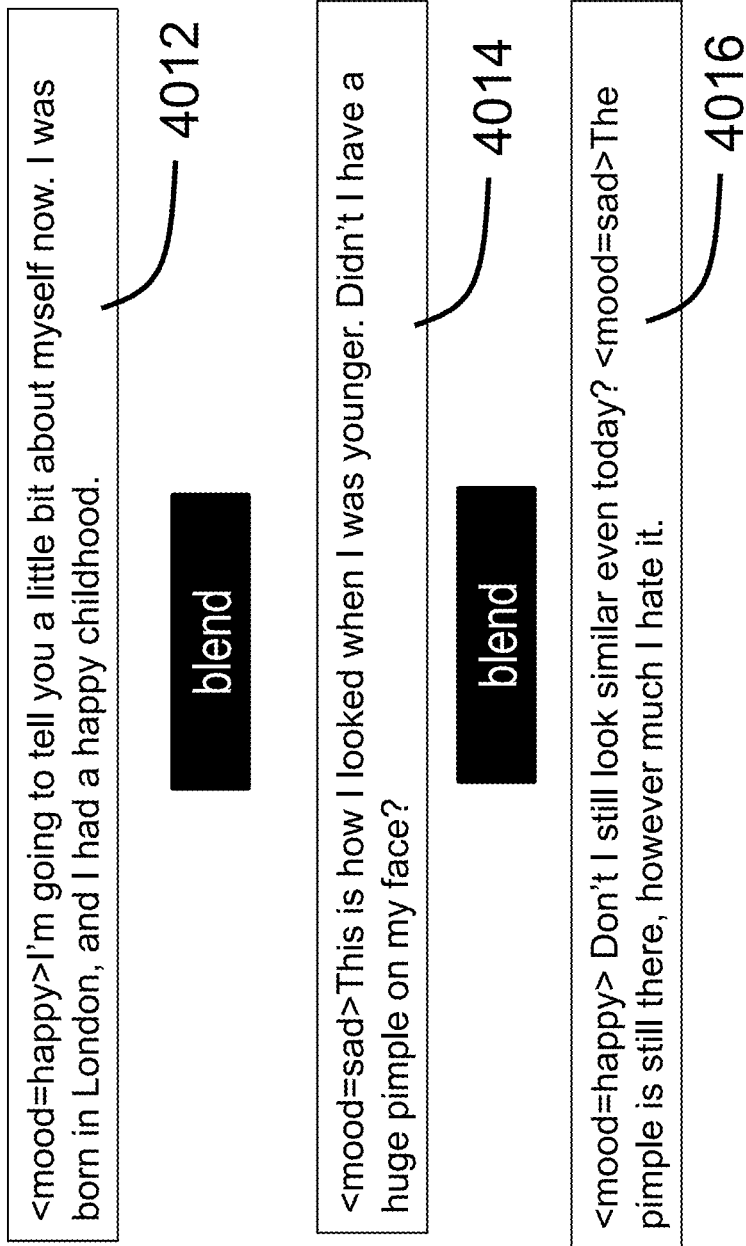
FIG. 40B illustrates an example of splitting rending for the slide into different parts.

FIG. 40B illustrates an example of splitting rending for the slide into different parts. Instead of converting the entire slide having the entire text content combining 4002, 4004, and 4006 in FIG. 40A into animation, the text-to-animation process may happen step by step. The text boxes 4012, 4014, and 4016 may be converted from text to animation separately as separate sub-renders, and the output animation from each of these conversions may be blended, or combined, together to create a finished video. This may lead to faster conversion of the text-to-animation. Any manner of blending may be used. For example, one could use keyframe animation (where common keyframes are identified and used as markers in blending the animations together), conventional blending, or some other method.

Figure 40C:
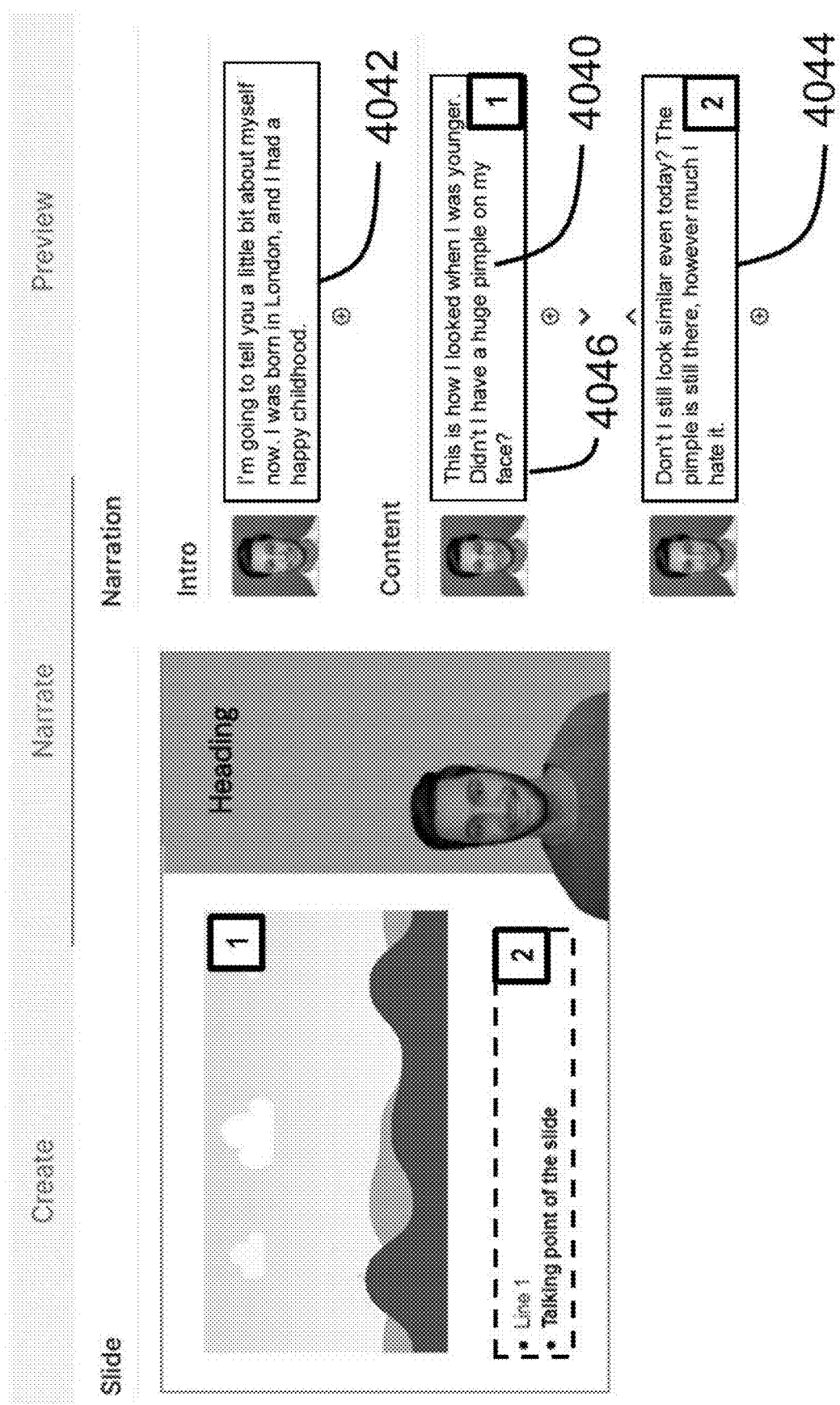
FIG. 40C illustrates an example of re-rendering based on a change of a word.

FIG. 40C illustrates an example of re-rendering based on a change of a word. When a single word "pimple" 4040 may need to be changed to "rash," the entire slide may need to be reconverted from text and slide to animation again. That may be slow and lead to frustration. Instead, systems configured as disclosed herein would only need to re-render the box carrying the narration 4046.

Figure 40D:
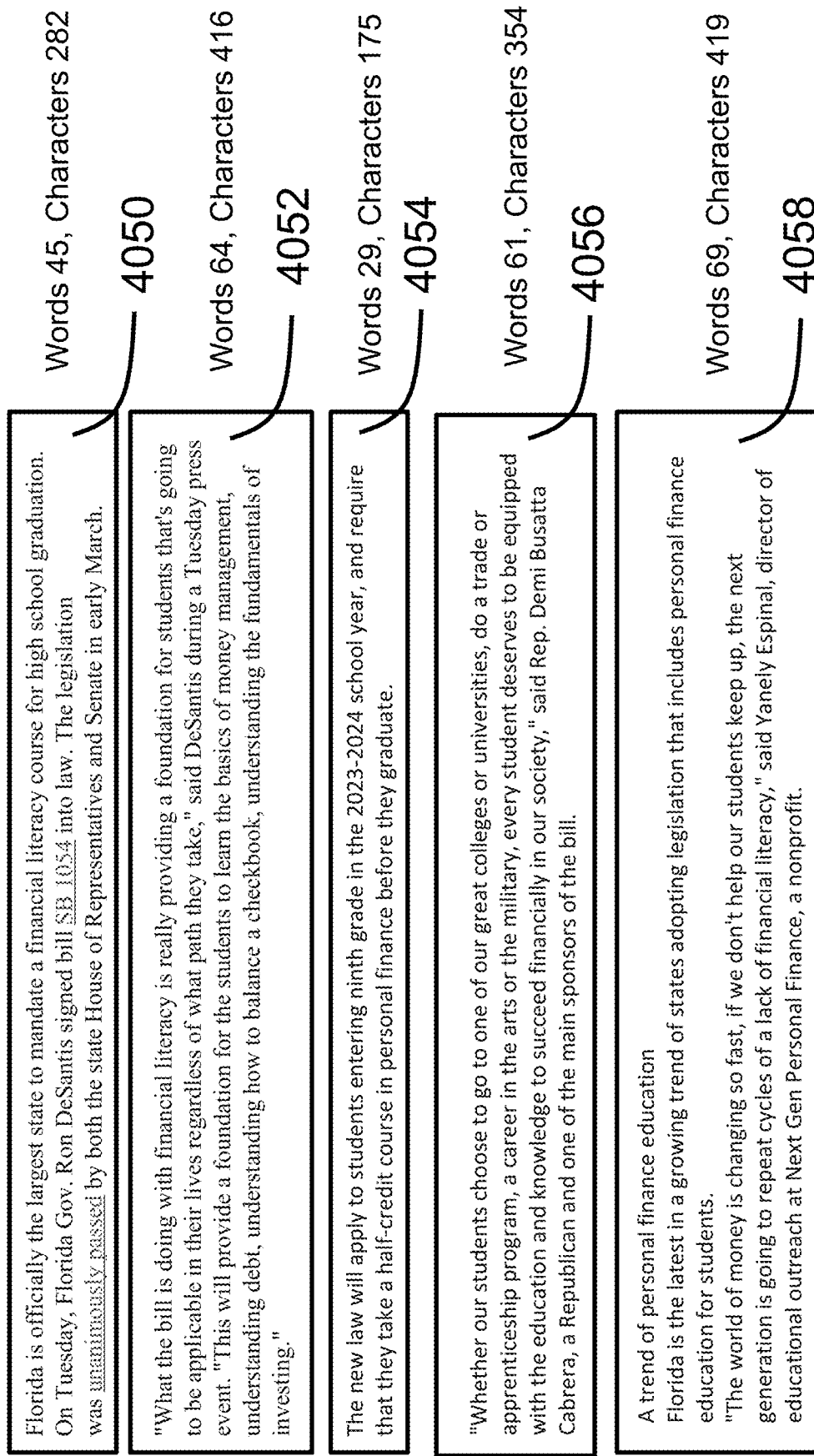
FIG. 40D illustrates an example of rendering text according to distinct text boxes.

FIG. 40D illustrates an example of rendering text according to distinct text boxes, where multiple text boxes with different content 4050, 4052, 4054, 4056, 4058 may be used. The speaker may set an upper limit of (e.g., 100 words), for renders to go smoothly. Instead of converting text in boxes 4050, 4052, 4054, 4056, 4058 to animation all the same time, the speaker may convert text 4050 to animation, then convert text 4052 and 4054 into animation since the total number of words in 4042 and 4054 put together is less than the exemplary hundred-word limit. Following that, text 4056 may be converted to animation, which is subsequently followed by text 4058 being converted to animation.

FIG. 40E illustrates an example of sub-dividing text into distinct portions for rendering, where a long piece of text may be broken up, or split, into multiple shorter pieces of text 4060, 4062, 4064, 4066 to get the benefits of shorter text to speech instances. The splitting locations may be obtained using a machine learning model.

FIG. 41 illustrates an example flow chart for improving the user experience during rendering, where an example algorithm that may use one or more conditions being met (or not met) to identify when or if a task (such as, for example, rendering a slide) may be automatically executed in advance in anticipation of an explicit user or automated action to execute the task.

FIG. 41, Step 41001 shows a potential event which may act as a trigger to execute a Task, for example a change in a document or the state of the system (such as, for example, moving to the next slide).

FIG. 41, Step 41002, further shows how the potential trigger event can be combined with addition events to satisfy multiple conditions such as a time interval of user inactivity or idle system time so as generate an optimal number of tasks so as not to overwhelm the system with unnecessary tasks.

FIG. 41, Step 41003 shows how a simple versioning system may be implemented and combined to detect a state change for the process being monitored.

FIG. 41, Step 41004 shows how once all conditions to trigger the execution of a tasks are met, the task may in immediately executed or dispatched to a batch process or queue to be executed at a later time or with a different priority based on available resources or other parameters Example algorithm to automatically anticipate and trigger a long running task such as rendering is described in FIG. 41. In many software applications, users execute a relatively pre-defined workflow to accomplish their tasks. Given this, it might be possible to anticipate future user actions and trigger potential running tasks ahead of time and execute the same based on one or more conditions matching a criterion for a particular use case. For example, in an application involving user entering some input and expecting an output which might be computationally expensive, the computationally expensive task may be triggered as soon as sufficient information is available while the system is waiting for additional information which may not have direct dependency on the computationally expensive task. In such a scenario, the following exemplary algorithm may be used:
1. Monitor the state of the system to check if enough data is available to execute the task;
2. If enough data is available, wait until a certain time threshold is met before taking any action;
3. If a state change is detected before the threshold timeout, reset the timer, and go back to step 1;
4. If no state change is detected for the threshold time out, and enough data is available, trigger the long running task automatically and enqueue it for execution by a different system.

Figure 42:
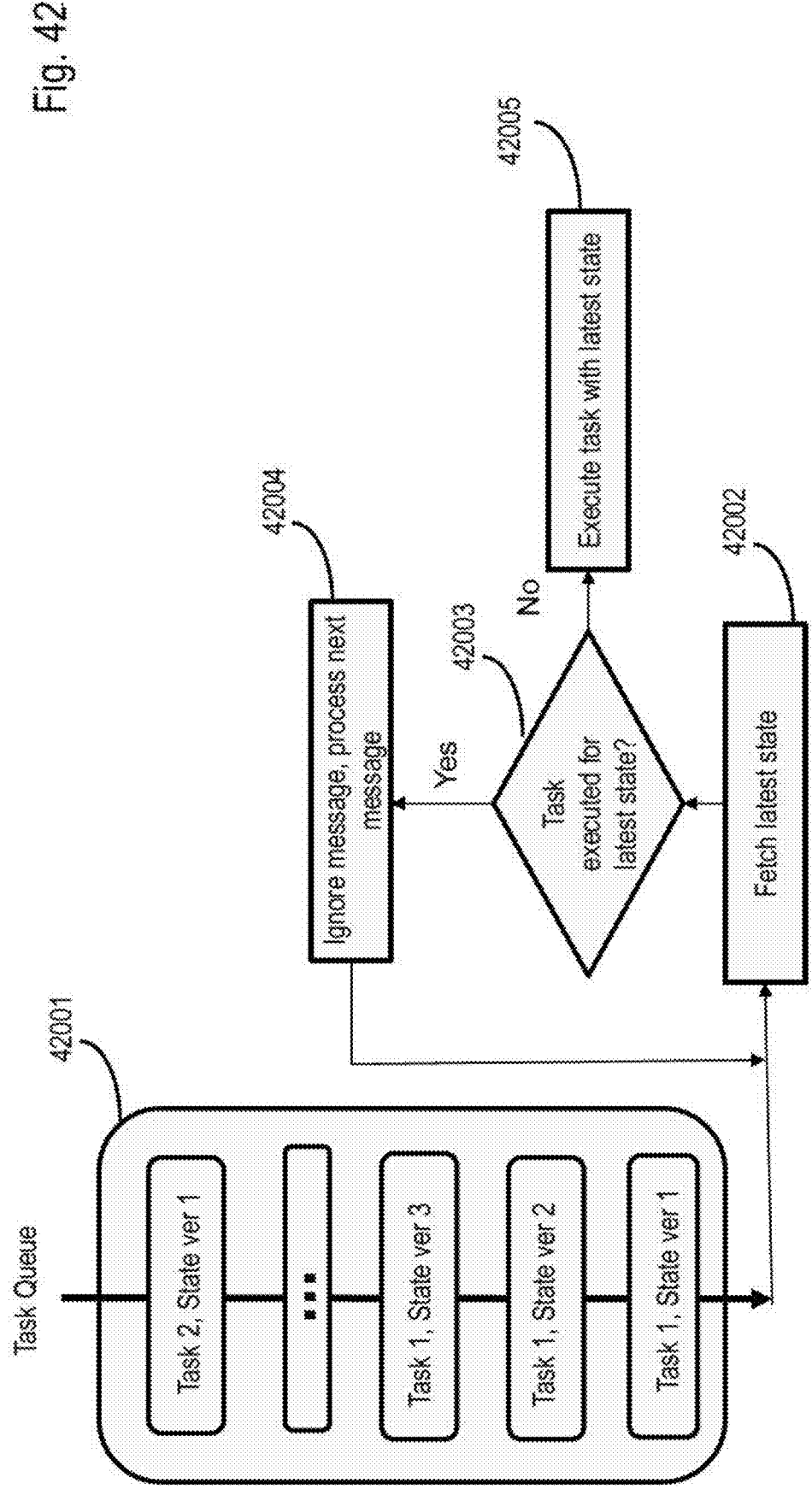
FIG. 42 illustrates an example of optimizing a queue for processing various commands during rendering.

FIG. 42 illustrates an example of optimizing a queue for processing various commands during rendering. This illustrated process may provide a mechanism to further prioritize and optimize a task from a series of candidate tasks in a distributed system where the process triggering the execution of a task is not aware of tasks already running, is not aware of tasks previously executed, and/or there is a possibility of duplicate tasks being executed several times (such as a manual user action when an automatic action already triggered the execution of a task).

FIG. 42, Step 42001 illustrates a message queuing system where tasks to be executed are inserted to be de-queued and executed by another system in a distributed environment. Each message in the queue may be self-contained and carry all information required for the remote system to execute the task successfully FIG. 42, Step 42002 illustrates an optimization step where the execution system may choose to ignore data and instead choose to execute the step with the latest state available. This may be useful in situations where there is a possibility of multiple messages being inserted in the queue but the user only cares about the latest state of the system and not any intermediate steps that may have occurred over time.

FIG. 42, Step 42003, 42004 illustrate a conditional check to determine if the current message is a historical message that may be ignored if a more recent version has already been processed.

The queue optimization algorithm may be described as thus:
1. Pick the next message from the queue
2. For a given task, query the most recent state of the system
3. If the task has already been executed with a version newer than the current version, ignore the message and process the next message.

Figure 43:
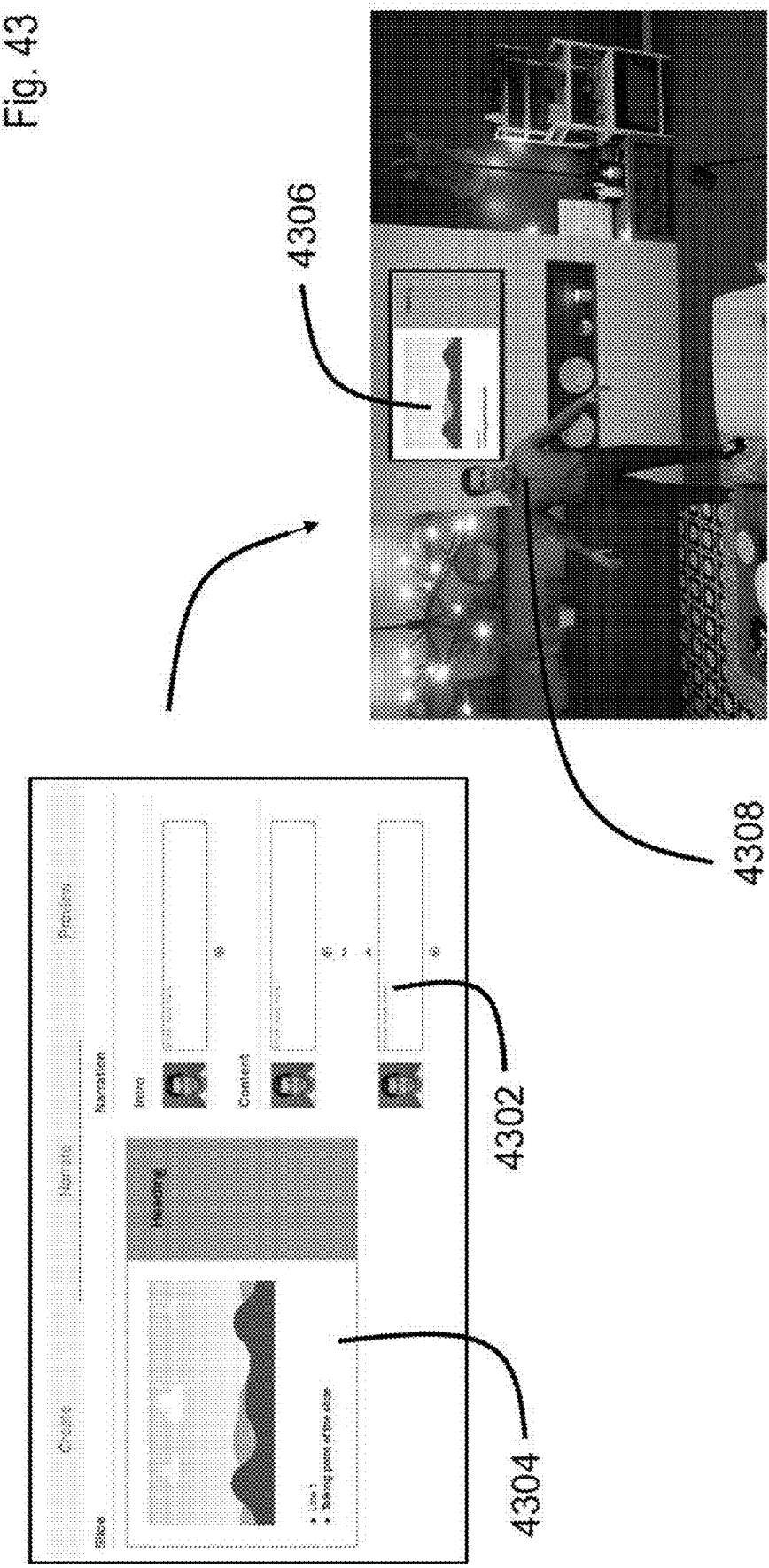
FIG. 43 illustrates an example of a text-to-animation system delivering content to a 3D scene.

The advantages associated with implementing the process illustrated in FIG. 42 include, without limitation,
a. Reduce perceived execution of long running tasks
b. Optimally use resources that might otherwise be lying idle waiting for manual user action Applications to the Metaverse FIG. 43 illustrates an example of a text-to-animation system delivering content to a 3D scene, where a text-to-speech animation system may give a 3D animated lesson as its output. Slide 4304 may show up on a screen 4306. Narration text 4302 may be converted to speech of the animated character 4308.

Figure 44:
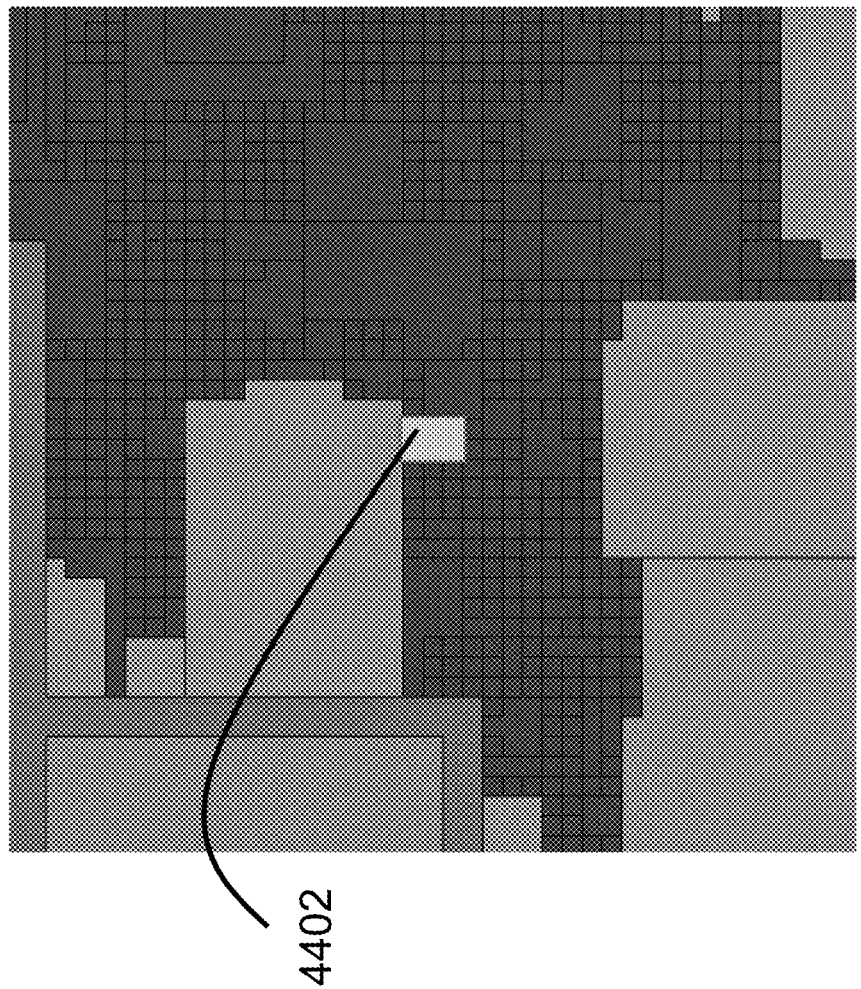
FIG. 44 illustrates an example of a metaverse location map showing a teaching location or a teaching location.

FIG. 44 illustrates an example of a metaverse location map showing a teaching location or a teaching location, where a web3 metaverse may have land 4402 assigned for teaching. The land 4402 may have one or more classrooms where a 3D animated speaker may teach a class. Alternatively, the land 4402 may be a "showroom" where students can go to, and then be directed to an external website or metaverse where teaching may happen.

Figure 45:
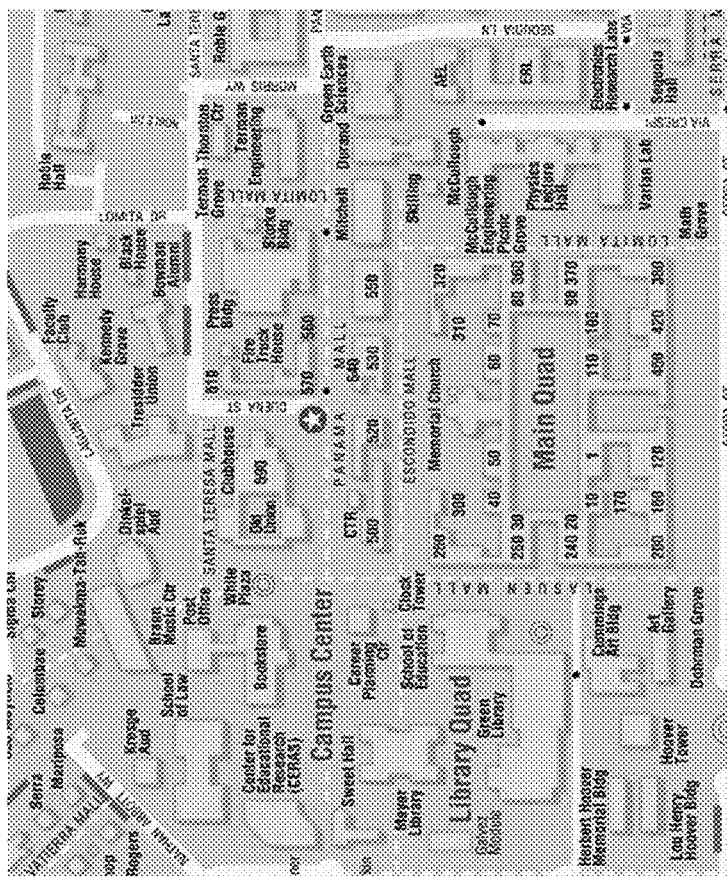
FIG. 45 illustrates an example of a virtual campus map for an existing university.

FIG. 45 illustrates an example of a virtual campus map for an existing university, where the existing university may have its own virtual campus in the metaverse. Instruction in this virtual campus may happen using technology disclosed earlier in this patent application.

Figure 46:
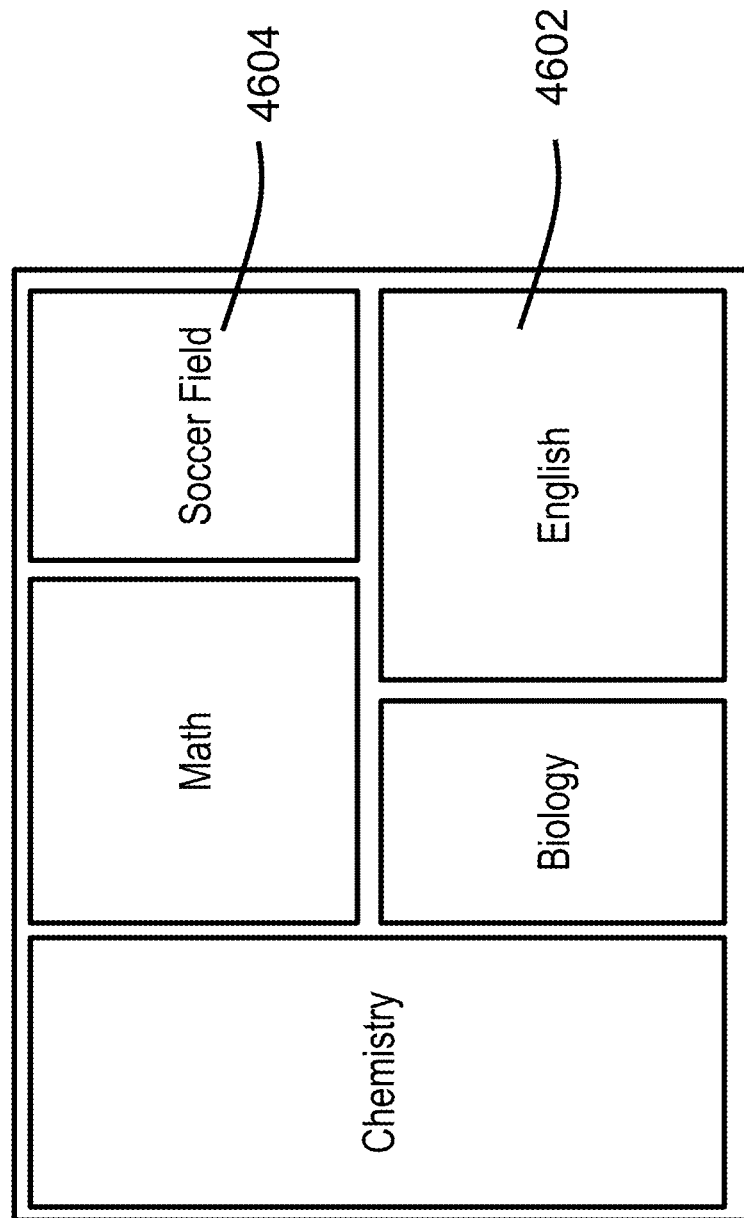
FIG. 46 illustrates an example of different classrooms/buildings for a school.

FIG. 46 illustrates an example of different classrooms/buildings for a school, which may describe a next-generation school. Speakers may be recruited for classrooms/buildings 4602 for different subjects. Teaching for these classrooms may be conducted using technologies described earlier in this patent application.

Figure 47:
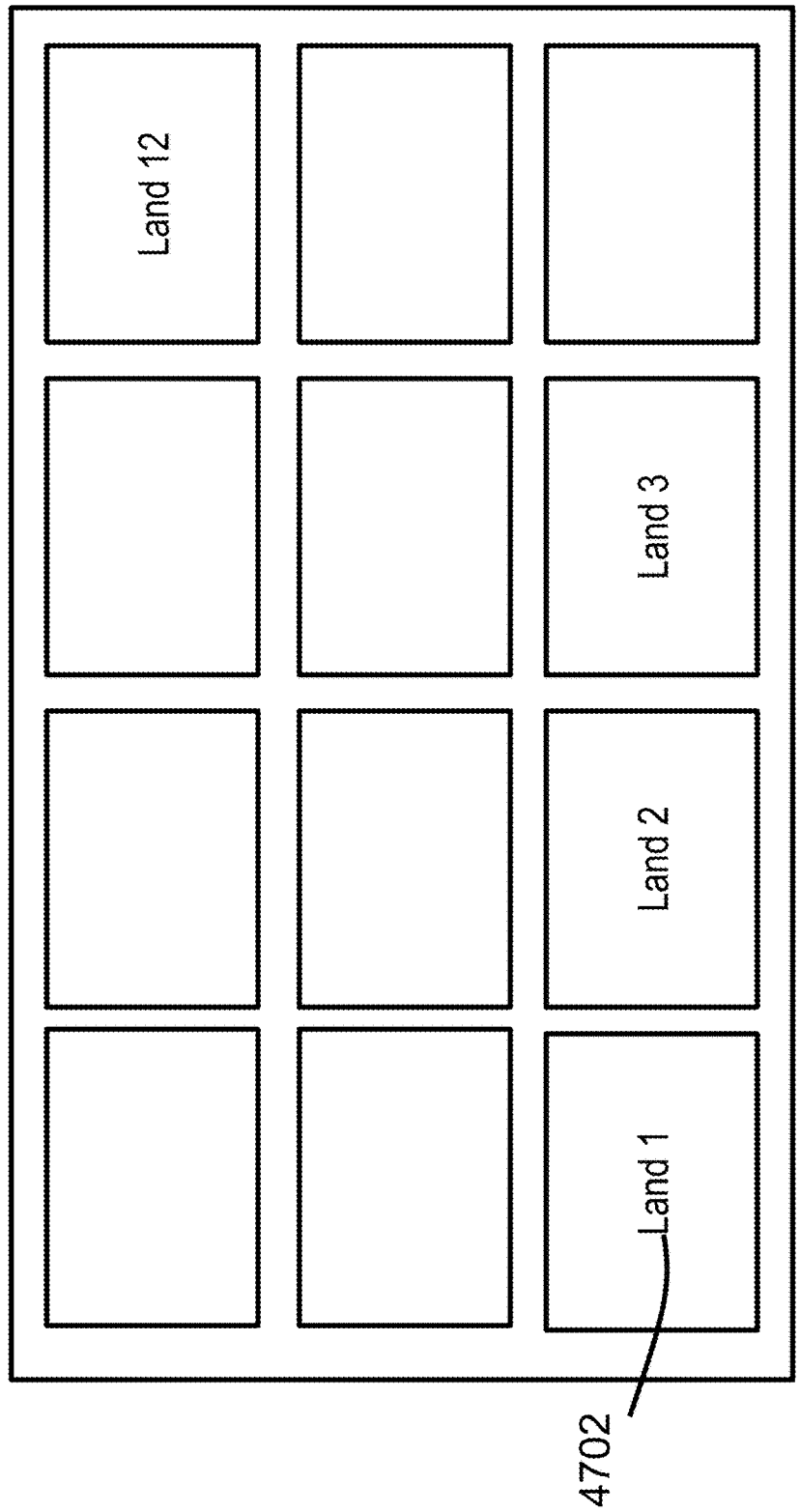
FIG. 47 illustrates an example of a learning metaverse.

FIG. 47 illustrates an example of a learning metaverse. Each piece of land 4702 in this metaverse may have a different institution or speaker or classroom. The lessons may be received from a centralized server as the lessons need to be high quality and high bandwidth, while payment for the learning may be decentralized and conducted using blockchain technology. This may allow speakers to know their payments won't change in the future and they have control of their revenue stream. A Decentralized Autonomous Organization (DAO) may govern rules for the payment blockchain. A virtual currency for the learning metaverse may be instituted.

Figure 48:
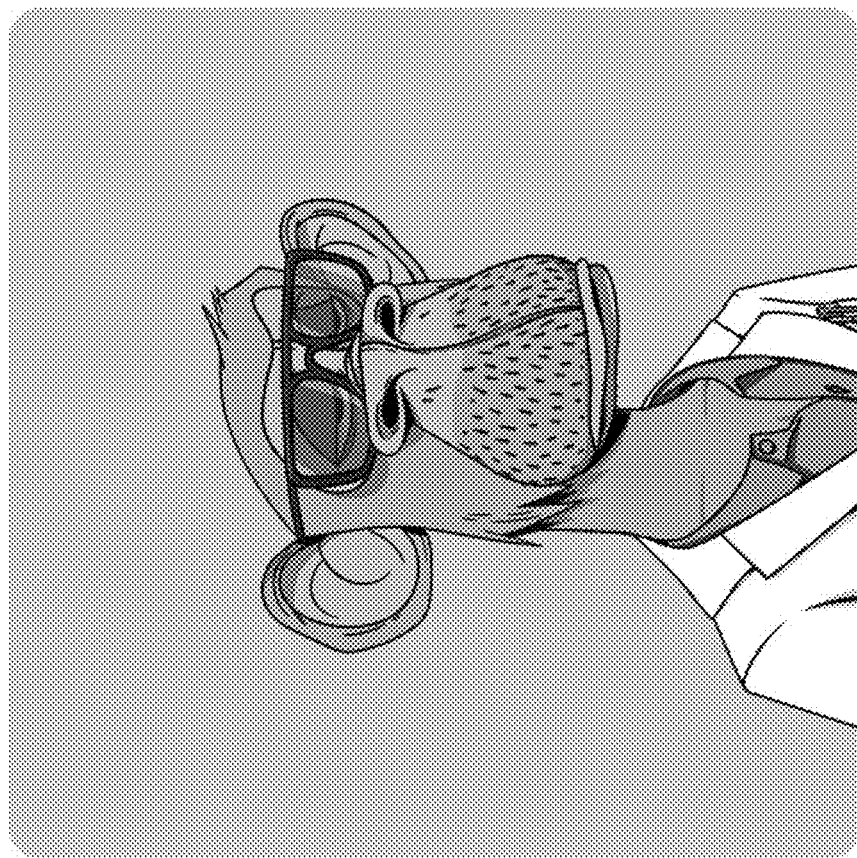
FIG. 48 illustrates an example of a picture which may be used as a profile picture and for teaching.

FIG. 48 48 illustrates an example of a picture which may be used as a profile picture and for teaching, wherein a picture for proof and profile pic (PFP) may be used as the character who teaches a lesson. The techniques described in this patent application, for example, may be used to make this happen.

Figure 49:
FIG. 49 illustrates exemplary rewards for achievement, learning, and/or testing.

FIG. 49 illustrates exemplary rewards for achievement, learning, and/or testing, where students who pass certain levels of achievement or learning or testing may get non fungible tokens (NFTs) for rewards. They may be able to exchange these NFTs for cash rewards, exchange these for other perks, or be qualified to tutor younger students (for example) based on the NFTs they own.

Figure 50:
FIG. 50 illustrates an example of a digital certificate for achievement.

Digital certificates, like POAPs (Proof of Attendance Protocols), as shown in FIG. 50 may also be presented as rewards for achievement.

Automated Slide Generation from Narration

It would be helpful to help teachers, instructors, speakers, and others creating content to make content creation faster and better. FIG. 51A-D illustrates an example of how systems configured as disclosed herein can provide such help, where a content creator inputs narration the speaker may want to say, and a slide (or many slides) may be automatically generated from that information. Alternatively, recommendations may be provided for slide generation. The narration inputs may be in the form of text.

Figure 51A:
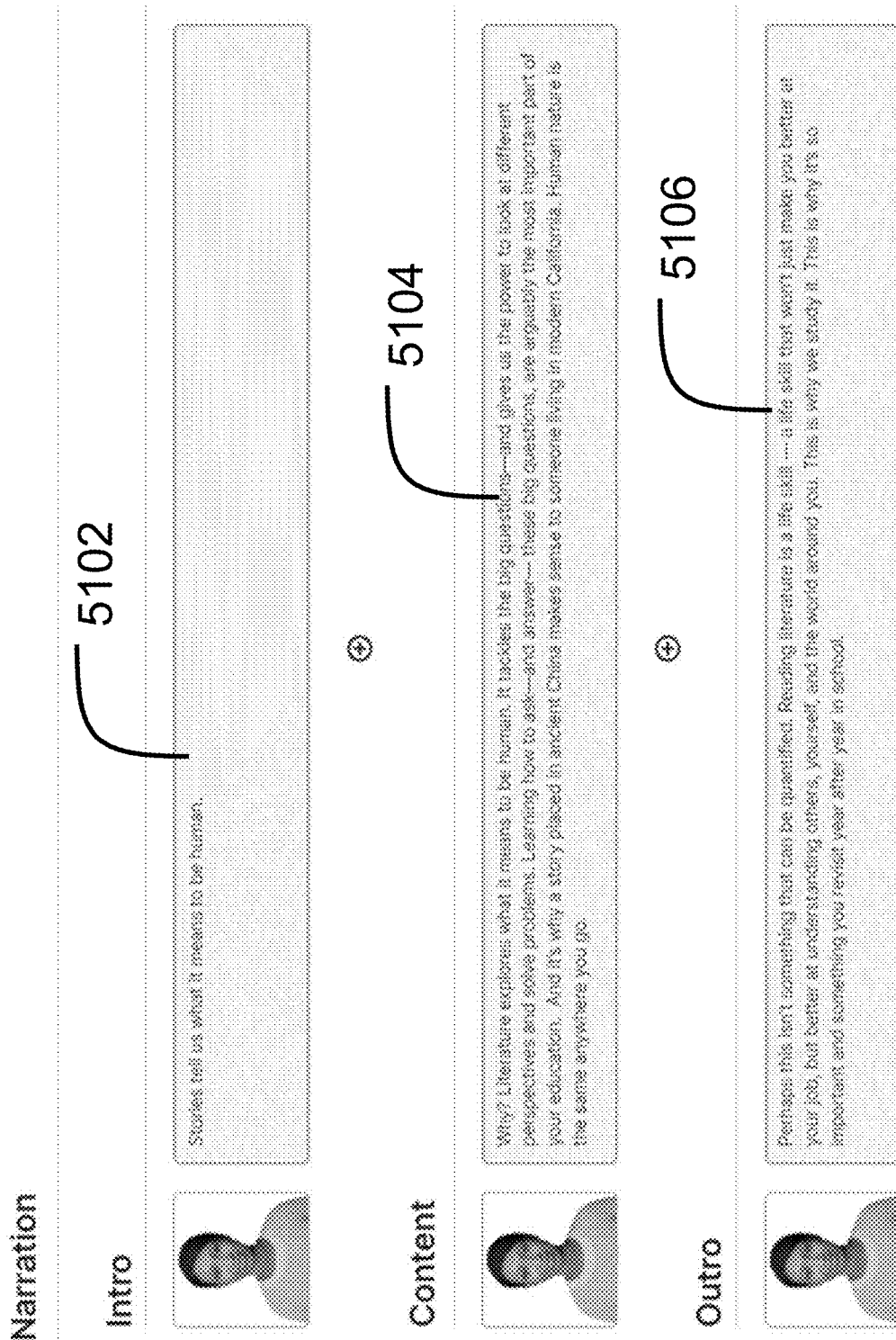
FIG. 51A illustrates an example of narration inputs being provided to the text-to-animation system.

FIG. 51A illustrates the narration inputs that may be provided to the text-to-animation system. This may optionally be divided into an intro 5102, the content 5104 itself which may need to be represented in slides and an outro 5106, which may be communicated without slides shown.

Figure 51B:
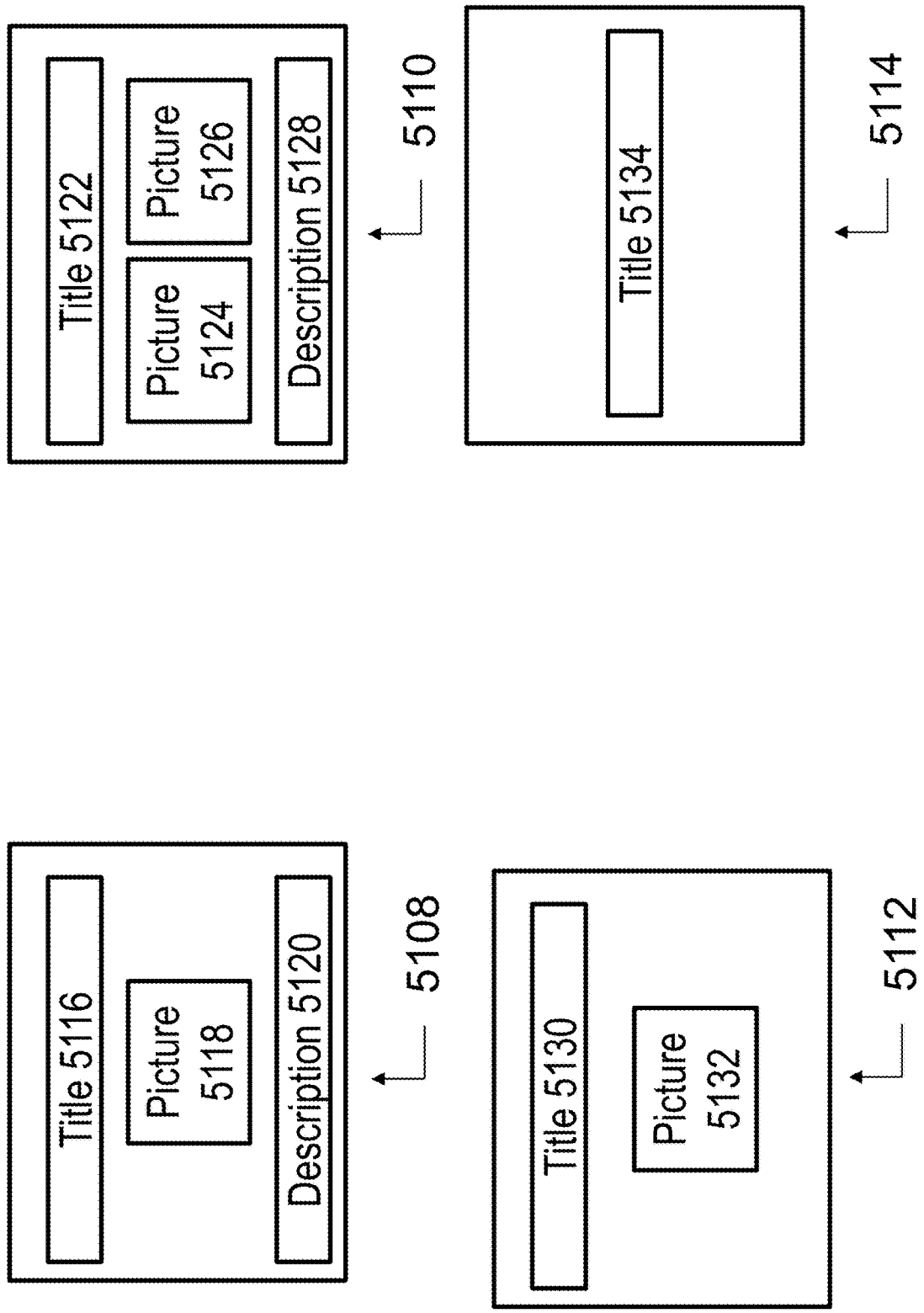
FIG. 51B illustrates an example of predicting slide structure.

Based on the information provided in the narration inputs, an appropriate slide structure may be predicted, some examples of which are shown in FIG. 51B. This slide structure may optionally be determined using a neural network. The slide may have a title 5116, a picture 5118 and description 5120 as indicated in view 5108. Alternatively, the slide may have a title 5122, two pictures 5124 and 5126 and a description 5128 as shown in view 5110. In another case, the slide may have a title 5130 and just one picture 5132 as indicated in view 5112. Alternatively, the slide may just have a title 5134 as indicated in view 5114. The slide structure predictions may be made using a neural network, for example, by providing training data on slide structures for different types of narration inputs.

Figure 51C:
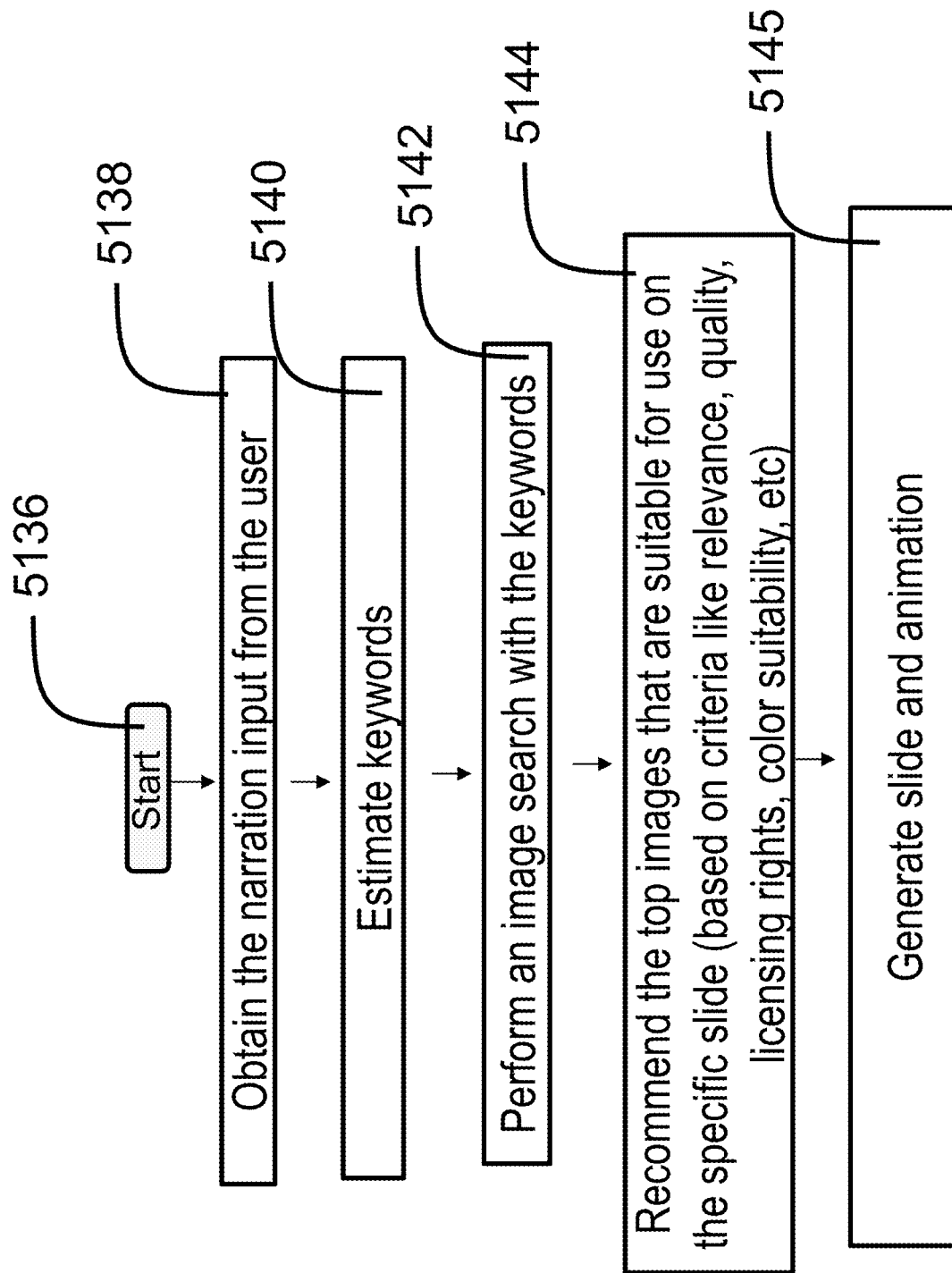
FIG. 51C illustrates an example of a picture recommendation algorithm.

FIG. 51C illustrates an example of a picture recommendation algorithm, with the algorithm capable of making recommendations for the pictures shown in FIG. 51B. Once the narration input from the user 5138 may be obtained, keywords for it may be obtained as shown in step S140. This may be done, for example, using a neural network or some keyword detection algorithm. Following that, in step S142, an image search may be conducted with the keywords. The top images suitable for use on that slide may be filtered out in step S144. This may be done using criteria such as, for example, relevance to the keywords, quality of the images, licensing rights, color suitability to the color template used for the animation video, etc. The top images may then be recommended to the user for use in their slide, or alternatively, a sample slide may be automatically generated. Additional variations may be possible—for example, videos may be presented instead of just images. Once the slide is generated, an animation may be obtained as shown in step S145.

Figure 51D:
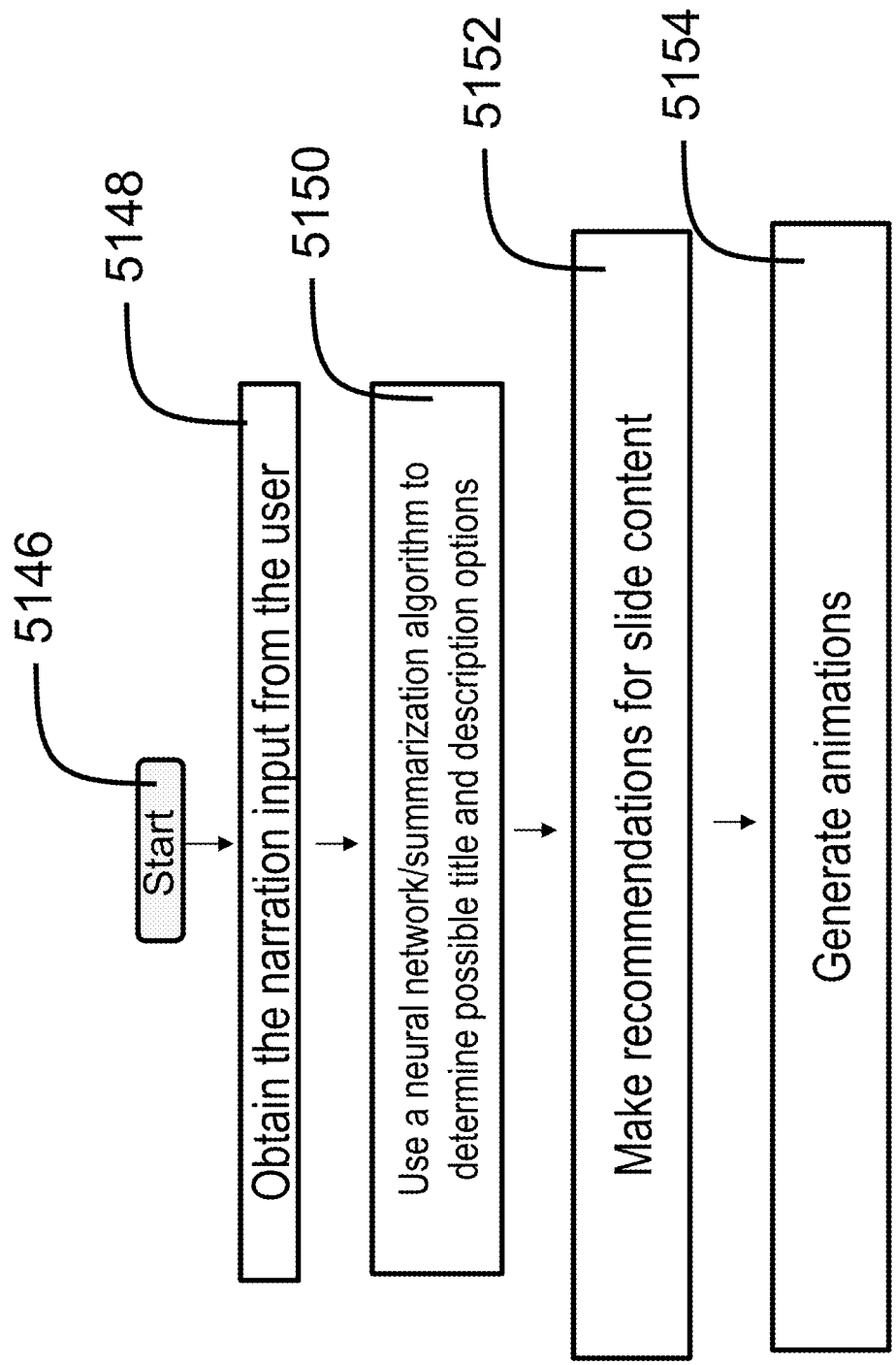
FIG. 51D illustrates an example of title and description recommendation algorithm.

FIG. 51D illustrates an example of title and description recommendation algorithm, where title and description may be obtained for a slide depicted in FIG. 51B automatically. Alternatively, recommendations for title and description may be obtained and shown to content creators (for example, to save them time or help them do a better job). Following start of the algorithm 5146, the narration input from the user may be obtained in step S148. A neural network or alternatively, a summarization algorithm or a paraphrasing algorithm, may be used to determine title and/or description based on various narration inputs in step S150. This may, for example, be done by using a language model (such as, for example, GPT3) and fine-tuning the model based on slide title and description content. Following that, recommendations may be made for slide content in step S152. Following the recommendations and the user selecting one of the recommendations, animations and/or animation videos for instruction may be generated. Alternatively, instead of listing a set of recommendations, the best recommendation may automatically be used for generating the slide content. Following that, animations and/or animation videos may be generated.

Improving Narration Content Provided by a User

Figure 52A:
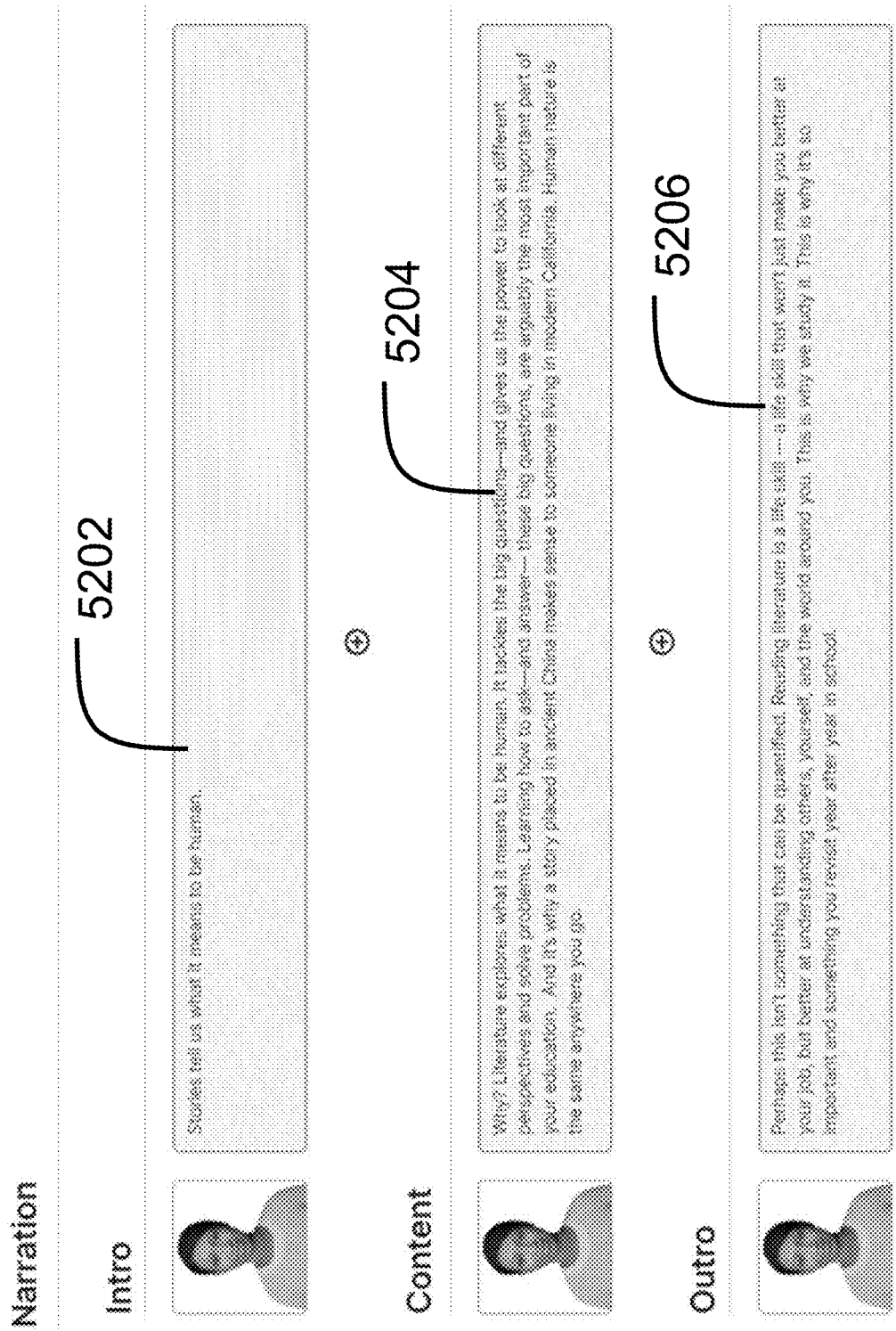
FIGS. 52A and 52B illustrate an example of improving narration input provided by a content creator using natural language processing.
Figure 52B:
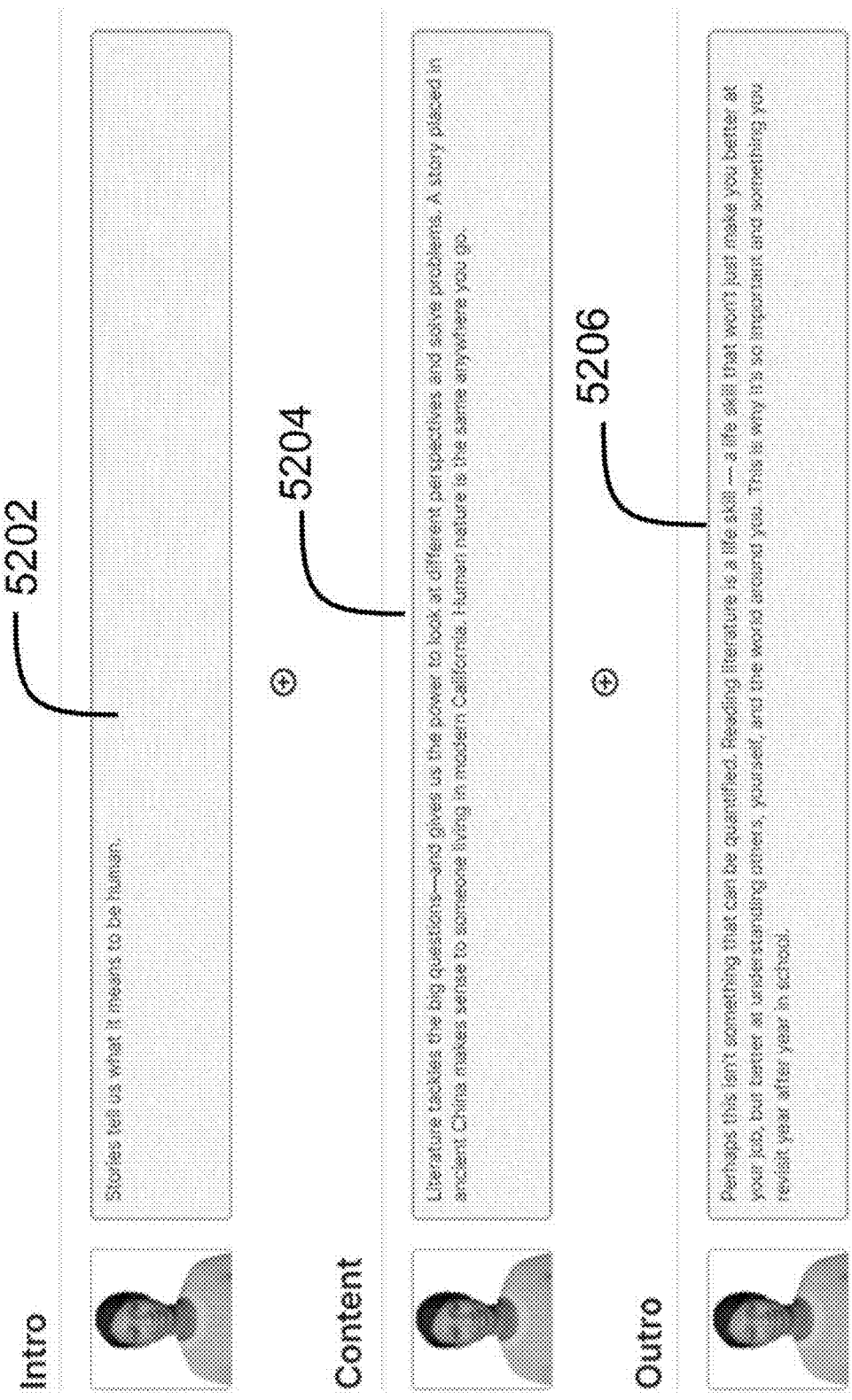

FIG. 52A-B illustrate an example of improving narration input provided by a content creator using natural language processing, where text narration input provided by a content creator may be improved using natural language processing technology (which may use a neural network). Similar techniques may be applicable to slide description and title of a slide as well. FIG. 52A illustrates the narration input provided by the content creator. It may optionally be divided into an intro 5202, content 5204 and outro 5206. FIG. 52B illustrates an example of output of the natural language processing technology after it works on the narration inputs of FIG. 52A. The exemplary content in FIG. 52A may be processed in several ways to arrive at the exemplary content in FIG. 52B.

(1) By using a paraphrasing AI tool that reduces the number of syllables in various words
(2) Alternatively, by using a paraphrasing AI tool that reduces the length of one or more sentences
(3) Alternatively, by fixing grammar issues or spelling issues
(4) Alternatively, by converting sentences from passive to active voice, which is often thought to be more engaging
(5) Alternatively, by having the style of well-known speakers
(6) Alternatively, by making the tone of the speech more positive
(7) Alternatively, by adding humor or anecdotes.

Following this processing, a set of recommendations may be provided to the content creator for use, or alternatively, the best recommendation may be used automatically. Following that, an animation video or 3D animation may be generated.

Figure 53:
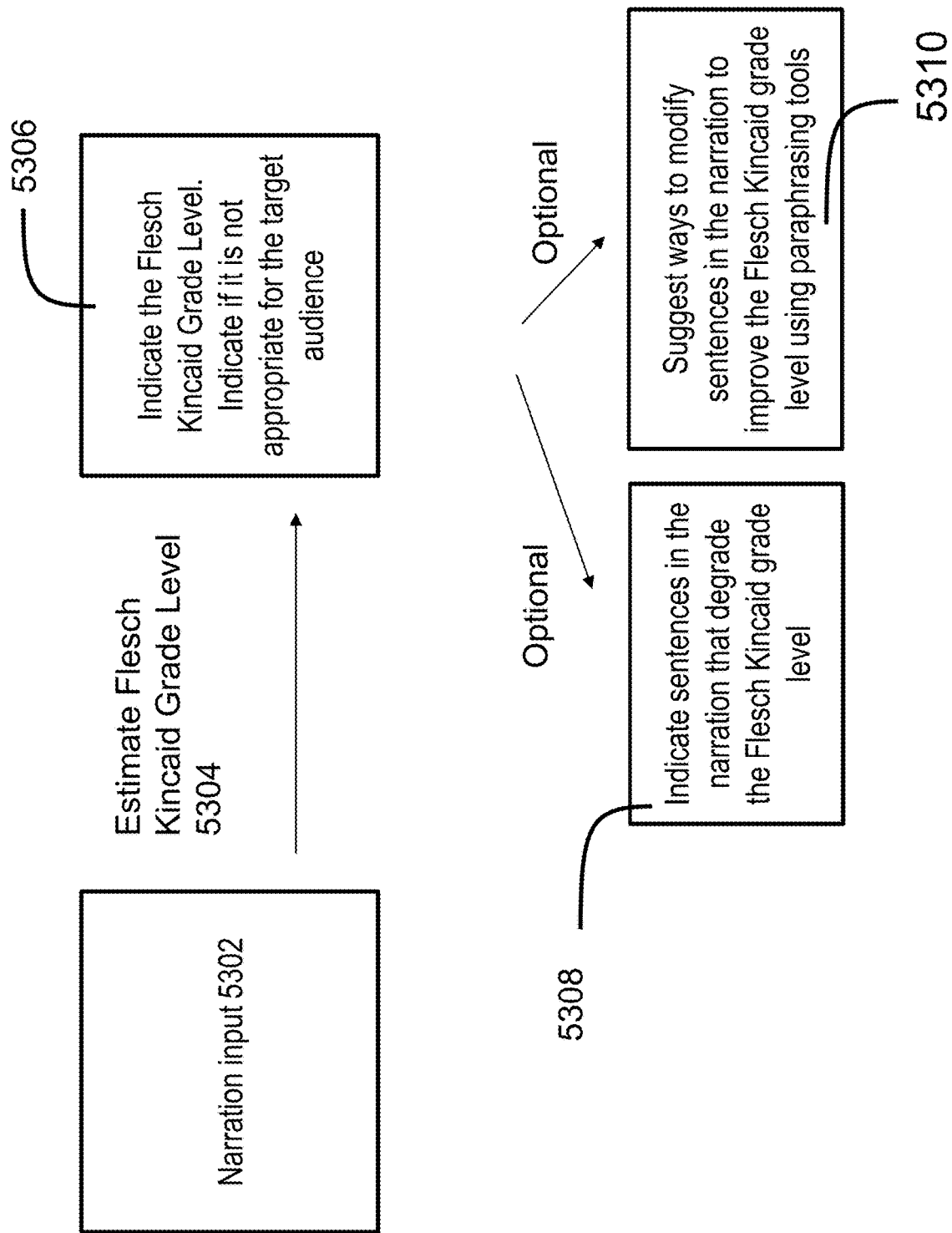
FIG. 53 illustrates an example of using a Flesch Kincaid Grade Level to determine quality of narration input and/or improve the narration input for text-to-animation.

Improving Narration Content by Estimating the Flesch-Kincaid Grade Level and/or Other Readability Metrics FIG. 53 illustrates an example of using a Flesch Kincaid grade level to determine quality of narration input and/or improve the narration input for text-to-animation, where content quality may be benchmarked (determined) or content may be improved by applying the concept of the Flesch Kincaid grade level. This may apply to either the narration input or to contents of a slide, such as description and title. Narration input 5302, for example, may be provided and Flesch Kincaid grade level 5304 for it may be estimated. If the person reading the content may be a $7^{th}$ grade student, for example, if the Flesch Kincaid grade level for it is not appropriate for that student, it may be depicted to the content creator. It is often preferred to keep the Flesch Kincaid grade level lower so it may be understandable to more people. Optionally, sentences which may degrade the Flesch Kincaid grade level may be indicated as indicated in 5308. As another option, a paraphrasing tool which may utilize a neural network may be used to modify sentences in the narration to improve the Flesch Kincaid grade level as indicated in 5310.

Like benchmarking using a Flesch Kincaid grade level, benchmarking and showing a score for it may be performed on the basis of grammar, humor, crispness/brevity/succinctness, or appropriateness for a certain age group or reading comprehension.

Figure 54:
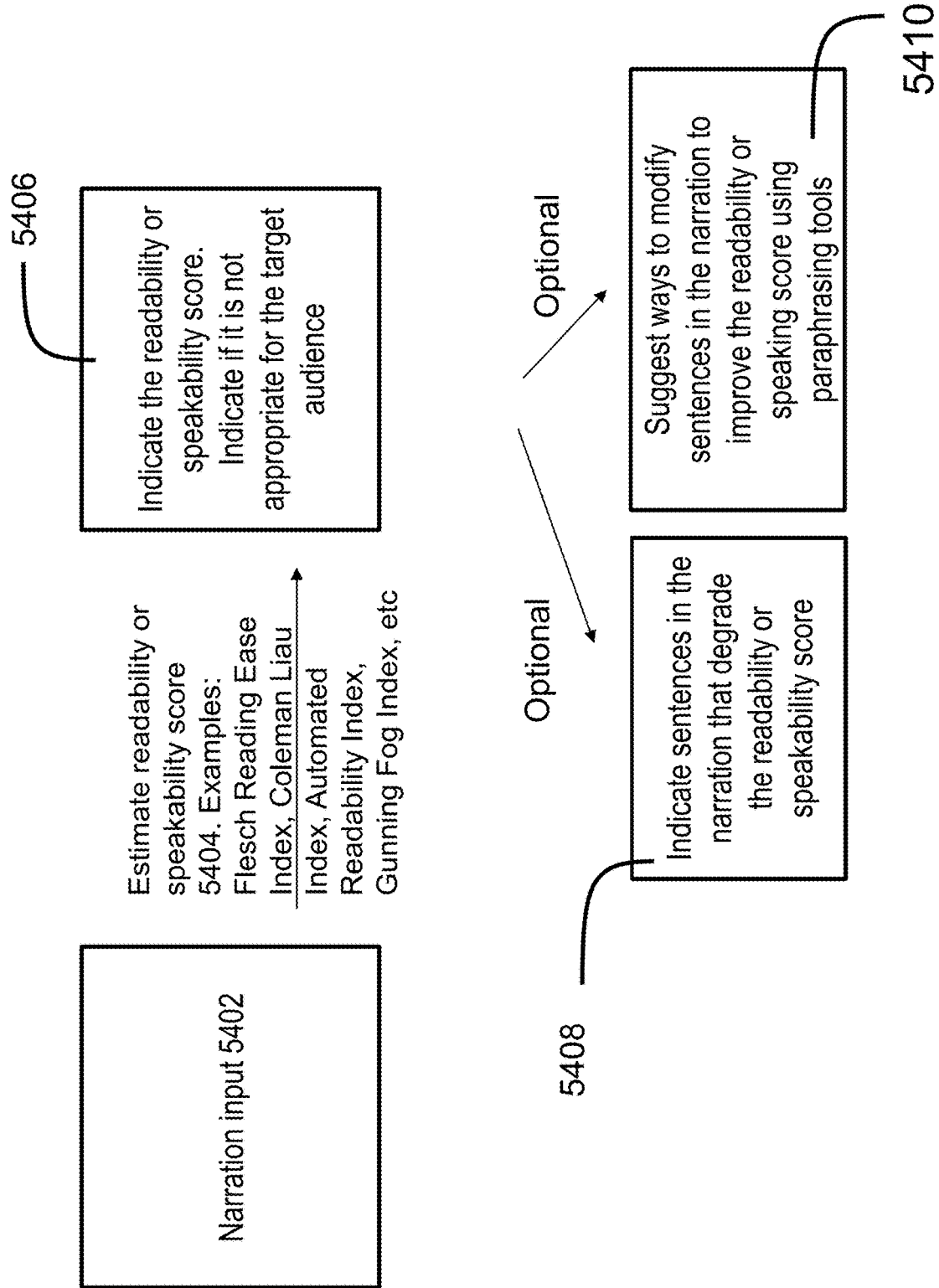
FIG. 54 illustrates an example of using any readability or speak-ability metric to determine quality of narration input and/or improve the narration input for text-to-animation.

FIG. 54 illustrates an example of using any readability or speak-ability metric to determine quality of narration input and/or improve the narration input for text-to-animation, where various other readability or speak-ability metrics may be used in place of the Flesch Kincaid grade level and while techniques similar to the ones described in FIG. 53 may be used. These metrics may include the Flesch Reading Ease Index, the Coleman Liau Index, the Automated Readability Index, the Gunning Fog Index, time to read metric, a time to speak metric, the SMOG index, the Dale-Chall score, the FORCAST grade, the average grade, and/or some other metric. Combinations of various metrics may be used as well.

Miscellaneous Techniques to Improve the Content Quality

Figure 55:
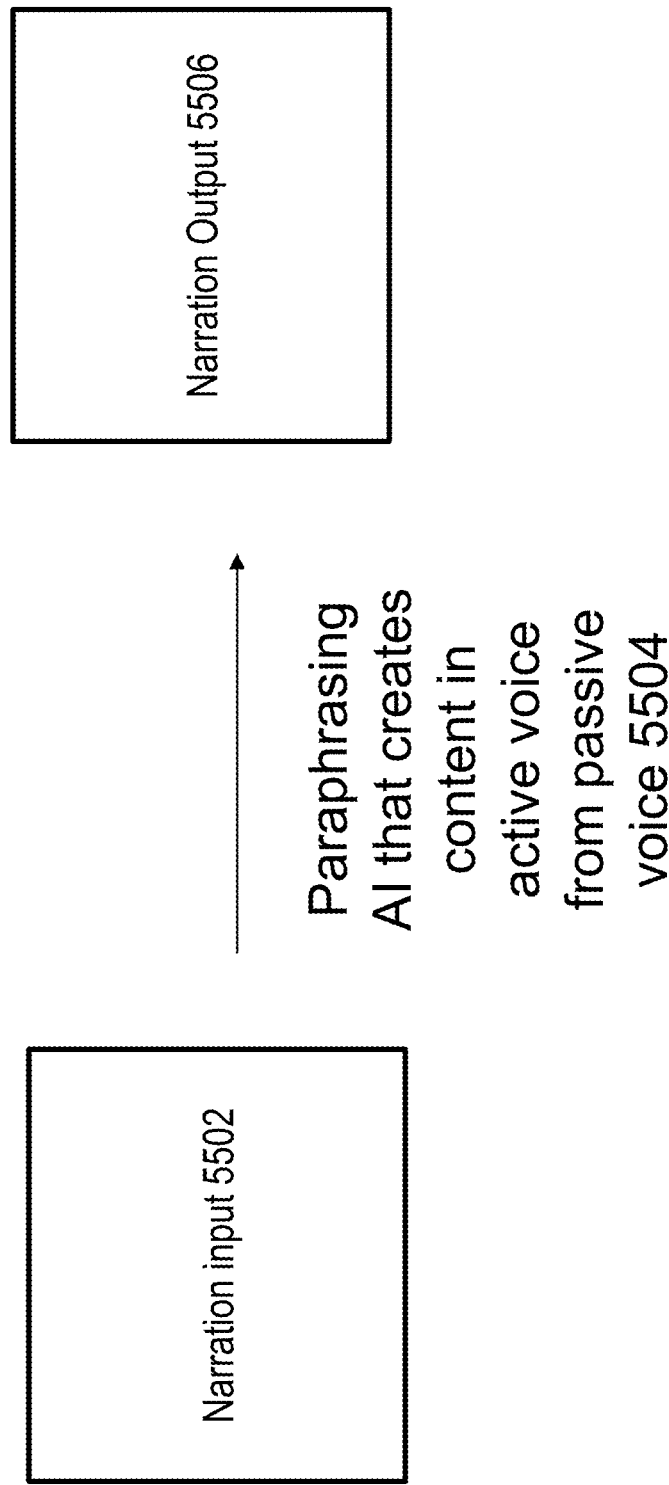
FIG. 55 illustrates an example of using a paraphrasing AI to convert passive voice into active voice for sentences of the content for text-to-animation.

FIG. 55 illustrates an example of using a paraphrasing AI to convert passive voice into active voice for sentences of the content for text-to-animation. Narration input 5502 may be processed by a paraphrasing AI 5504 that may convert sentences in passive voice to sentences in active voice. Following that, narration output 5506 may be provided as a recommendation or even as a replacement to the narration input 5502.

Figure 56:
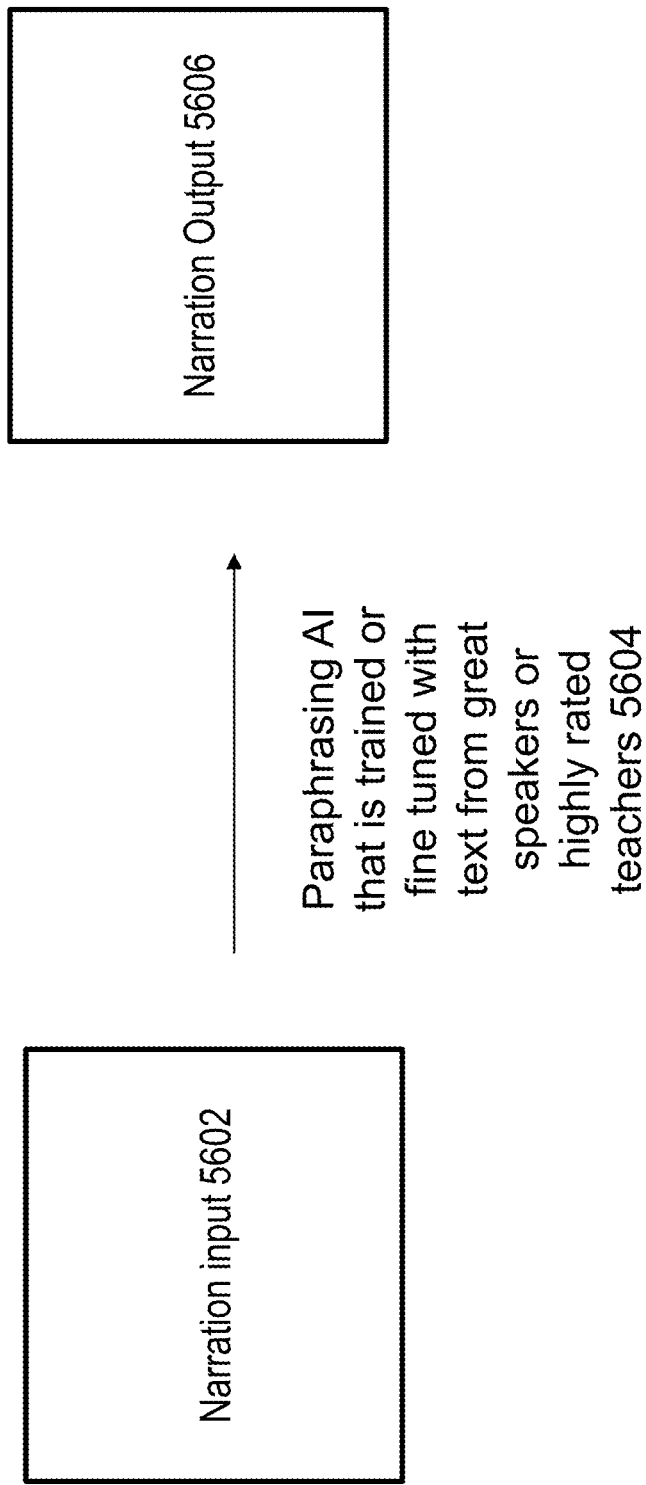
FIG. 56 illustrates an example of using a paraphrasing AI to make content sound like it is from a highly rated speaker for text-to-animation.

FIG. 56 illustrates an example of using a paraphrasing AI to make content sound like it is from a highly rated speaker for text-to-animation. Narration input 5602 may be processed by a paraphrasing AI 5604 that may be trained or fine-tuned with text from speeches of great/notable speakers or teachers. The paraphrasing AI 5604 may convert the narration input 5602 into another form 5606 which may sound like (or resembles) text from speeches of the great/notable speakers or teachers.

Figure 57:
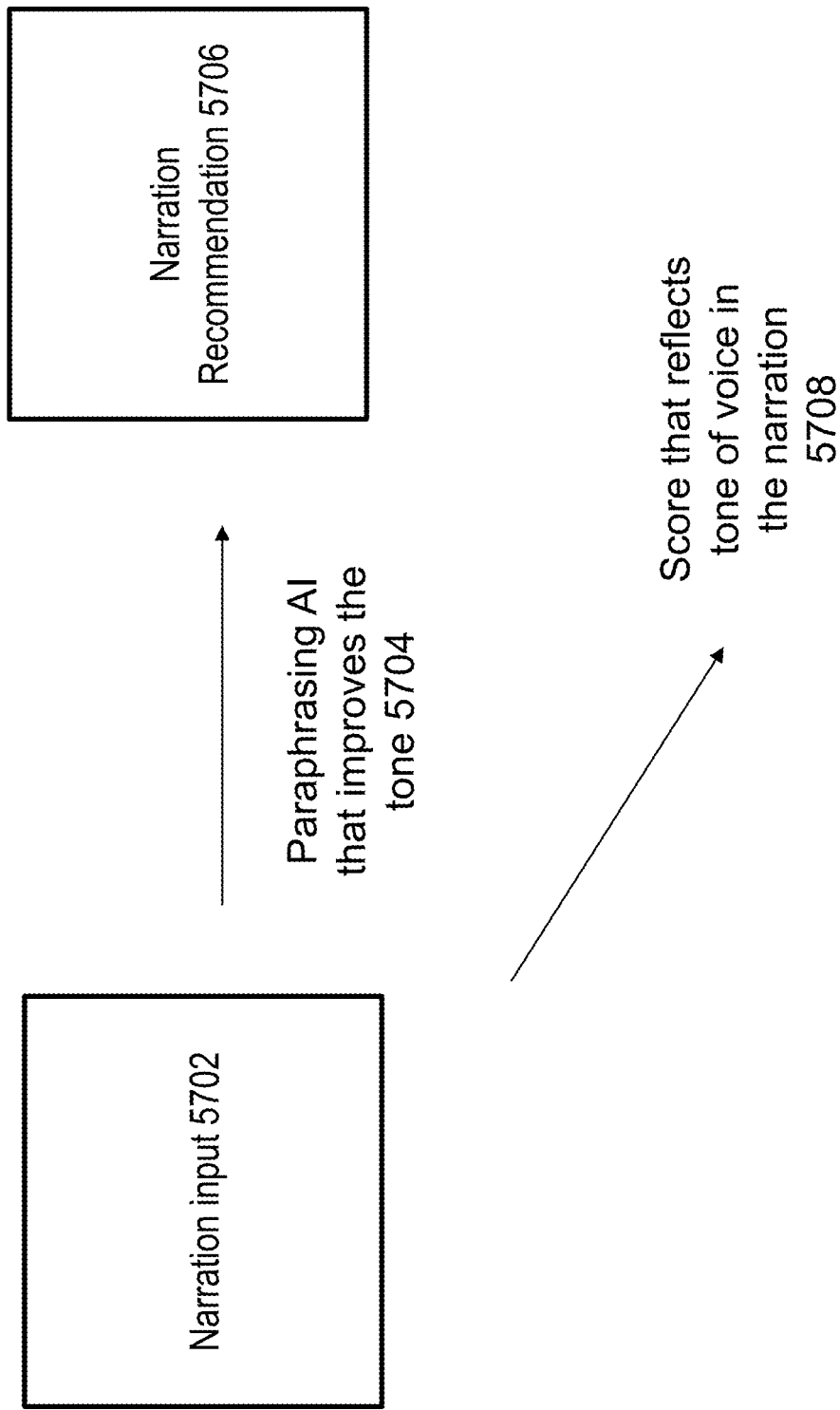
FIG. 57 illustrates an example of scoring tone of voice in content.

FIG. 57 illustrates an example of scoring tone of voice in content. Narration input 5702 may be analyzed to predict a score 5708 that reflects the tone of voice in it. If the tone of voice can be improved by the content creator, a recommendation may be made. A paraphrasing AI 5704 may be used to paraphrase the narration input to improve the tone and provide a recommendation 5706.

Figure 58:
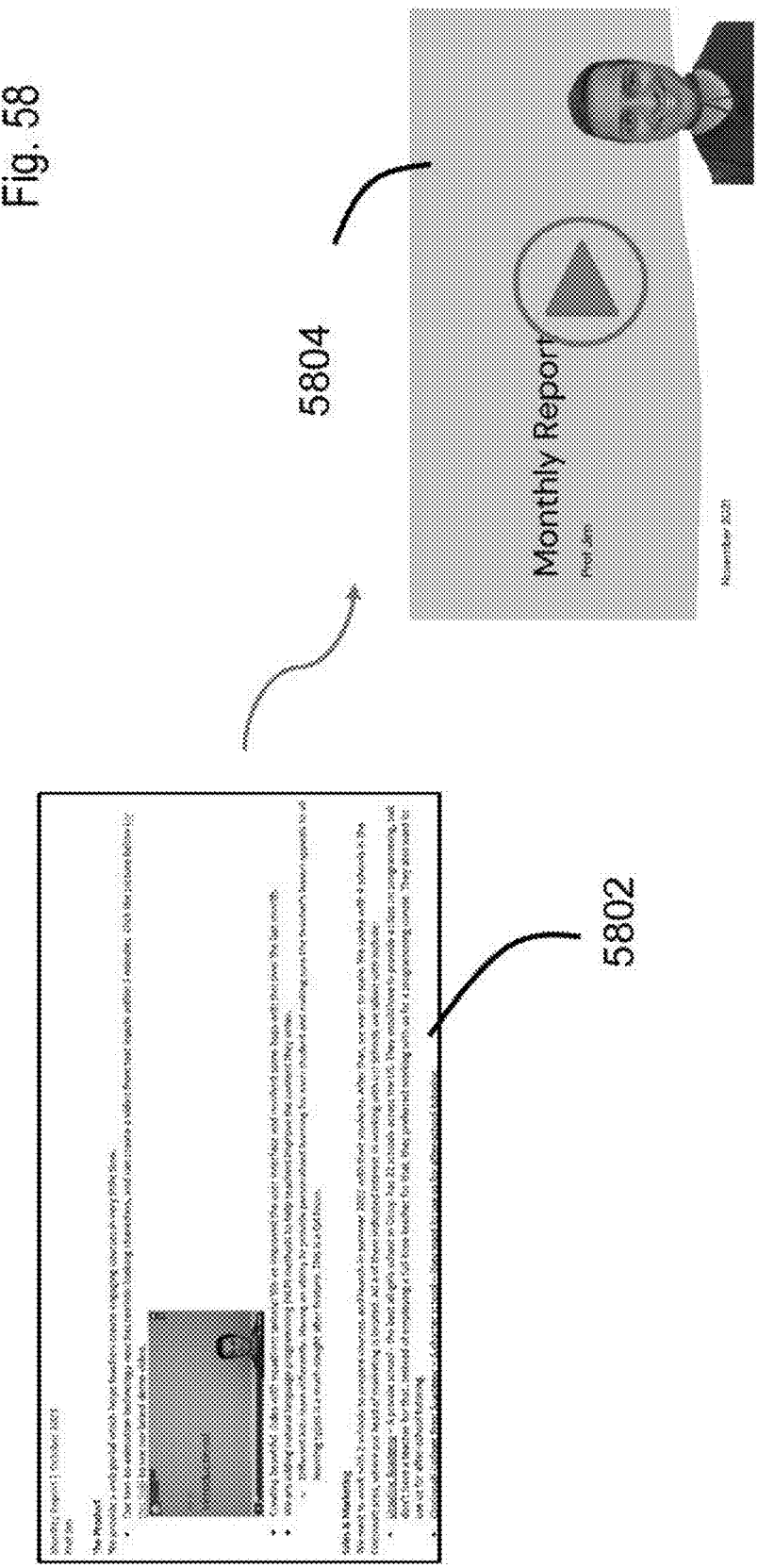
FIG. 58 illustrates an example of using a text-to-animation system to convert a newsletter into an animated video of the writer.

Applications of Text-to-Animation Technology to Newsletters, Email, Social Media, Etc FIG. 58 illustrates an example of using a text-to-animation system to convert a newsletter into an animated video of the writer, where text content of a newsletter 5802 may be automatically converted into video form 5804 using the text-to-animation technology. An avatar of the newsletter's writer may be animated.

Figure 59:
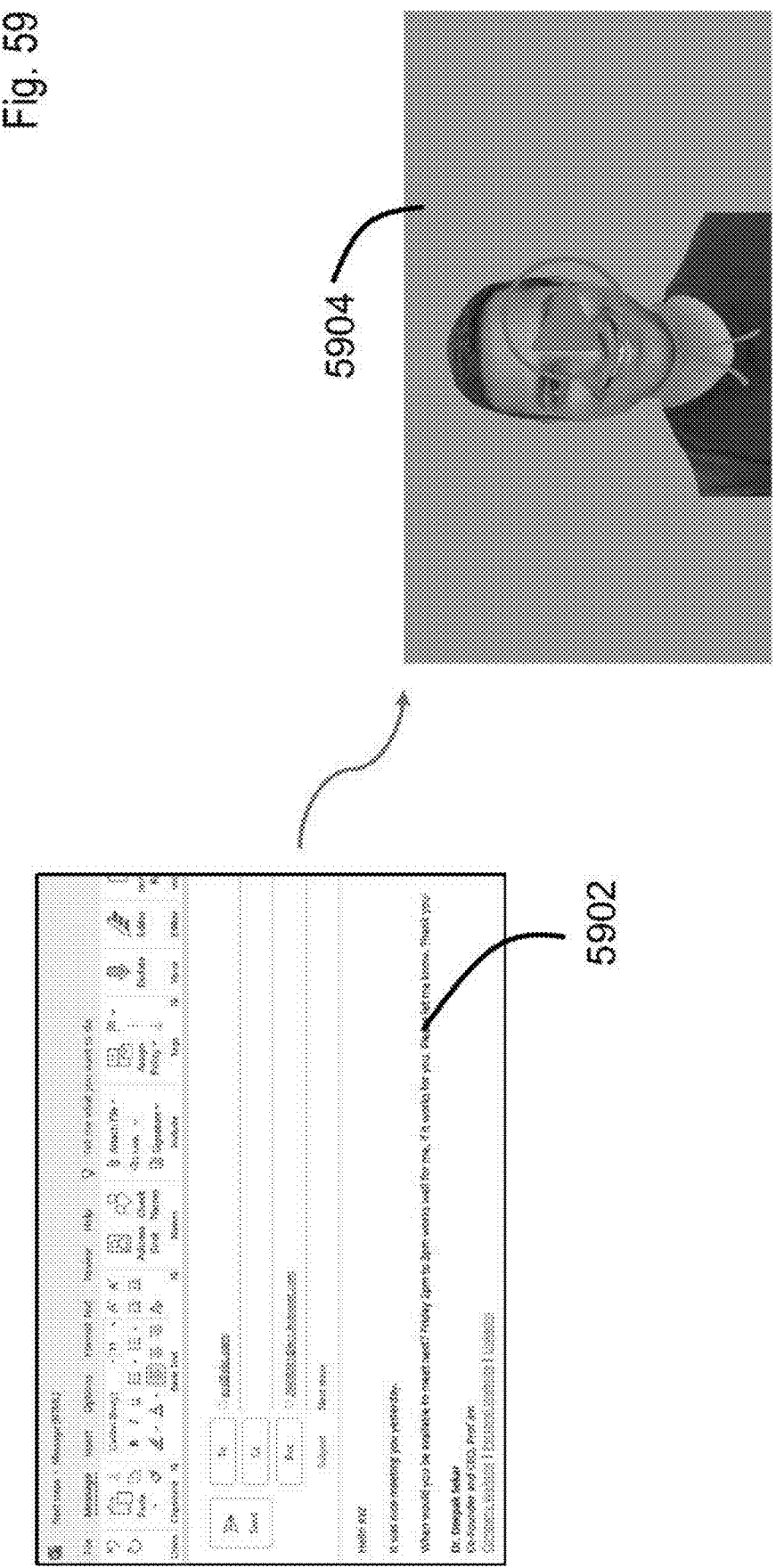
FIG. 59 illustrates an example of using a text-to-animation system to convert an email into an animated video of the writer.

FIG. 59 illustrates an example of using a text-to-animation system to convert an email into an animated video of the writer, where text content of an email 5902 may be automatically converted into video form 5904 using the text-to-animation technology. An avatar of the email's writer may be animated.

Figure 60:
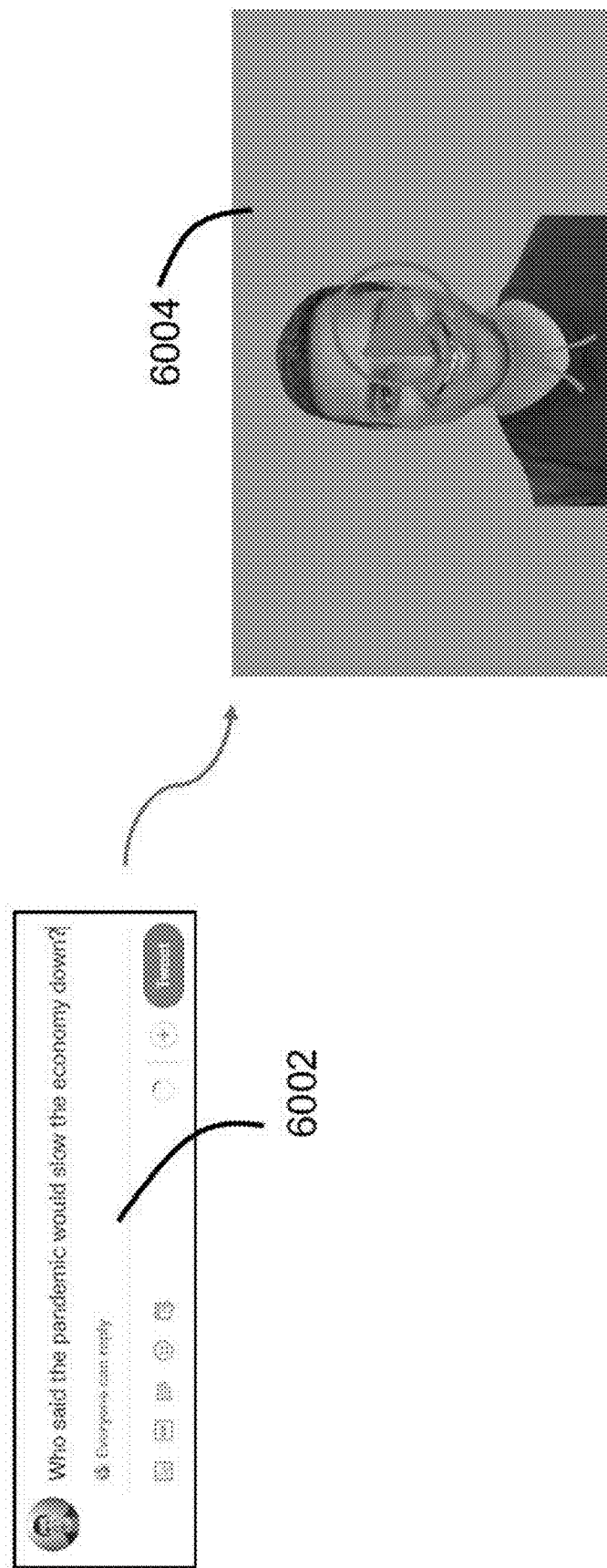
FIG. 60 illustrates an example of using a text-to-animation system to convert a social media post into an animated video of the writer.

FIG. 60 illustrates an example of using a text-to-animation system to convert a social media post into an animated video of the writer, where text content of a social media post 6002 may be automatically converted into video form 6004 using the text-to-animation technology. An avatar of the social media post's writer may be animated.

Figure 61:
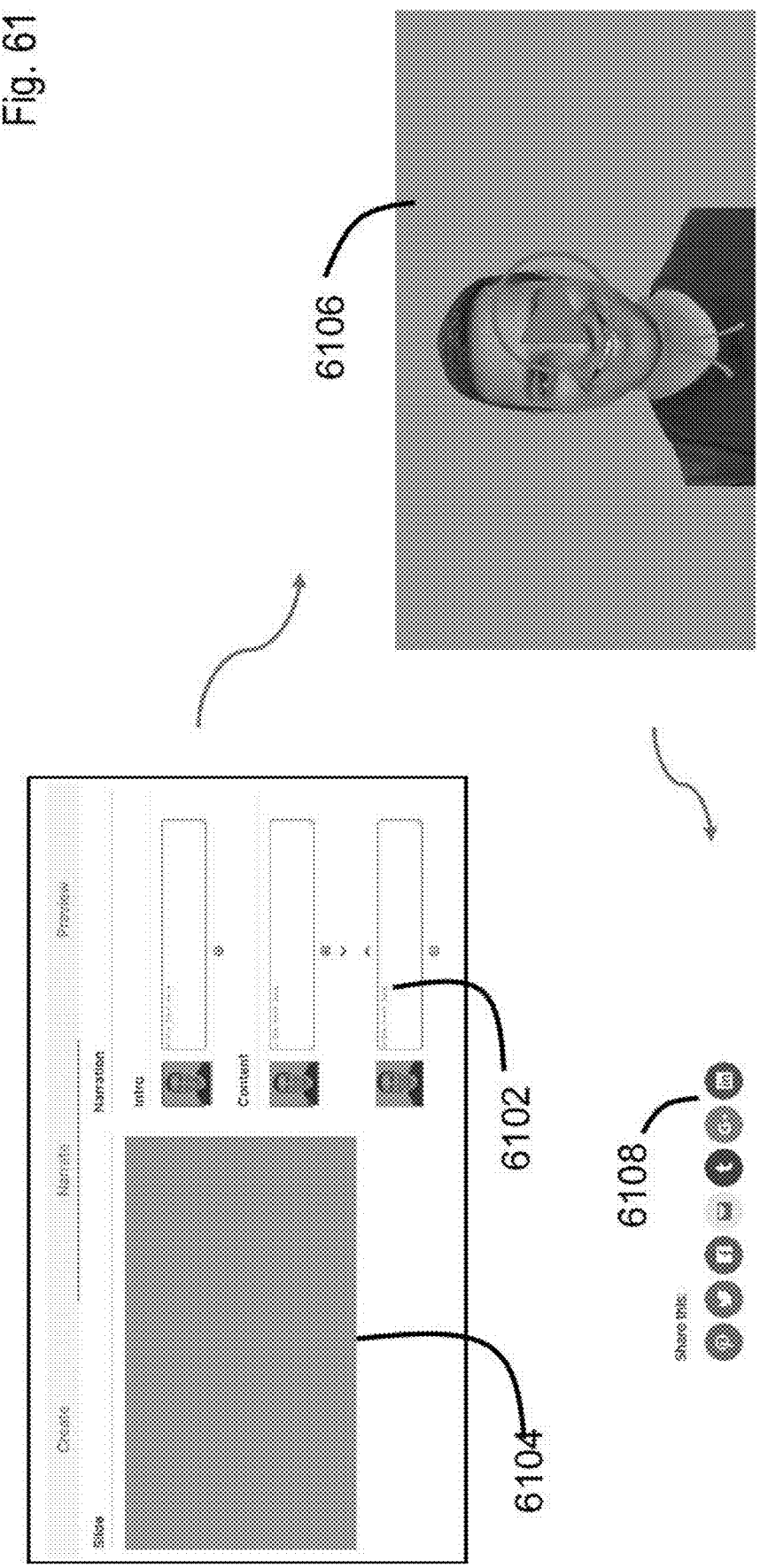
FIG. 61 illustrates an example of using a text-to-animation system to convert instructional text and slides into an instructional video, which can then be shared on various platforms.

FIG. 61 illustrates an example of using a text-to-animation system to convert instructional text and slides into an instructional video, which can then be shared on various platforms, wherein slide 6104 and narration content 6102 may be entered to create an instructional video 6106 using the text-to-animation technology. Business models may optionally dictate that the maximum length of the video that can be shared for free or for a certain price on social media or other forms 6108 may be limited to a certain extent, such as, for example, 1 minute.

Generation of Slides and Narration Based on Messages to be Conveyed

Figure 62B:
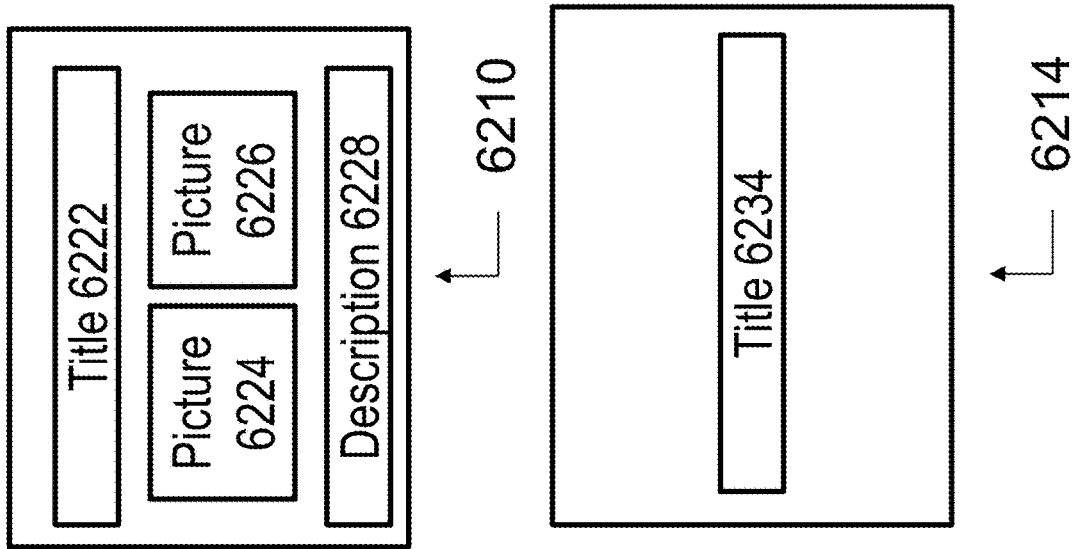
FIG. 62B illustrates an example of possible layouts based on the information to be conveyed.

FIG. 62A-E illustrates an example of a user creating slides and narration automatically using technology. FIG. 62A illustrates an example first step of a user creating slides and narration. The user may be prompted for the top messages to be conveyed on the slide 6200. On entering that, along with any equations 6202 or images 6204 the user has, a slide may be generated automatically using the methods shown in FIG. 62B-FIG. 62D.

FIG. 62B shows examples of slide layouts that may be possible, based on the images, equations, and main messages to be conveyed. If a single picture may be provided, a layout such as, for example, layout 6208 may be an option, which may have a title 6216 and a description 6220. So could layout 6212 which may have a title 6230. If two pictures 6224 and 6226 may be provided, a layout 6210 may be possible with title 6222 and description 6228. Layout 6214 may be possible in some instances which have a title 6234. It will be clear to one skilled in the art that several other layout options may be possible depending on the material entered in FIG. 62A.

Figure 62C:
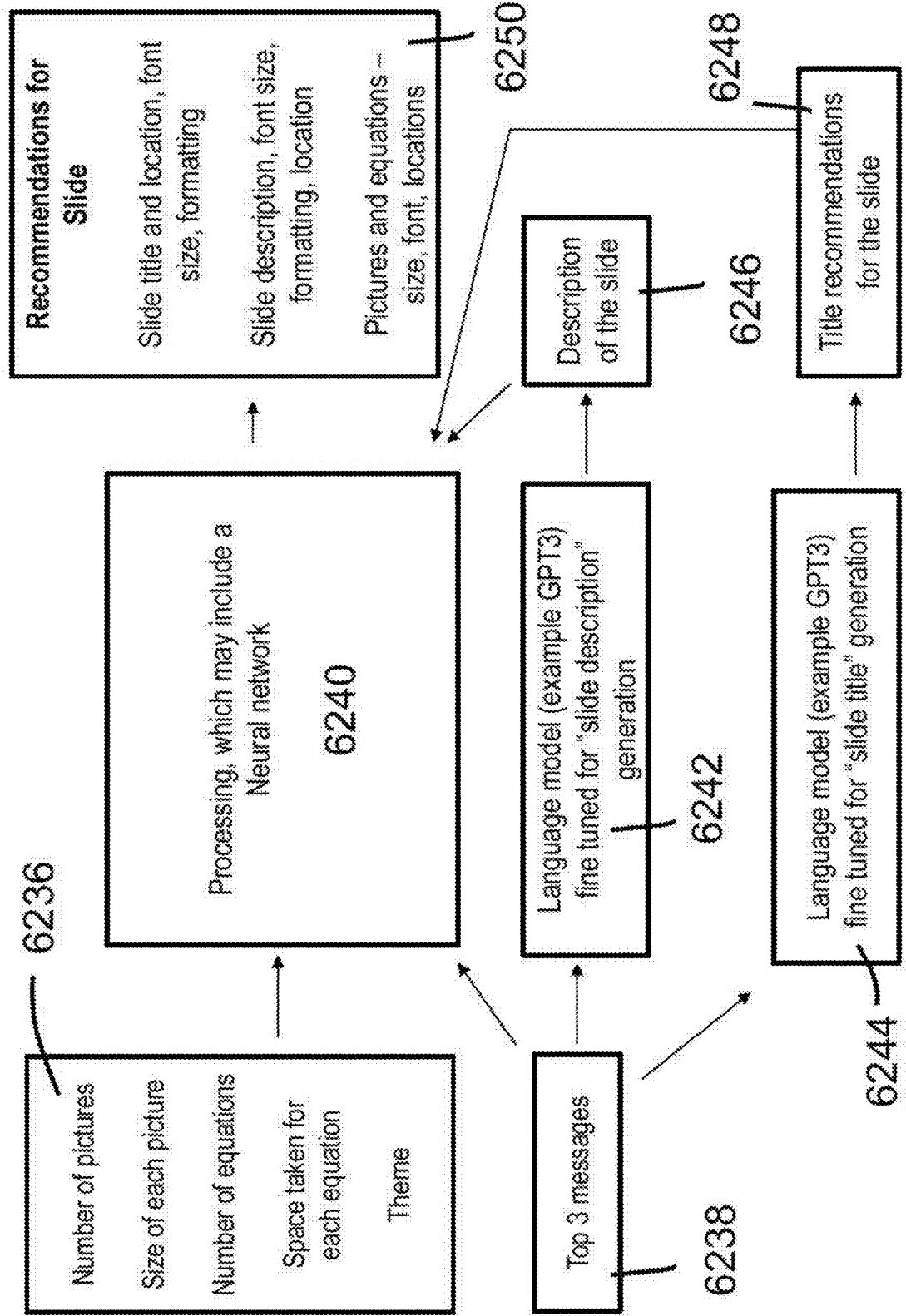
FIG. 62C illustrates an example method to automatically generate slide recommendations.

FIG. 62C illustrates an example method to automatically generate slide recommendations, those recommendation being based on inputs provided through methods such as the one described in FIG. 62A. Top messages to be conveyed through the slide 6238 may be provided as inputs by the speaker, as may parameters 6236, which may include number of pictures on the slide, size of each picture, number of equations, space taken for each equation and theme of the slide. Following this, a description 6246 (such as the one described in FIG. 62B) may be generated using a language model (such as, for example, GPT3) that is trained on a big database of natural language content. Optionally, the language model 6242 may be fine tuned for generating slide descriptions by providing it some training data for that purpose. Similarly, title recommendations for the slide 6248 may be generated using a language model 6244 as well. Once the title 6248 and description 6246 may be obtained, it may be combined along with the top messages to be conveyed 6238 and other input data 6236 to get recommendations for slide designs 6250. These recommendations may include locations of slide titles, description, pictures, and/or equations. The recommendations may also include sizes and formatting of all these items. These recommendations may be obtained using processing 6240 which may involve calculations based on size of the slide and size of each of the contents (like pictures, equations, title, descriptions), or they may be obtained, optionally, using a neural network. This neural network may be trained based on slide design examples for various input parameters.

Figure 62D:
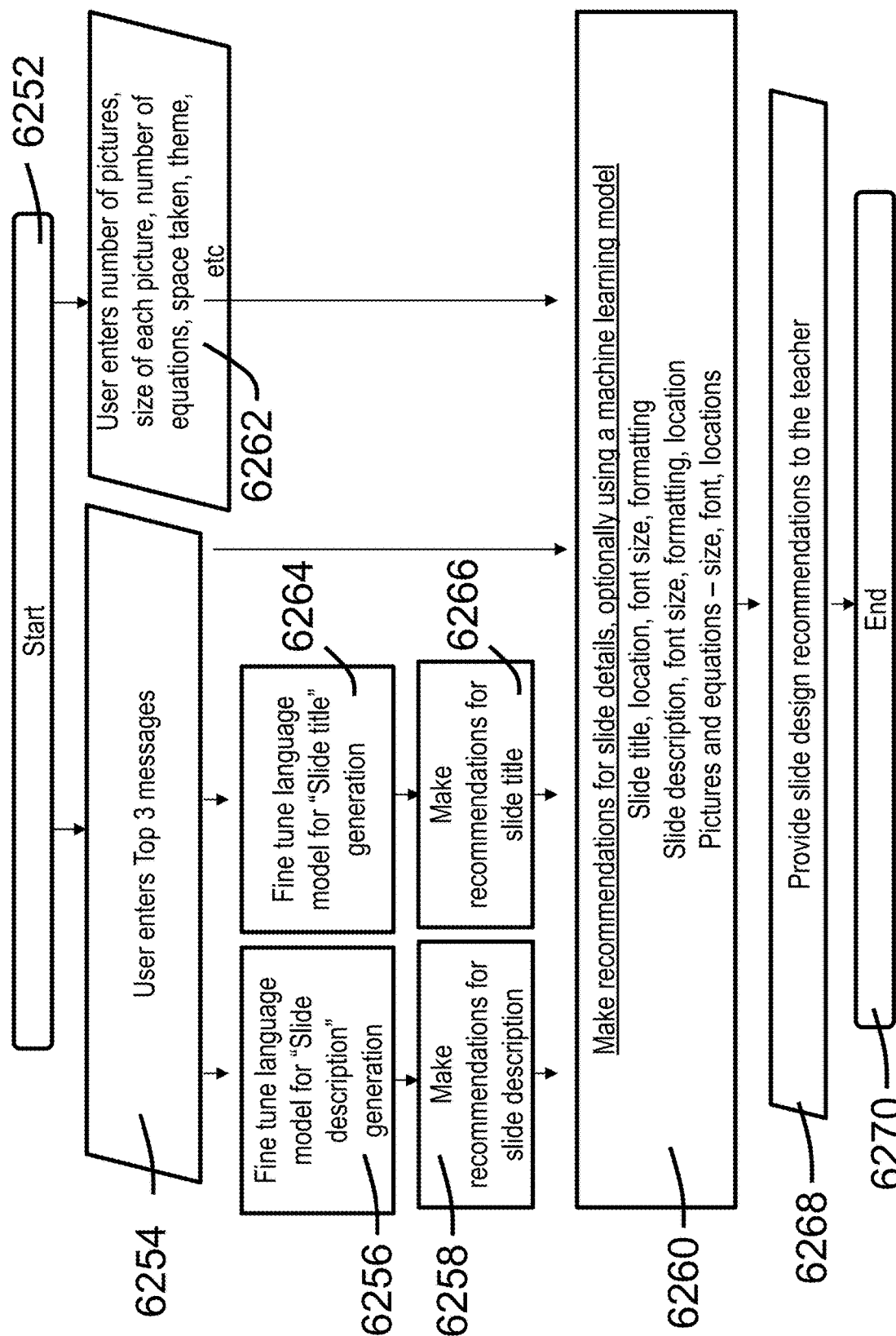
FIG. 62D illustrates an example of a slide design process where the recommendations are based on speaker inputs.

FIG. 62D illustrates an example of a slide design process where the recommendations are based on speaker inputs, such as those illustrated in FIG. 62C, where a slide design may be generated based on inputs provided by a speaker—but the method is described in the form of a flow chart. The slide design generation process starts at step 6252. Following that, the user may enter the top messages to be conveyed 6254 and other input parameters such as, for example, the number of pictures, size of each picture, number of equations, space taken, theme, etc. (6262). Following that, language models may be used in steps 6256 and 6264 to generate recommendations for description 6258 and 6266. Once the title may be obtained in step 6266 and description may be obtained in step 6258, it may be combined along with the top messages to be conveyed 6254 and other input data 6262 to get recommendations for slide designs in step 6260. These recommendations may include locations of slide titles, description, pictures, and equations. The recommendations may also include sizes and formatting of all these items. These recommendations may be obtained using processing which may involve calculations based on size of the slide and size of each of the contents (like pictures, equations, title, descriptions), or they may be obtained, optionally, using a neural network. This neural network may be trained based on slide design examples for various input parameters. Following all this, slide design recommendations may be provided to the speaker in step 6268, following which the method ends in step 6270.

Figure 62E:
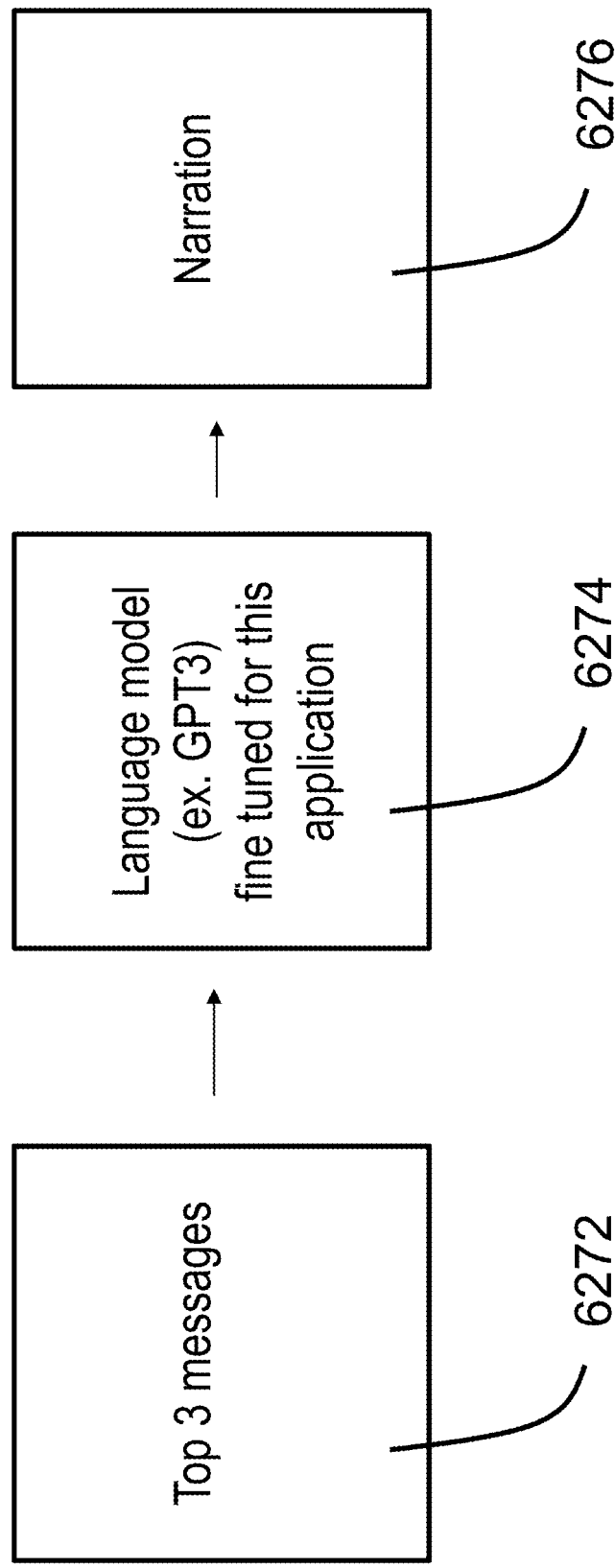
FIG. 62E illustrates an example where recommendations for narration text are generated using the speaker's inputs for top messages to be conveyed.
Figure 63B:
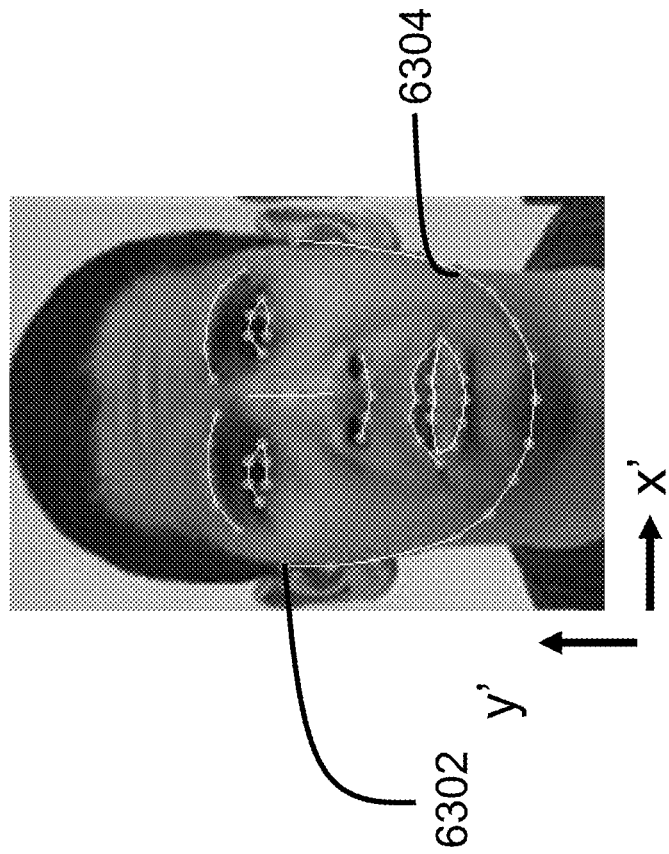
FIGS. 63A, 63B, and 63C illustrate examples of using vector representation for facial expression.
Figure 63A:
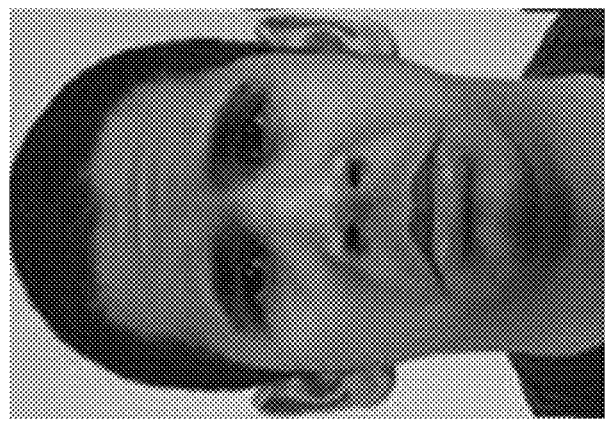
Figure 63C:
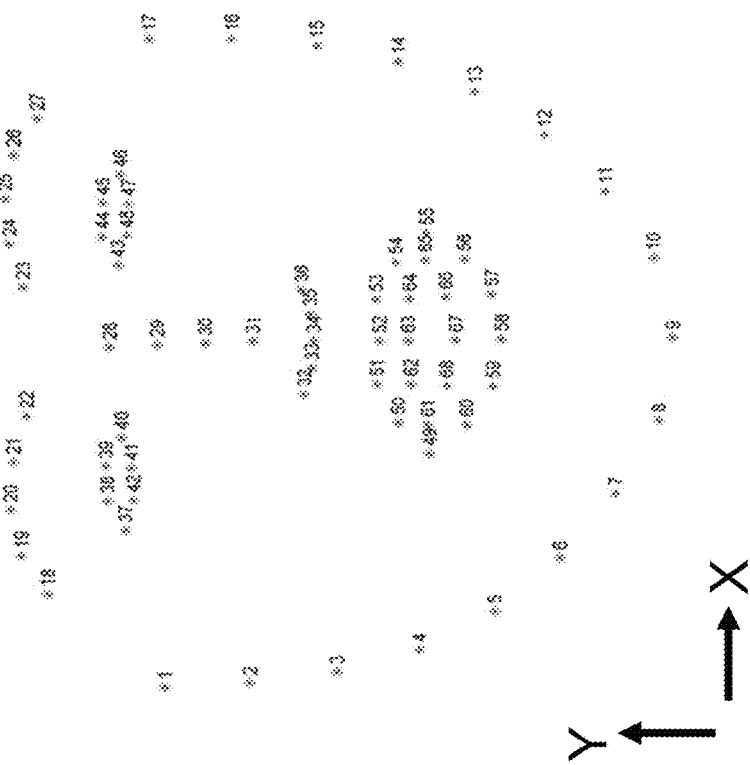

FIG. 62E illustrates an example where recommendations for narration text are generated using the speaker's inputs for top messages to be conveyed, where recommendations for narration text may be generated using the speaker's inputs for top messages to be conveyed 6272. A language model, such as, for example GPT3 may be used to generate narration 6276. Optionally, the language model may be fine tuned for the narration generation application.

Variations of the illustrated examples are within the scope of this disclosure. The slide title may be generated using several summarization algorithms that are available and known to one skilled in the art. Similarly, description may be generated from the main messages to be conveyed using several paraphrasing techniques. Pictures for the slide may be generated based on main messages to be conveyed, and by finding keywords for those main messages to be conveyed and running image searches for that.

Creating a Library of Facial Expressions for all Speakers from Scanning a Set of Videos To create engaging speakers with good facial expressions in text-to-animation technology, a library of facial expressions may be developed. A subset of this library of facial expressions may be used for each speaker depending on their characteristics: like their personality types, face shapes, facial features, and/or other parameters.

Figure 64:
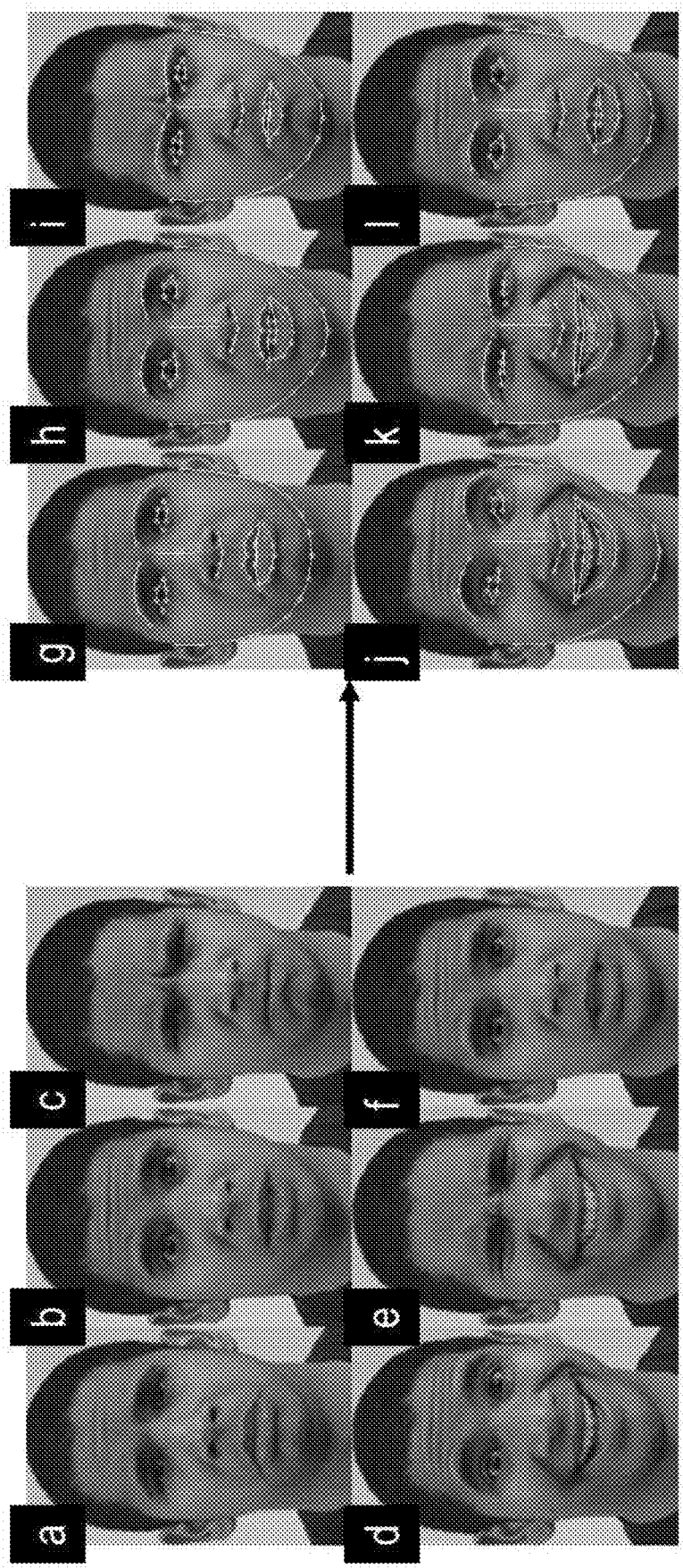
FIG. 64 illustrates an example of vector representation for multiple facial expressions.

FIG. 63-67 illustrate developing a library of facial expressions from a video or series of videos involving speakers teaching. The video is preferably digital video received by systems configured as disclosed herein from a camera. The videos may be broken down into an image representing each frame, as represented in FIG. 63A. Using image processing software, the image may show landmark points and lines along facial features of the speaker, as indicated in FIG. 63B. Point 6302 may be represented by a two-dimensional vector $(x_1, y_1)$. Point 6304 may be represented by another two-dimensional vector $(x_2, y_2)$. A facial expression, such as the one indicated in FIG. 63B, may be represented as a vector composed of vectors for each point appended together, as shown in FIG. 63C. FIG. 64 illustrates that each frame of the video may have its features outlined with points and lines with image processing software, and facial expressions (g), (h), (i), (j), (k), (l) each may be represented with its own vector.

FIG. 65 illustrates how cosine similarity may be found between two vectors or matrices. FIG. 66 illustrates how Euclidean distance may be found between two vectors or matrices. A rest pose may be found based on which facial expression has the most similarity with expressions in other frames of the video. Similarly, the poses with the most Euclidean distance and/or cosine similarity with other poses in the library may be included in the library of facial expressions that may be built, since a good library may often have extreme expressions. In some cases, additional expressions may be recorded in the library. For example, the facial expression library may contain expressions that are not extreme ones.

Figure 67:
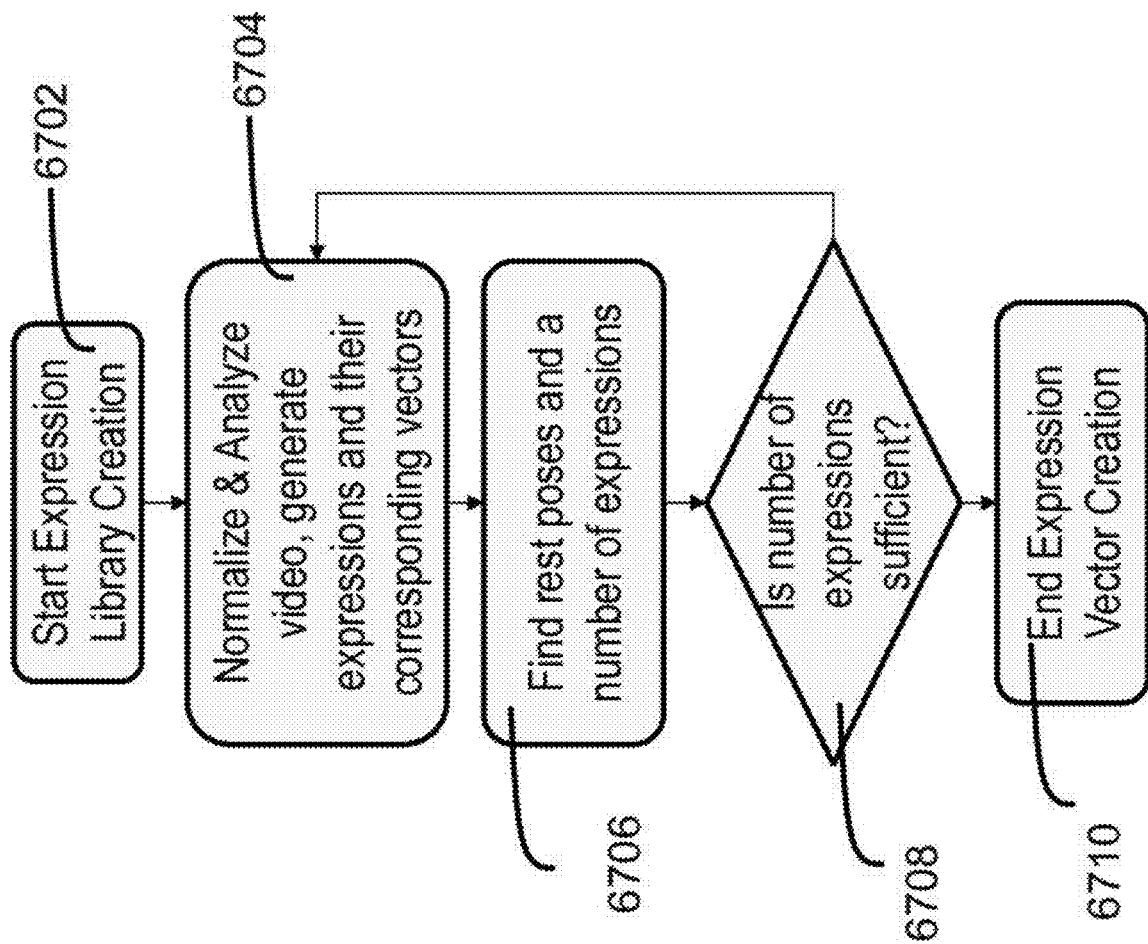
FIG. 67 illustrates an example method which may be used to create a library of facial expressions.

FIG. 67 illustrates an example method which may be used to create a library of facial expressions, which may show a method to create a library of facial expressions. After starting the library creation 6702, frames in the video may be normalized and analyzed, and vectors/matrices with their corresponding rest poses (6706) and a bunch of facial expressions may be obtained. If this gives a sufficient number of expressions (6708), the process may stop (6710) else more videos may be analyzed to get more facial expressions into the library.

FIG. 68 illustrates an example of using Principal Component Analysis (PCA) to determine a library of facial expressions, wherein a principal component analysis (PCA) may be conducted to get the rest pose(s) and a library of facial expressions. Principal Component Analysis (PCA) is a statistical technique used for data reduction without losing its properties by describing the composition of variances and covariances through several linear combinations of the primary variables. PCA involves the following steps (FIG. 68):

1) Standardize the data: subtract the data with mean value of the data and divide with standard deviation of the data;
2) Compute the covariance matrix: Covariance matrix is built by calculating the covariance between each vector in the data matrix;
3) Eigen vectors and eigen values are calculated for the covariance matrix;
4) Calculating Principal Components (PC): eigen values are arranged in descending order, and eigen vectors corresponding to the top eigen values will be chosen as Principal components.

Principal Component Analysis (PCA) can be performed in this matrix and principal components are selected by comparing the variance explained by them. These principal components are linear combinations of the vectors present in the matrix and may not have physical significance. Vectors from the matrix with maximum similarity score with principal components are chosen as replacements for the principal components. The generated expressions are then retargeted to a base face skeleton to use them on any new face. This procedure can be repeated using other videos until the library is populated with large number of expressions. The algorithmic flowchart is shown in FIG. 69.

Alternative variations within the scope of this disclosure are possible. For example, singular value decomposition, non-negative matrix factorization, QR factorization, weighted matrix factorization, among other methods, may be used to create the library of facial expressions or the rest pose(s). Although the term speaker is used here, terms such as teacher, instructor, or other equivalents may be used as well.

Selecting a Subset of the Library for a Specific Speaker

Figure 70:
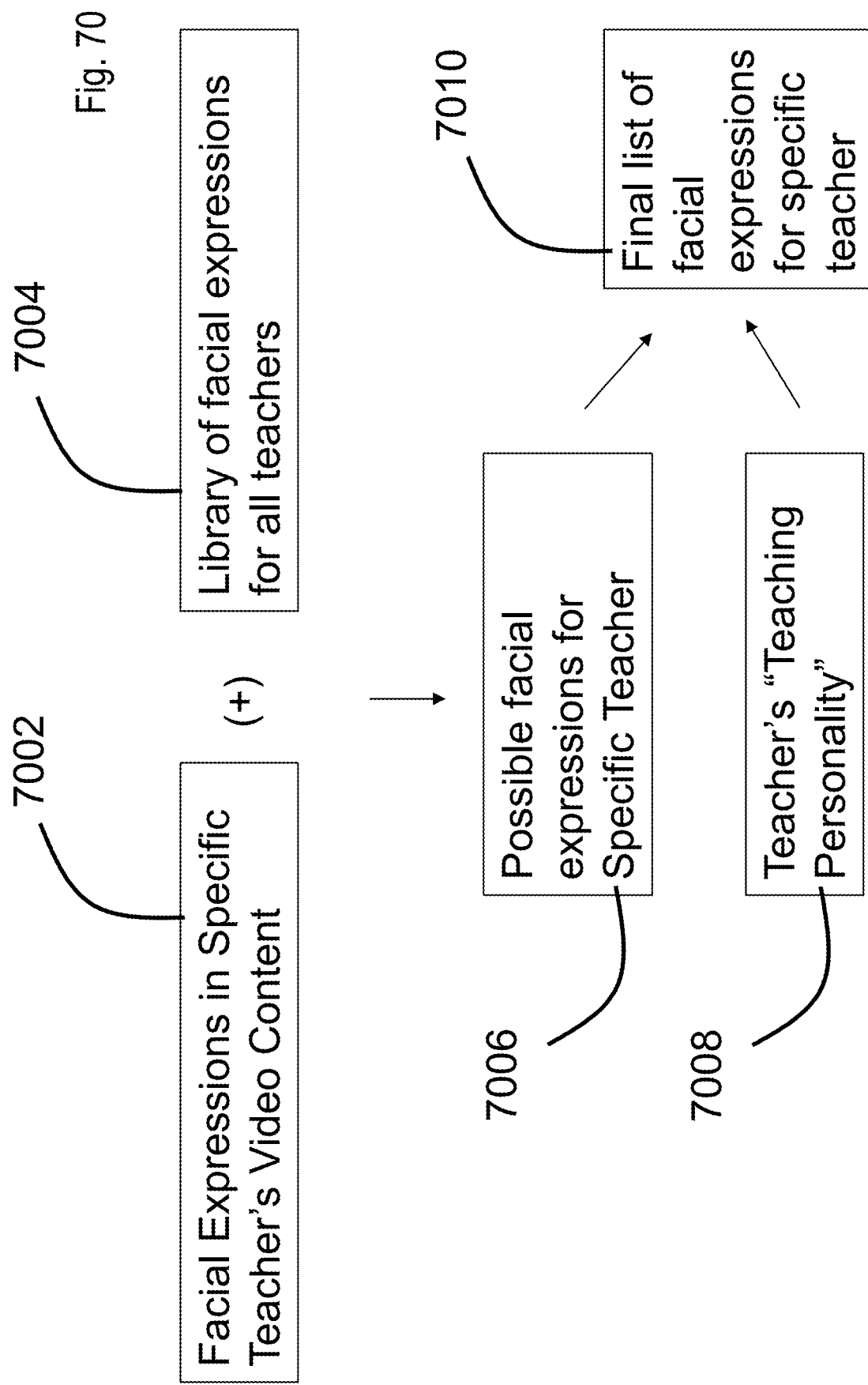
FIG. 70 illustrates an example of generating a list of facial expressions for a specific speaker.

Once the library of facial expressions is developed which is shared among all speakers, a list of facial expressions for a certain speaker may need to be developed. FIG. 70 illustrates an example of generating a list of facial expressions for a specific speaker, where facial expressions suitable for a specific speaker may be developed. The specific speaker's video content may be analyzed to determine a list of facial expressions (7002). Using methods such as finding a similarity score or principal component analysis or something else where these expressions 7002 are compared with the expressions in a library of facial expressions 7004, the most commonly exhibited facial expressions for that specific speaker 7006 may be obtained. The facial expression exhibited the most often, for a neutral kind of expression, may be considered the rest pose for the speaker. This information, along with information on the speaker's teaching personality 7008, may give the final list of facial expressions for that specific speaker 7010. The speaker's teaching personality may be obtained based on answers to a series of questions posed to the speaker, their personality type, their facial shape/size, eye shape/size, lip shape/size, etc. Examples of a speaker's teaching personality type may be, for example: (1) SANGUINE—Upbeat, positive, social. (2) CHOLERIC—get things done, outgoing leader, confrontational (3) PHLEGMATIC—chill, friendly, social (4) MELANCHOLIC—analytical, detail-oriented, quieter, accommodating, cautious.

FIG. 71 illustrates an example of developing facial expressions for a specific speaker. Firstly, a set of expressions (example, A, B, C and D in 7100) for each facial type (like small eyes, thin wide, as an example), teaching personality and sentiment (like sad, happy, excited as examples) may be developed, for example, using methods similar to those described in FIG. 63-69. A library may be created having expression sets, such as, for example, 7100, 7102, 7104 and 7106. Secondly, the specific speaker's video content may be analyzed to determine a list of facial expressions for that speaker. This list may be obtained by looking at images for various frames of the video, as an example. The list may further be optionally grouped based on sentiment expressed by the speaker (using a sentiment analysis tool, for example). Using methods such as finding a similarity score or principal component analysis or something else, this list of expressions for that specific speaker (for a certain expressed sentiment) may be compared with the expressions in the library of expression sets (example: FIG. 71). The expression set(s) in the library that gives the best similarity results with the specific speaker's expressions may be used to generate facial animations for that speaker for text-to-animation software. Although the term speaker is used here, terms such as speaker or instructor or something equivalent may be used as well. Likewise, although the term expression is used here, the term "blendshapes" may be used instead of the term "expressions."

While the above technique may be able to provide facial expressions for a speaker or instructor, if the shoulders and lower parts of the body are not moving, it may not always look engaging. According to an embodiment of this invention, random motions may be applied to portions of the body below the head.

Converting Books to Course Videos or Other Animations

Figure 72:
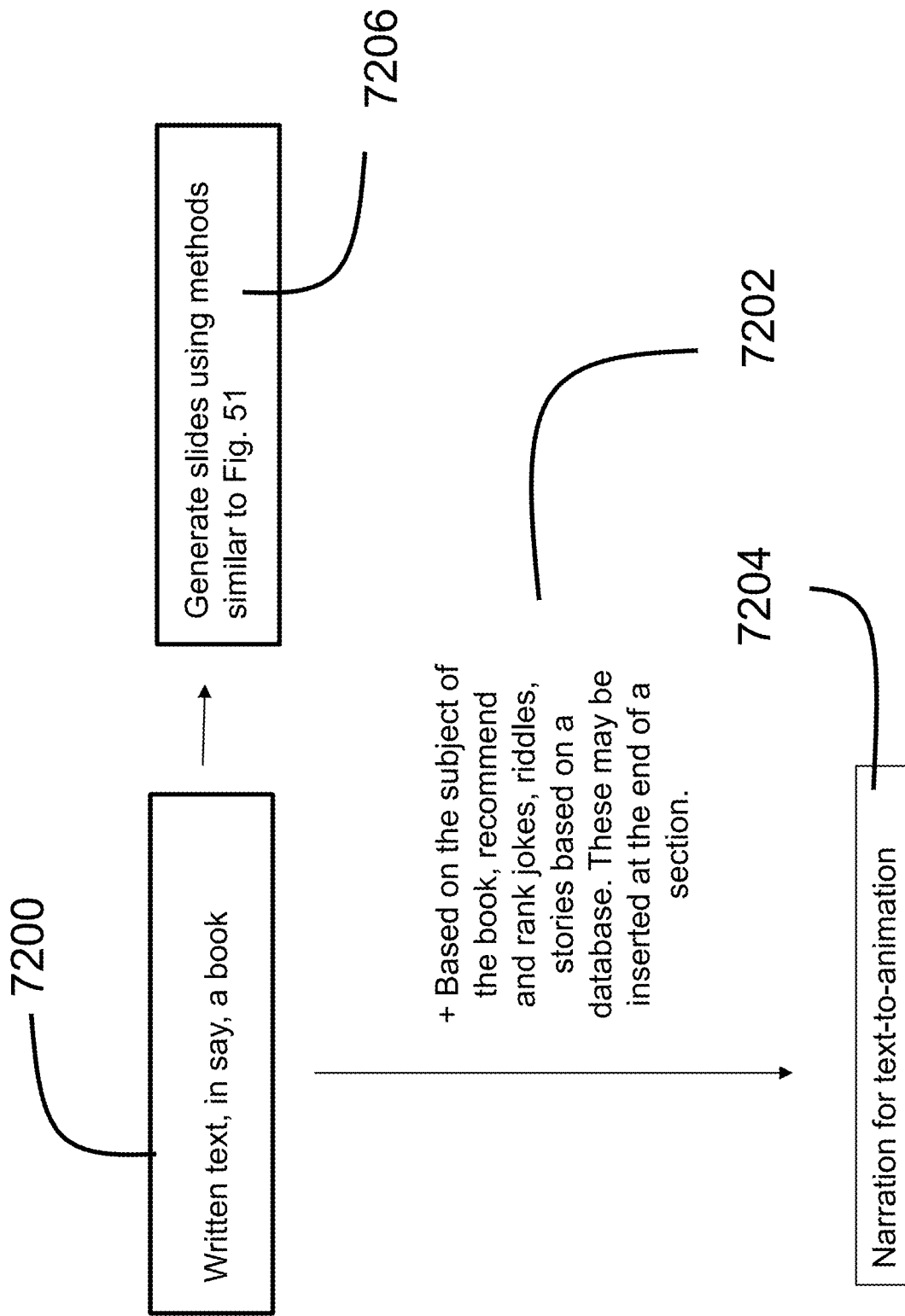
FIG. 72 illustrates an example of converting a book to an animation video.

There are several sources of content, such as books, that are in written form. It is an object of this invention to create video courses, or other such video content, out of material in book form. FIG. 72 illustrates an example of converting a book to an animation video. As illustrated written text, for example, in a book 7200, may be converted to an animation video. The animation video may have slides 7206 generated using methods similar to those described above with respect to FIG. 51. One key element that may make written text such as book more suitable to speaking in a video lesson may be the presence of jokes, riddles, personal stories, and other such informal information. A database of such content may be prepared. Based on the subject of content being described in that section of the book, for example, the most suitable jokes, riddles, and stories may be recommended from the database for adding to the narration text of the animation video. This may be done by a comparison of keywords in that section of the book with keywords in various riddles, jokes, and stories, for example. Alternatively, a parallel track unrelated to the subject being taught may be maintained. It will be clear to one skilled in the art that several other methods of finding suitable jokes, riddles and stories for a subject may exist, including comparing Rouge scores and other methods. The jokes, riddles, and stories may be added just before a section of teaching finishes, so that it does not disrupt the flow of the course. Once the narration text 7204 is prepared and the slides 7206 are obtained, the animation video may be generated using methods already described in this patent application.

Figure 73:
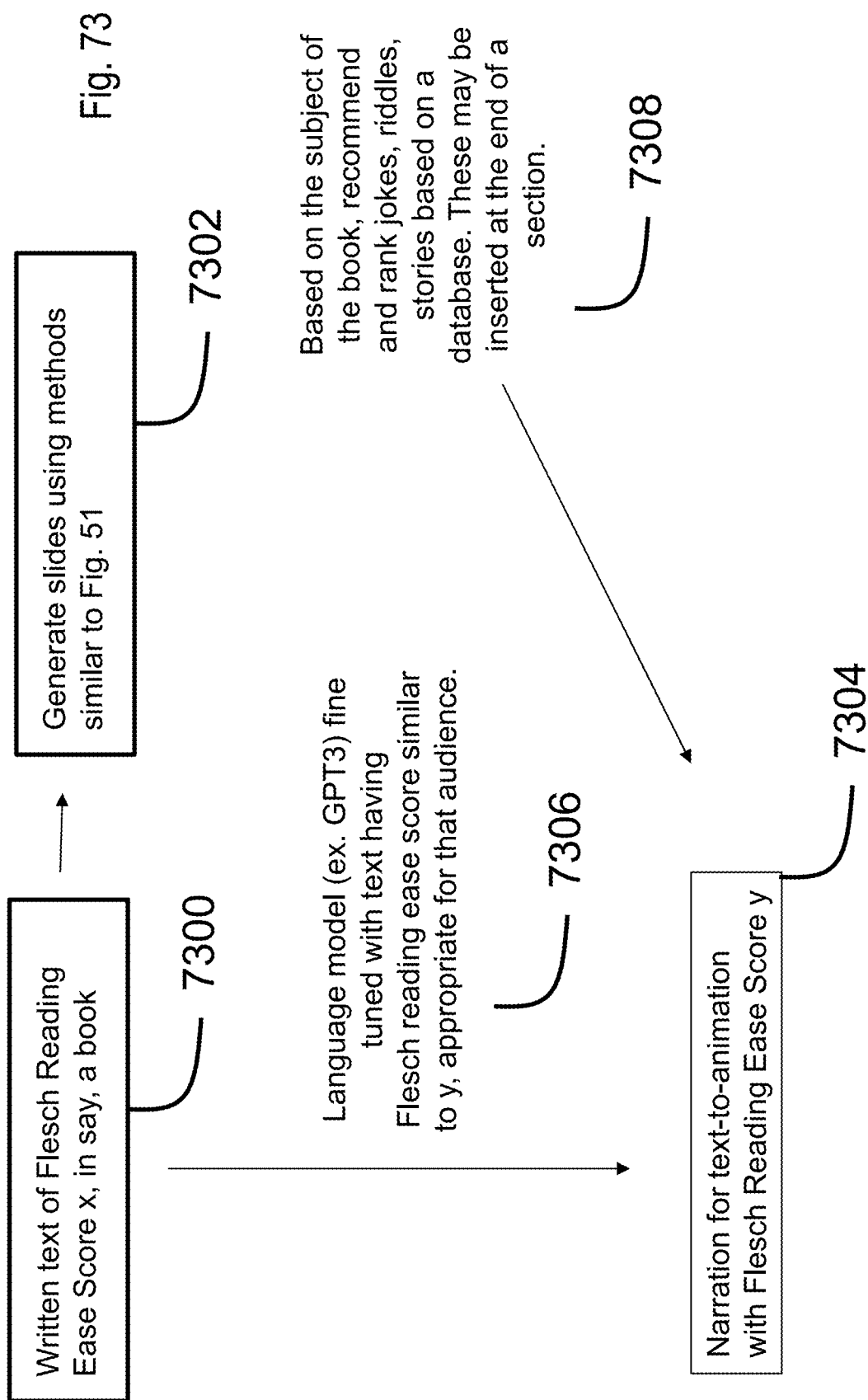
FIG. 73 illustrates an example of converting a book to video courses or other such video content.

FIG. 73 illustrates an example of converting a book to video courses or other such video content, where video courses, or other such video content, may be created out of material in book form. For spoken text, it is often desirable for material to be easier to understand than in writing form. Accordingly, for systems configured as disclosed herein, written text having a Flesch reading ease score (for example, x) may be converted to text with a higher reading ease score (for example, y). This may be done by using a language model—for example, GPT-3, which may be fine tuned with text having Flesch reading ease score similar to y. Jokes, riddles, and stories 7308 may also be added in a similar way to what was described in FIG. 72. Narration text for text-to-animation may be obtained 7304 with the improved reading ease score and with jokes, riddles, and/or stories added. Based on narration text 7304 and slides 7302 that may be obtained using methods similar to those described above with respect to FIG. 51, animation video may be generated. Other metrics for reading ease, similar to those described earlier in this patent application, may also be used.

Figure 74:
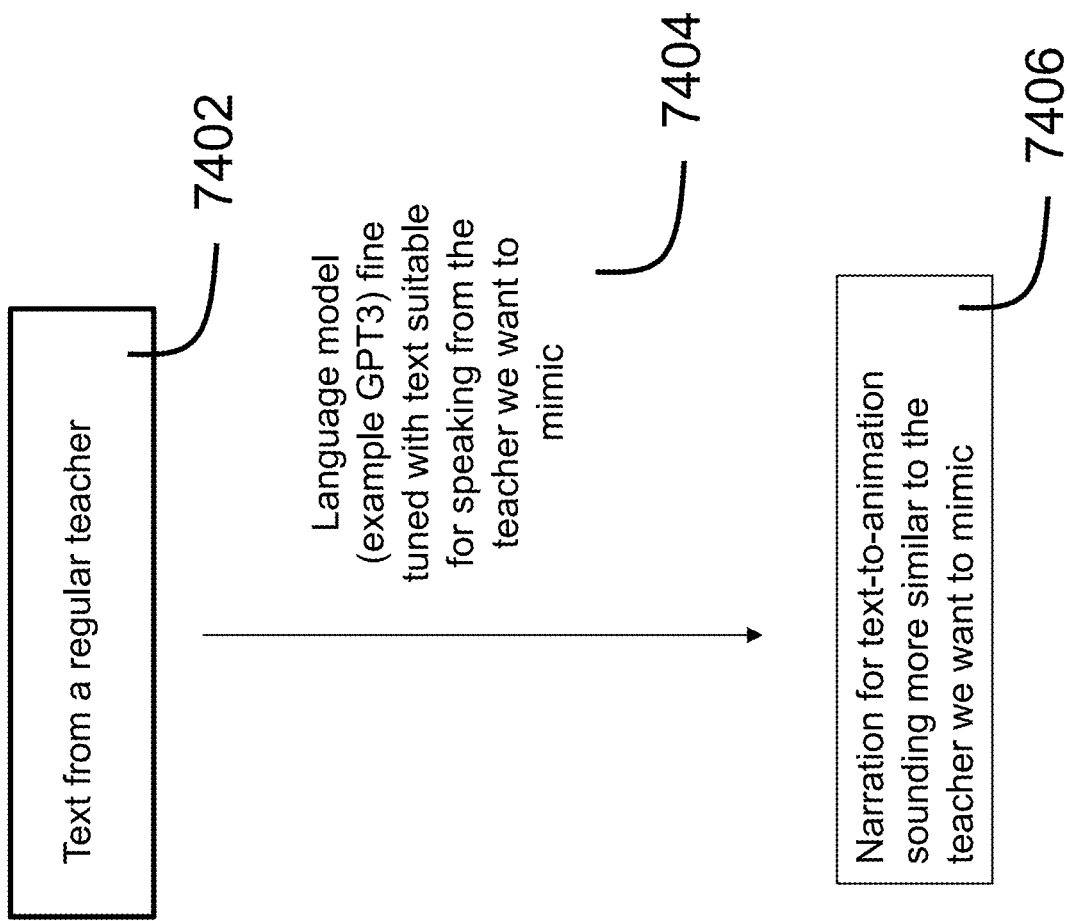
FIG. 74 illustrates an example of modifying text from a speaker so that it sounds like another person's text.

FIG. 74 illustrates an example of modifying text from a speaker 7402 so that it sounds like another person's text, where text from a speaker 7402 may be modified so that it may sound like another person's text. This may be desirable, for example, to make content resemble that from a well-known or well-regarded speaker. A language model (such as, for example, GPT-3) may be fine tuned with text suitable for speaking from the speaker that may be desirable to mimic 7404. In this manner the text from the regular speaker can be modified so that the resulting text-to-animation that may resemble the speaker being mimicked 7406 may be generated. Following this, a teaching video may be generated. Such modification can be used for other circumstances beyond the example of teaching. For example, instead of applying the concepts in this invention to just teaching or learning, they may be used for any form of communication. Terms such as instructors, teachers, speakers, etc., may be used for people communicating the concepts disclosed herein.

Figure 75:
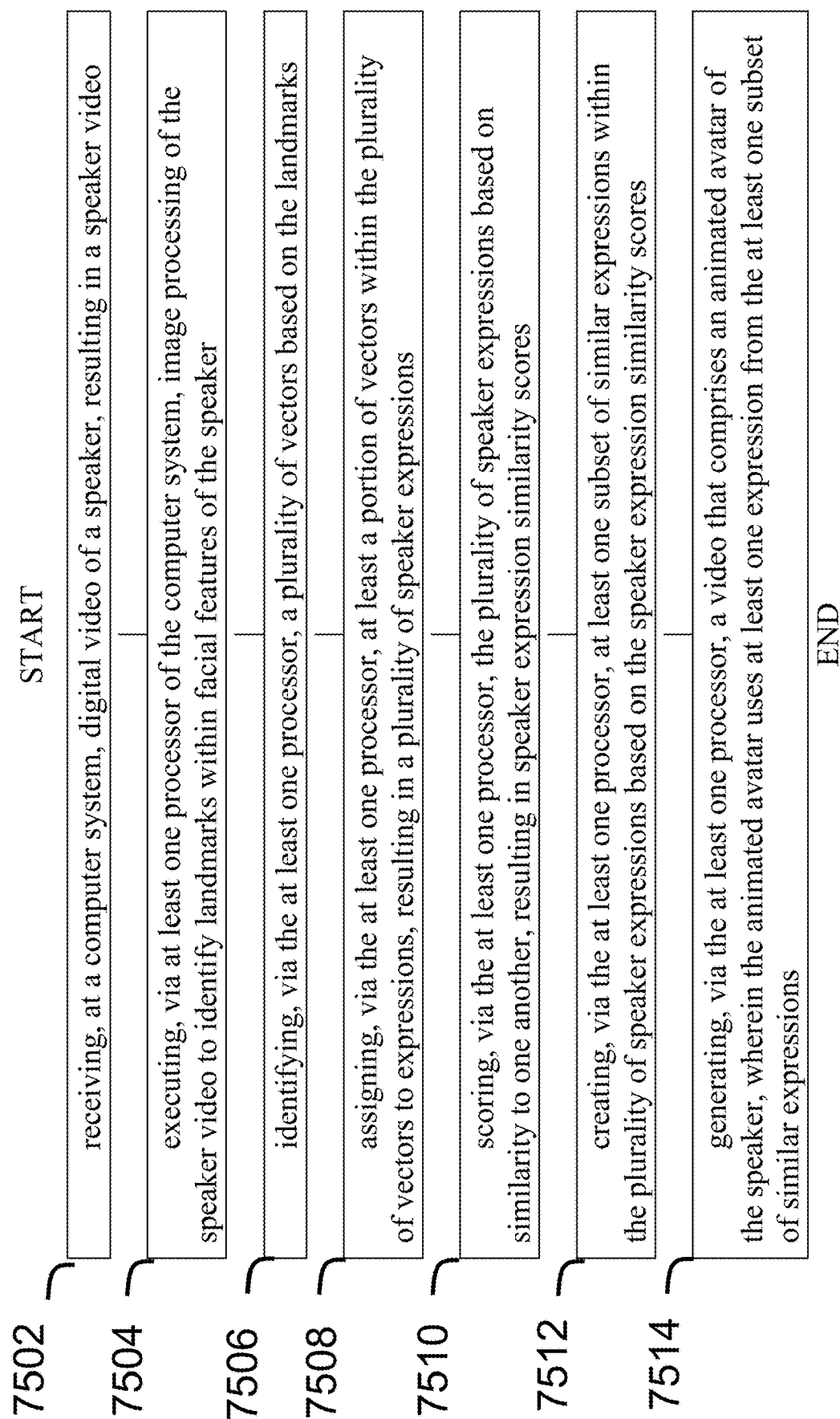
FIG. 75 illustrates a first example method embodiment.

FIG. 75 illustrates a first example method embodiment. In this illustration, the system receives, from a camera, digital video of at least one speaker, resulting in a speaker video (7502). The system then executes, via at least one processor of the computer system, image processing of the speaker video to identify landmarks within facial features of the speaker (7504), and identifies, via the at least one processor, vectors based on the landmarks (7506). Landmarks can include, for example, point on the face of the speaker, relative spacing between the landmarks, lines on the speaker's face, etc. The system then assigns, via the at least one processor, each vector within the vectors to an expression, resulting in a plurality of speaker expressions (7508) and scores, via the at least one processor, the plurality of speaker expressions based on similarity to one another, resulting in speaker expression similarity scores (7510). The system then creates, via the at least one processor, at least one subset of similar expressions within the plurality of speaker expressions based on the speaker expression similarity scores (7512). Finally, the system generates a video that includes an animated avatar of the speaker, wherein the animated avatar uses at least one expression from the at least one subset of similar expressions (7514).

In some configurations, the creating of at least one subset of similar expressions is created using principal component analysis. In such configurations, the principal component analysis can include: standardizing, via the at least one processor, the speaker expression similarity scores, resulting in standardized scores; creating, via the at least one processor using the plurality of speaker expressions, a covariance matrix; computing, via the at least one processor, Eigen vectors and Eigen values for the covariance matrix; ranking, via the at least one processor, the Eigen vectors and the Eigen values in descending order, resulting in a ranked list of Eigen vectors and Eigen values; and selecting, via the at least one processor from the ranked list of Eigen vectors and Eigen values, the at least one subset of similar expressions based on each subset having Eigen values above a threshold.

In some configurations, the scoring can be based, at least in part, on finding cosine similarities of the plurality of speaker expressions.

In some configurations, the scoring can be based, at least in part, on finding Euclidean distances of the plurality of speaker expressions.

In some configurations, the image processing analyzes each frame within the speaker video.

In some configurations, the plurality of speaker expressions can be normalized prior to the scoring.

In some configurations, the at least one subset of similar expressions is further based on a previously identified personality of the speaker. In such configurations, the previously identified personality of the speaker can be categorized as at least one of sanguine, choleric, phlegmatic, and melancholic.

Figure 76:
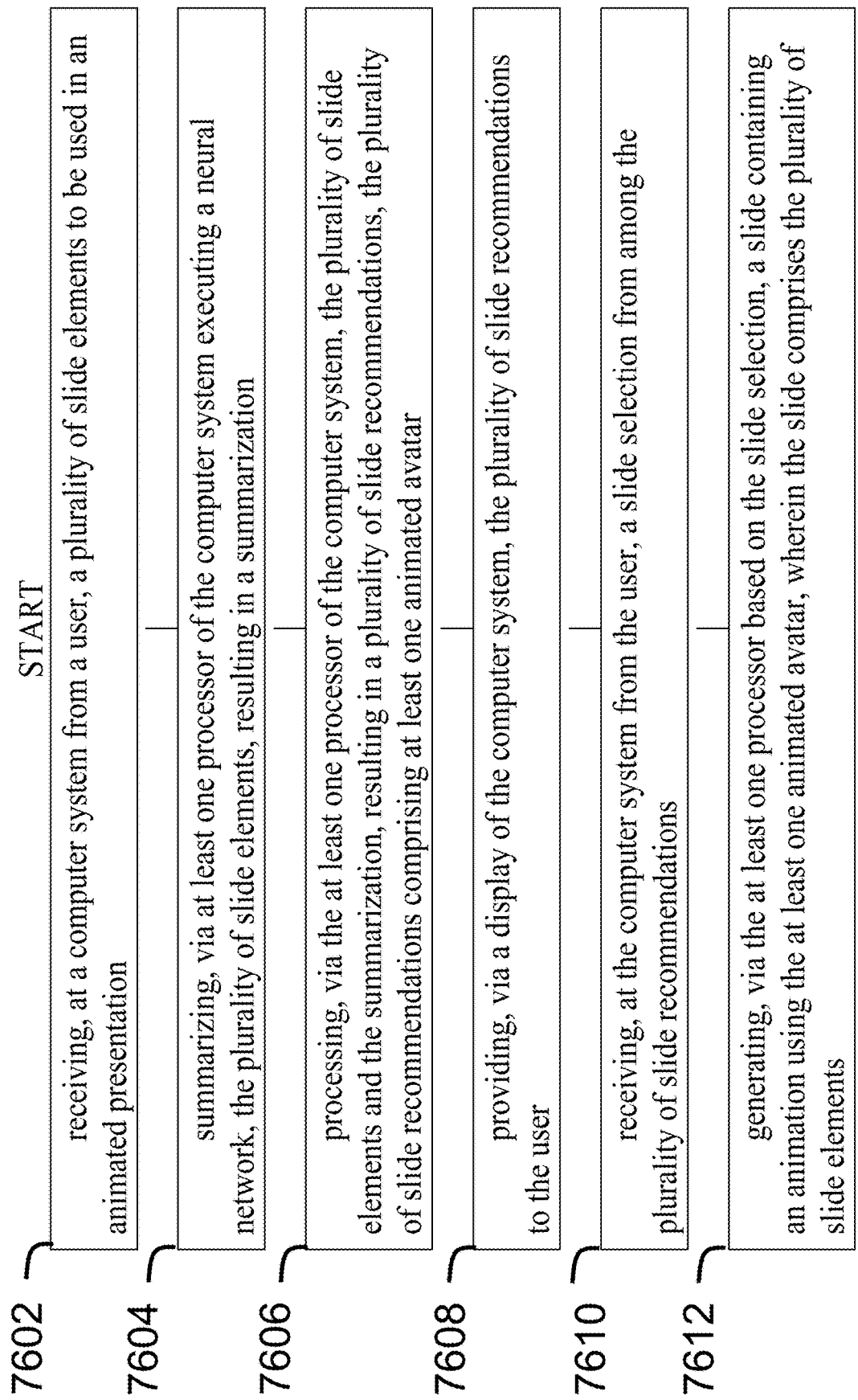
FIG. 76 illustrates a second example method embodiment.

FIG. 76 illustrates a second example method embodiment. A system can, as illustrated, receive, from a user, a plurality of slide elements to be used in an animated presentation (7602). The system can summarize, by executing a neural network, the plurality of slide elements, resulting in a summarization (7604). The system can then process, via at least one processor of the computer system using a neural network, the plurality of slide elements, resulting in a plurality of slide recommendations, the plurality of slide recommendations having at least one animated avatar (7606), and provide, via a display of the computer system, the plurality of slide recommendations to the user (7608). The system can then receive, from the user, a slide selection from among the plurality of slide recommendations (7610), and generating, via the at least one processor, a slide containing an animation using the at least one animated avatar, wherein the slide comprises the plurality of slide elements (7612).

In some configurations, the illustrated method can further include: training the neural network by providing a plurality of slide design examples and associated input parameters.

In some configurations, the plurality of slide recommendations comprises at least one of: a slide title; a slide description; slide pictures; and equations.

In some configurations, the plurality of slide elements can include: a number of pictures; a size of each picture; a number of equations; a space for each equation; and a theme.

In some configurations the plurality of slide elements can include top n messages which the user intends to convey, n being a predetermined number set by the user. In such configurations, the illustrated method can further include: analyzing, via the at least one processor executing a language model, the top n messages, resulting in: a description of the slide and a title recommendation of the slide. Such method can further include: fine-tuning the language model using a fine-tuning dataset, the fine-tuning dataset comprising text from notable speakers, resulting in a modification to original slide text, where modified slide text resembles text from speeches of the notable speakers.

Figure 77:
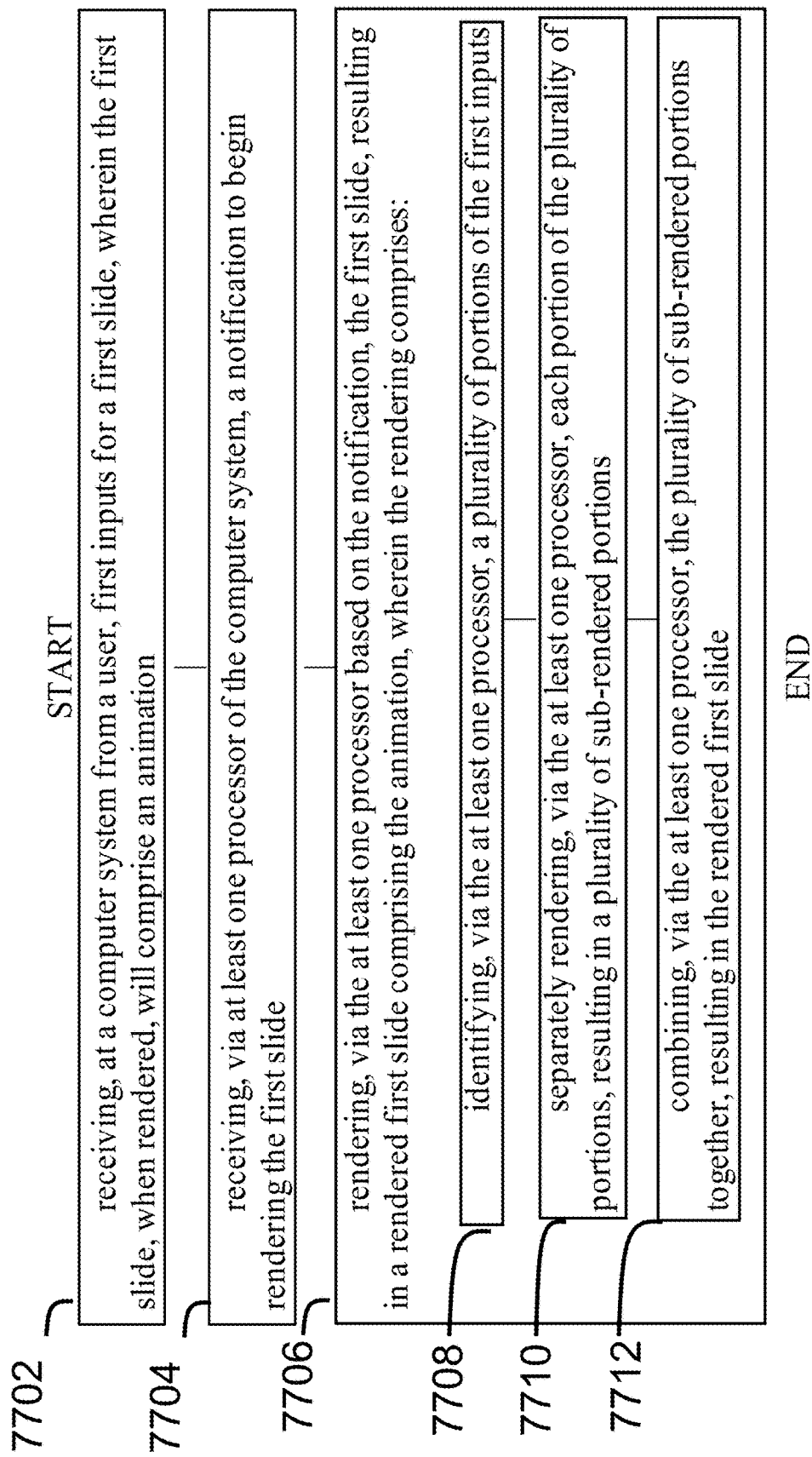
FIG. 77 illustrates a third example method embodiment.

FIG. 77 illustrates a third example method embodiment. As illustrated, the system can receive, from a user, first inputs for a first slide, wherein the first slide, when rendered, will comprise an animation (7702). the system can then receive, via at least one processor of the computer system, a notification to begin rendering the first slide (7704) and render, via the at least one processor based on the notification, the first slide, resulting in a rendered first slide comprising the animation (7706). The rendering (7706) can include: identifying, via the at least one processor, a plurality of portions of the first inputs (7708); separately rendering, via the at least one processor, each portion of the plurality of portions, resulting in a plurality of sub-rendered portions (7710); and combining, via the at least one processor, the plurality of sub-rendered portions together, resulting in the rendered first slide (7712).

In some configurations, the plurality of portions can include distinct pieces of text.

In some configurations, the combining of the plurality of sub-rendered portions can rely on keyframes of the plurality of sub-rendered portions.

In some configurations, the separate rendering of each portion of the plurality of portions can occur in parallel.

In some configurations, the notification can be received upon the user beginning to provide second inputs for a second slide, and the rendering of the first slide can occur while the user is providing the second inputs.

In some configurations, a subsequent modification to a specific portion of the plurality of portions can result in re-rendering of the specific portion.

In some configurations, the rendering can start before the user requests the animation to be generated, resulting in an unofficial render. In such configurations, the unofficial render can be created at a lower resolution compared to an official render of the first slide completed upon receiving a user request for the animation.

In some configurations, the animation can include synthesized audio based on the first inputs.

Figure 78:
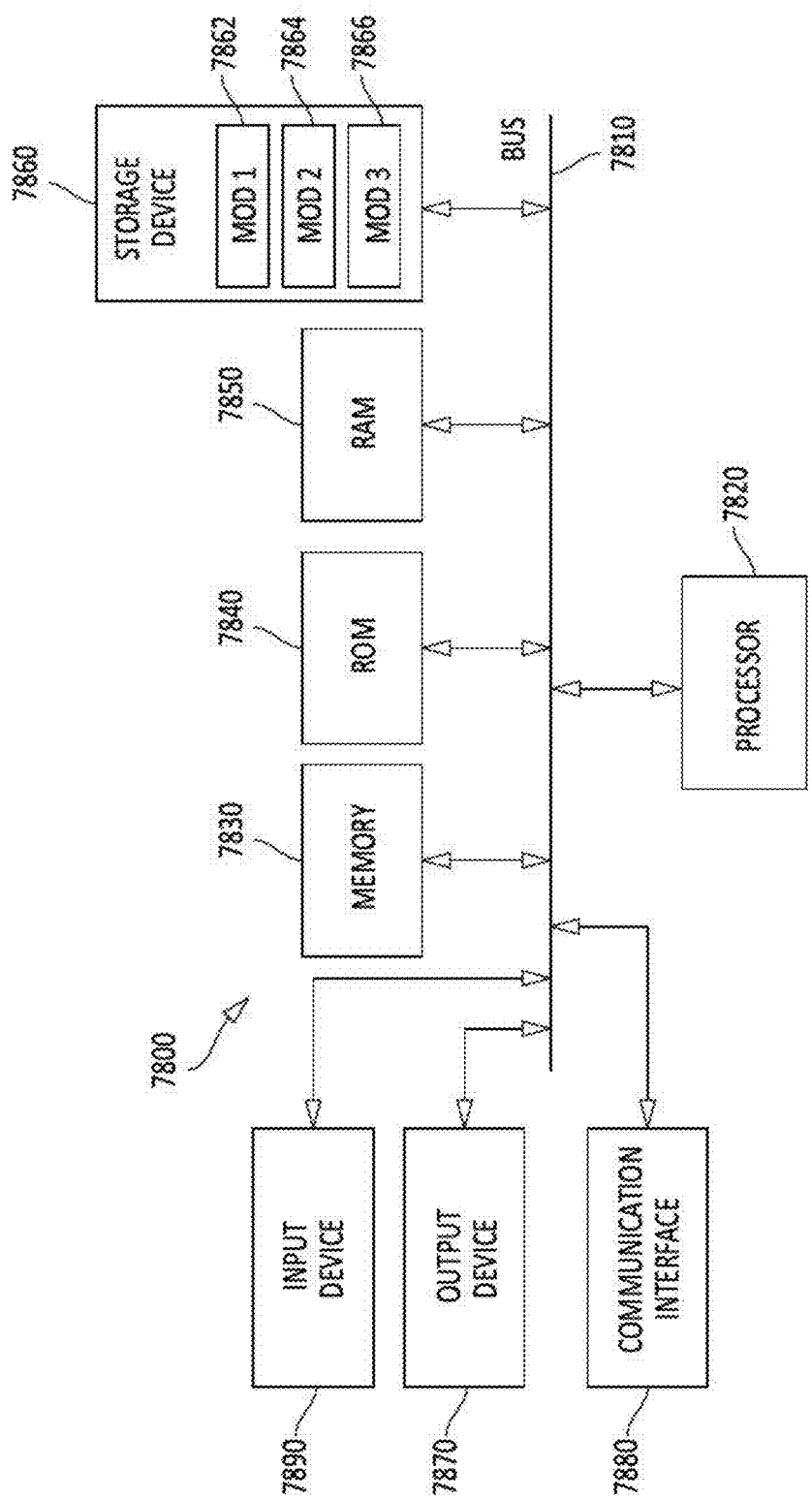
FIG. 78 illustrates an example computer system.

FIG. 78 illustrates an example computer system. With reference to FIG. 78, an exemplary system includes a general-purpose computing device 7800, including a processing unit (CPU or processor) 7820 and a system bus 7810 that couples various system components including the system memory 7830 such as read-only memory (ROM) 7840 and random-access memory (RAM) 7850 to the processor 7820. The system 7800 can include a cache of high-speed memory connected directly with, in close proximity to, or integrated as part of the processor 7820. The system 7800 copies data from the memory 7830 and/or the storage device 7860 to the cache for quick access by the processor 7820. In this way, the cache provides a performance boost that avoids processor 7820 delays while waiting for data. These and other modules can control or be configured to control the processor 7820 to perform various actions. Other system memory 7830 may be available for use as well. The memory 7830 can include multiple different types of memory with different performance characteristics. It can be appreciated that the disclosure may operate on a computing device 7800 with more than one processor 7820 or on a group or cluster of computing devices networked together to provide greater processing capability. The processor 7820 can include any general-purpose processor and a hardware module or software module, such as module 1 7862, module 2 7864, and module 3 7866 stored in storage device 7860, configured to control the processor 7820 as well as a special-purpose processor where software instructions are incorporated into the actual processor design. The processor 7820 may essentially be a completely self-contained computing system, containing multiple cores or processors, a bus, memory controller, cache, etc. A multi-core processor may be symmetric or asymmetric.

The system bus 7810 may be any of several types of bus structures including a memory bus or memory controller, a peripheral bus, and a local bus using any of a variety of bus architectures. A basic input/output (BIOS) stored in ROM 7840 or the like, may provide the basic routine that helps to transfer information between elements within the computing device 7800, such as during start-up. The computing device 7800 further includes storage devices 7860 such as a hard disk drive, a magnetic disk drive, an optical disk drive, tape drive or the like. The storage device 7860 can include software modules 7862, 7864, 7866 for controlling the processor 7820. Other hardware or software modules are contemplated. The storage device 7860 is connected to the system bus 7810 by a drive interface. The drives and the associated computer-readable storage media provide non-volatile storage of computer-readable instructions, data structures, program modules and other data for the computing device 7800. In one aspect, a hardware module that performs a particular function includes the software component stored in a tangible computer-readable storage medium in connection with the necessary hardware components, such as the processor 7820, bus 7810, display 7870, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 7800 is a small, handheld computing device, a desktop computer, or a computer server.

Although the exemplary embodiment described herein employs the hard disk 7860, other types of computer-readable media which can store data that are accessible by a computer, such as magnetic cassettes, flash memory cards, digital versatile disks, cartridges, random access memories (RAMs) 7850, and read-only memory (ROM) 7840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 7800, an input device 7890 represents any number of input mechanisms, such as a microphone for speech, a touch-sensitive screen for gesture or graphical input, keyboard, mouse, motion input, speech and so forth. An output device 7870 can also be one or more of a number of output mechanisms known to those of skill in the art. In some instances, multimodal systems enable a user to provide multiple types of input to communicate with the computing device 7800. The communications interface 7880 generally governs and manages the user input and system output. There is no restriction on operating on any particular hardware arrangement and therefore the basic features here may easily be substituted for improved hardware or firmware arrangements as they are developed.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

EXEMPLARY CLAUSES

Further aspects of the present disclosure are provided by the subject matter of the following clauses.

A method of creating a library of facial expressions for text-to-animation technology, based on scanning several speakers' videos and creating a subset of relevant facial expressions expressed in the videos based on farthest similarity scores.

The method of any preceding clause, wherein the subset of relevant facial expressions is determined using principal component analysis.

The method of any combination of any preceding clause, wherein the subset of relevant facial expressions is determined, in part or in whole, by finding farthest cosine similarities.

The method of any combination of any preceding clause, wherein the subset of relevant facial expressions is determined, in part of in whole, by finding the facial expressions with the farthest Euclidean distance.

The method of any combination of any preceding clause, wherein the subset of relevant facial expressions is determined using singular value decomposition technique, non-negative matrix factorization technique, QR factorization technique or weighted matrix factorization technique.

The method of any combination of any preceding clause, wherein vector representations are obtained for various landmark points in the speaker's face.

The method of any combination of any preceding clause, wherein image processing technology is used to processing frames of speakers' videos.

The method of any combination of any preceding clause, where the facial expressions are normalized.

A method of determining relevant facial expressions for a speaker for text-to-animation technology, based on expressions expressed in their videos and comparison with expressions in a library of facial expressions.

The method of any preceding clause, wherein the comparison occurs using principal component analysis.

The method of any combination of any preceding clause, wherein the comparison occurs using similarity scores.

The method of any combination of any preceding clause, wherein the comparison occurs in part or in whole using cosine similarities The method of any combination of any preceding clause, wherein the comparison occurs in part or in whole using Euclidean distance The method of any combination of any preceding clause, wherein the comparison occurs using singular value decomposition technique, non-negative matrix factorization technique, QR factorization technique or weighted matrix factorization technique.

The method of any combination of any preceding clause, wherein relevant facial expressions are also determined based on the speaker's speaking personality.

The method of any combination of any preceding clause, wherein relevant facial expressions are also determined based on whether the speaker's speaking personality can be categorized as sanguine.

The method of any combination of any preceding clause, wherein relevant facial expressions are also determined based on whether the speaker's speaking personality can be categorized as choleric.

The method of any combination of any preceding clause, wherein relevant facial expressions are also determined based on whether the speaker's speaking personality can be categorized as phlegmatic.

The method of any combination of any preceding clause, wherein relevant facial expressions are also determined based on whether the speaker's speaking personality can be categorized as melancholic.

The method of any combination of any preceding clause, wherein relevant facial expressions are also determined based on the facial shape and size of the speaker.

The method of any combination of any preceding clause, wherein relevant facial expressions are also determined based on the eye shape and size of the speaker.

The method of any combination of any preceding clause, wherein relevant facial expressions are also determined based on the lip shape and size of the speaker.

A method of applying random motions to parts of a speaker's body below the head when animation is generated from text inputs.

A method comprising: receiving, at a computer system, digital video of a speaker, resulting in a speaker video; executing, via at least one processor of the computer system, image processing of the speaker video to identify landmarks within facial features of the speaker; identifying, via the at least one processor, a plurality of vectors based on the landmarks; assigning, via the at least one processor, at least a portion of vectors within the plurality of vectors to expressions, resulting in a plurality of speaker expressions;

scoring, via the at least one processor, the plurality of speaker expressions based on similarity to one another, resulting in speaker expression similarity scores; creating, via the at least one processor, at least one subset of similar expressions within the plurality of speaker expressions based on the speaker expression similarity scores; and generating, via the at least one processor, a video that comprises an animated avatar of the speaker, wherein the animated avatar uses at least one expression from the at least one subset of similar expressions.

The method of any combination of any preceding clause, wherein the creating of at least one subset of similar expressions is created using principal component analysis.

The method of any combination of any preceding clause, wherein the principal component analysis comprises: standardizing, via the at least one processor, the speaker expression similarity scores, resulting in standardized scores; creating, via the at least one processor using the plurality of speaker expressions, a covariance matrix; computing, via the at least one processor, Eigen vectors and Eigen values for the covariance matrix; ranking, via the at least one processor, the Eigen vectors, and the Eigen values in descending order, resulting in a ranked list of the Eigen vectors and the Eigen values; and selecting, via the at least one processor from the ranked list of the Eigen vectors and the Eigen values, the at least one subset of similar expressions based on each subset having Eigen values above a threshold.

The method of any combination of any preceding clause, wherein the scoring is based, at least in part, on finding cosine similarities of the plurality of speaker expressions.

The method of any combination of any preceding clause, wherein the scoring is based, at least in part, on finding Euclidean distances of the plurality of speaker expressions.

The method of any combination of any preceding clause, wherein the image processing analyzes each frame within the speaker video.

The method of any combination of any preceding clause, wherein the plurality of speaker expressions are normalized prior to the scoring.

The method of any combination of any preceding clause, wherein the at least one subset of similar expressions is further based on a previously identified personality of the speaker.

The method of any combination of any preceding clause, wherein the previously identified personality of the speaker is categorized as at least one of sanguine, choleric, phlegmatic, and melancholic.

A method of automatically providing recommendations for a slide design as well as narration, based on an instructor's description of top messages to be conveyed, following which an animation is generated.

The method of any preceding clause, wherein slide description is obtained by fine tuning a language model.

The method of any preceding clause, wherein slide title is obtained by fine tuning a language model.

The method of any preceding clause, wherein slide layout is determined using a neural network as well as number and size of pictures, optionally a number of equations, slide title and slide description.

The method of any preceding clause, wherein slide layout is determined using a formula based on number and size of pictures, optionally a number of equations, slide title and slide description.

The method of any preceding clause, wherein an image for the slide design is recommended based on keywords obtained from the top messages to be conveyed and running a search based on that.

The method of any preceding clause, wherein narration is based on paraphrasing the top messages to be conveyed.

The method of any preceding clause, wherein equations are entered by the user.

The method of any preceding clause, wherein the top recommendation is automatically selected for use in the animation.

The method of any preceding clause, wherein the slide design is determined based on branding considerations from a set of pre-prepared templates.

A method of training a neural network based on narration and slide designs for various subjects.

The method of any preceding clause, wherein the neural network is used to predict slide design for new content created in that subject.

The method of any preceding clause, wherein the neural network is used to predict images for new content created in that subject.

The method of any preceding clause, wherein the neural network is used to predict slide titles for new content created in that subject.

A method of automatically providing recommendations for a slide design for text-to-animation technology, based on narration input provided by a speaker, following which an animation is created that comprises the slide and the narration.

The method of any preceding clause, wherein the slide title is generated based on a summarization algorithm that is obtained on fine tuning a language model.

The method of any preceding clause, wherein an image for the slide is generated by finding keywords in the narration and running a search for images based on that keyword.

The method of any preceding clause, wherein description for the slide is generated based on paraphrasing the narration input.

The method of any preceding clause, wherein layout of the slide is determined based on a neural network.

The method of any preceding clause, wherein the best recommendation is automatically used for generating the slide as well as the animation.

The method of any preceding clause, wherein the slide design is determined based on branding considerations from a set of pre-prepared templates.

A method comprising: receiving, at a computer system from a user, a plurality of slide elements to be used in an animated presentation; summarizing, via at least one processor of the computer system executing a neural network, the plurality of slide elements, resulting in a summarization; processing, via the at least one processor of the computer system, the plurality of slide elements and the summarization, resulting in a plurality of slide recommendations, the plurality of slide recommendations comprising at least one animated avatar; providing, via a display of the computer system, the plurality of slide recommendations to the user; receiving, at the computer system from the user, a slide selection from among the plurality of slide recommendations; and generating, via the at least one processor based on the slide selection, a slide containing an animation using the at least one animated avatar, wherein the slide comprises the plurality of slide elements.

The method of any preceding clause, further comprising: training the neural network by providing a plurality of slide design examples and associated input parameters.

The method of any preceding clause, wherein the plurality of slide recommendations comprises at least one of: a slide title; a slide description; slide pictures; and equations.

The method of any preceding clause, wherein the plurality of slide elements comprises: a number of pictures; a size of each picture; a number of equations; a space for each equation; and a theme.

The method of any preceding clause, wherein the plurality of slide elements comprises top n messages which the user intends to convey, n being a predetermined number set by the user.

The method of any preceding clause, further comprising: analyzing, via the at least one processor executing a language model, the top n messages, resulting in: a description of the slide; and a title recommendation of the slide.

The method of any preceding clause, further comprising: fine-tuning the language model using a fine-tuning dataset, the fine-tuning dataset comprising text from notable speakers, resulting in a modification to original slide text, where modified slide text resembles text from speeches of the notable speakers.

A method of pre-caching renders for text-to-animation technology on a slide-by-slide basis, wherein the pre-cached renders are used to assemble renders requested at the end of lesson preparation.

The method of any preceding clause, where pre-cached copies start generating for a slide after the user moves to the next slide.

The method of any preceding clause, wherein pre-caching starts before the user requests a video to be generated.

The method of any preceding clause, where pre-cached copies are created at lower resolution, to get faster render time, and are updated later, at higher resolution.

The method of any preceding clause, where audio first is obtained from narration text, following which animations are generated using audio and the slides.

The method of any preceding clause, wherein certain renders are prioritized over others.

A method of splitting a slide's renders into multiple sub-renders for text-to-animation technology, and animations from these sub-renders are blended together to form a finished render for the slide.

The method of any preceding clause, where the blending is done with keyframe animations.

The method of any preceding clause, where the multiple sub-renders are run in parallel.

The method of any preceding clause, where the sub-renders are done with multiple text boxes.

The method of any preceding clause, where changes made to the text of a text-to-animation technology cause that particular text box containing the change to be re-rendered, while other text boxes are unaffected.

A method of splitting a slide's renders into sub-renders for text-to-animation technology, wherein the sub-renders comprise one text box or multiple text boxes, and are chosen based on number of characters or words in each narration text box.

The method of any preceding clause, where the sub-renders are blended together.

The method of any preceding clause, where the multiple sub-renders are run in parallel.

The method of any preceding clause, where changes made to the text of a text-to-animation technology cause that particular text box containing the change to be re-rendered, while other text boxes are unaffected.

A method of splitting a narration text box into multiple pieces of text for text-to-animation technology, creating animations for the multiple pieces of text, and then blending them together.

The method of any preceding clause, where the blending is done with keyframe animations.

The method of any preceding clause, where animations for the multiple pieces of text are generated in parallel.

The method of any preceding clause, wherein the locations where splitting is done is obtained using a machine learning model.

A method comprising: receiving, at a computer system from a user, first inputs for a first slide, wherein the first slide, when rendered, will comprise an animation; receiving, via at least one processor of the computer system, a notification to begin rendering the first slide; rendering, via the at least one processor based on the notification, the first slide, resulting in a rendered first slide comprising the animation, wherein the rendering comprises: identifying, via the at least one processor, a plurality of portions of the first inputs; separately rendering, via the at least one processor, each portion of the plurality of portions, resulting in a plurality of sub-rendered portions; and combining, via the at least one processor, the plurality of sub-rendered portions together, resulting in the rendered first slide.

The method of any preceding clause, wherein the plurality of portions comprise distinct pieces of text.

The method of any preceding clause, wherein the combining of the plurality of sub-rendered portions relies on keyframes of the plurality of sub-rendered portions.

The method of any preceding clause, wherein the separate rendering of each portion of the plurality of portions occurs in parallel.

The method of any preceding clause, wherein: the notification is received upon the user beginning to provide second inputs for a second slide; and the rendering of the first slide occurs while the user is providing the second inputs.

The method of any preceding clause, wherein a subsequent modification to a specific portion of the plurality of portions results in re-rendering of the specific portion.

The method of any preceding clause, wherein the rendering starts before the user requests the animation to be generated, resulting in an unofficial render.

The method of any preceding clause, wherein the unofficial render is created at a lower resolution compared to an official render of the first slide completed upon receiving a user request for the animation.

The method of any preceding clause, wherein the animation comprises synthesized audio based on the first inputs.

The invention claimed is:

1. A method comprising:
receiving, at a computer system from a user, social media content;
processing, via at least one processor of the computer system, the social media content using at least one neural network, the at least one neural network comprising summarization capabilities and sentiment analysis capabilities, resulting in a sentiment analysis and at least one summary;
generating, via the at least one processor, a plurality of slides, each slide in the plurality of slides comprising an avatar and a narration, the narration based on the social media content;
animating, via the at least one processor, the avatar within each slide in the plurality of slides using the narration and the sentiment analysis, resulting in a plurality of animated slides; and
combining, via the at least one processor, the plurality of animated slides, resulting in an animated video comprising an animated avatar.

2. The method of claim 1, wherein the processing of the social media content using the at least one neural network further results in:
   a title for each slide in the plurality of slides.

3. The method of claim 1, wherein the processing of the social media content using the at least one neural network further results in:
   a slide description for each slide in the plurality of slides.

4. The method of claim 1, wherein the processing of the social media content using the at least one neural network further results in:
   keywords for each slide in the plurality of slides.

5. The method of claim 4, further comprising:
   executing, via the at least one processor, an image search using the keywords.

6. A system comprising:
   at least one processor; and
   a non-transitory computer-readable storage medium having instructions stored which, when executed by the at least one processor, cause the at least one processor to perform operations comprising:
      receiving, from a user, social media content;
      processing the social media content using at least one neural network, the at least one neural network comprising summarization capabilities and sentiment analysis capabilities, resulting in a summary and a sentiment analysis;
      generating a plurality of slides, each slide in the plurality of slides comprising an avatar and a narration, the narration based on the social media content;
      animating the avatar within each slide in the plurality of slides using the narration and the sentiment analysis, resulting in a plurality of animated slides; and
      combining the plurality of animated slides, resulting in an animated video comprising an animated avatar.

7. The system of claim 6, wherein the processing of the social media content using the at least one neural network further results in:
   a title for each slide in the plurality of slides.

8. The system of claim 6, wherein the processing of the social media content using the at least one neural network further results in:
   a slide description for each slide in the plurality of slides.

9. The system of claim 6, wherein the processing of the social media content using the at least one neural network further results in:
   keywords for each slide in the plurality of slides.

10. The system of claim 9, the non-transitory computer-readable storage medium having additional instructions stored which, when executed by the at least one processor, cause the at least one processor to perform operations comprising:
    executing an image search using the keywords.

11. A non-transitory computer-readable storage medium having instructions stored which, when executed by at least one processor, cause the at least one processor to perform operations comprising:
    receiving, from a user, a social media content in electronic form;
    processing the social media content using at least one neural network, the at least one neural network comprising summarization capabilities and sentiment analysis capabilities, resulting in a summary and a sentiment analysis;
    generating a plurality of slides, each slide in the plurality of slides comprising an avatar and a narration, the narration based on the social media content;
    animating the avatar within each slide in the plurality of slides using the narration and the sentiment analysis, resulting in a plurality of animated slides; and
    combining the plurality of animated slides, resulting in an animated video comprising an animated avatar.

12. The non-transitory computer-readable storage medium of claim 11, wherein the processing of the social media content using the at least one neural network further results in:
    a title for each slide in the plurality of slides.

13. The non-transitory computer-readable storage medium of claim 11, wherein the processing of the social media content using the at least one neural network further results in:
    a slide description for each slide in the plurality of slides.

14. The non-transitory computer-readable storage medium of claim 11, wherein the processing of the social media content using the at least one neural network further results in:
    keywords for each slide in the plurality of slides.

15. The non-transitory computer-readable storage medium of claim 14, the non-transitory computer-readable storage medium having additional instructions stored which, when executed by the at least one processor, cause the at least one processor to perform operations comprising:
    executing an image search using the keywords.

* * * * *